United States Patent
Yamashita et al.

(10) Patent No.: US 7,611,571 B2
(45) Date of Patent: Nov. 3, 2009

(54) INK, INK JET RECORDING METHOD, INK CARTRIDGE, RECORDING UNIT, AND INK JET RECORDING APPARATUS

(75) Inventors: Tomohiro Yamashita, Kawasaki (JP); Jun Yoshizawa, Tokyo (JP); Daiji Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/110,596

(22) Filed: Apr. 28, 2008

(65) Prior Publication Data

US 2008/0274286 A1    Nov. 6, 2008

(30) Foreign Application Priority Data

| May 1, 2007 | (JP) | ............................. 2007-121298 |
| Aug. 8, 2007 | (JP) | ............................. 2007-206270 |
| Apr. 17, 2008 | (JP) | ............................. 2008-108116 |

(51) Int. Cl.
  C09D 11/00    (2006.01)
  C09D 11/02    (2006.01)
  B41J 2/01     (2006.01)

(52) U.S. Cl. .................. 106/31.47; 106/31.49; 347/100

(58) Field of Classification Search ............. 106/31.47, 106/31.49; 347/100
See application file for complete search history.

(56) References Cited

U.S. PATENT DOCUMENTS

| 4,202,870 A | 5/1980 | Weber et al. |
| 4,242,271 A | 12/1980 | Weber et al. |
| 4,248,852 A | 2/1981 | Wakabayashi et al. ...... 423/626 |
| 4,391,960 A | 7/1983 | Kleine et al. |
| 4,723,129 A | 2/1988 | Endo et al. |
| 4,740,796 A | 4/1988 | Endo et al. |
| 5,091,009 A | 2/1992 | Nogami et al. |
| 5,123,960 A * | 6/1992 | Shirota et al. ............. 106/31.46 |
| 5,221,497 A | 6/1993 | Watanabe et al. |
| 6,241,786 B1 * | 6/2001 | Zarges et al. .................... 8/527 |
| 7,087,107 B2 | 8/2006 | Tateishi et al. |
| 7,144,452 B2 | 12/2006 | Takayama et al. ........ 106/31.52 |
| 7,160,372 B2 | 1/2007 | Yoshizawa et al. ....... 106/31.47 |
| 7,198,664 B2 | 4/2007 | Mafune et al. ............ 106/31.28 |
| 7,198,665 B2 | 4/2007 | Nakamura et al. ........ 106/31.52 |
| 7,201,791 B2 | 4/2007 | Okamura et al. ......... 106/31.47 |
| 7,211,134 B2 | 5/2007 | Tateishi et al. |
| 7,226,498 B2 | 6/2007 | Yamashita et al. ......... 106/31.5 |
| 7,241,332 B2 | 7/2007 | Yoshizawa et al. ....... 106/31.47 |

(Continued)

FOREIGN PATENT DOCUMENTS

EP    0 418 792 A1    3/1991

(Continued)

*Primary Examiner*—Helene Klemanski
(74) *Attorney, Agent, or Firm*—Fitzpatrick, Cella, Harper & Scinto

(57) ABSTRACT

An ink having a cyan color is provided which can form images excellent in ozone resistance in such a high level as to exceed anticipation and having a preferable color tone. The ink includes at least two coloring materials of a first coloring material and a second coloring material, wherein the first coloring material is a compound having a copper phthalocyanine skeleton with a specific structure and the second coloring material is a compound having a copper phthalocyanine skeleton with a specific structure that is different from the first coloring material.

7 Claims, 8 Drawing Sheets

U.S. PATENT DOCUMENTS

| | | | |
|---|---|---|---|
| 7,247,194 B2 | 7/2007 | Okamura et al. | |
| 7,247,196 B2 | 7/2007 | Sato et al. | 106/31.52 |
| 7,270,701 B2 | 9/2007 | Jinnou et al. | 106/31.47 |
| 7,270,703 B2 | 9/2007 | Tateishi et al. | |
| 7,282,090 B2 * | 10/2007 | Osumi et al. | 106/31.47 |
| 7,285,159 B2 | 10/2007 | Aikawa et al. | 106/31.47 |
| 7,294,184 B2 | 11/2007 | Fujimoto et al. | 106/31.47 |
| 7,297,197 B2 | 11/2007 | Jinnou et al. | 106/31.47 |
| 2006/0016026 A1 * | 1/2006 | Tateishi et al. | 106/31.49 |
| 2006/0103705 A1 | 5/2006 | Yoshizawa et al. | 347/100 |
| 2006/0119682 A1 | 6/2006 | Okamura et al. | 347/100 |
| 2006/0119683 A1 * | 6/2006 | Yoshizawa et al. | 347/100 |
| 2006/0137570 A1 | 6/2006 | Osumi et al. | 106/31.27 |
| 2007/0107627 A1 * | 5/2007 | Negishi et al. | 106/31.47 |
| 2007/0186811 A1 * | 8/2007 | Taga et al. | 106/31.49 |
| 2008/0018722 A1 | 1/2008 | Mafune et al. | 347/100 |

FOREIGN PATENT DOCUMENTS

| | | |
|---|---|---|
| JP | 57-44605 B2 | 9/1982 |
| JP | 2803134 | 9/1998 |
| JP | 2881847 | 4/1999 |
| JP | 11-302285 | 11/1999 |
| JP | 11-302548 | 11/1999 |
| JP | 2002-249677 | 9/2002 |
| JP | 2002-275386 | 9/2002 |
| JP | 2002-294097 | 10/2002 |
| JP | 2002-302623 | 10/2002 |
| JP | 2002-327132 | 11/2002 |
| JP | 2003-003099 | 1/2003 |
| JP | 2003-034758 | 2/2003 |
| JP | 2003-213168 | 7/2003 |
| JP | 2003-231834 | 8/2003 |
| JP | 2004-323605 | 11/2004 |
| JP | 2006-045534 | 2/2006 |
| JP | 2006-328129 | 12/2006 |
| WO | WO 2007/046553 A1 | 4/2007 |
| WO | WO 2007/091631 A1 | 8/2007 |
| WO | WO 2007/116933 A1 | 10/2007 |

* cited by examiner

INK, INK JET RECORDING METHOD, INK CARTRIDGE, RECORDING UNIT, AND INK JET RECORDING APPARATUS

BACKGROUND OF THE INVENTION

1. Field of the Invention

The present invention relates to an ink, an ink jet recording method, an ink cartridge, a recording unit, and an ink jet recording apparatus.

2. Description of the Related Art

An ink jet recording method is a method of forming images by applying ink droplets to recording media such as plain paper and glossy media. This method has rapidly come into widespread use by the reduction in cost and improvement in recording speed of ink jet recording apparatuses. Further, with the rapid spread of digital cameras in addition to the progress in obtaining high-quality images by the ink jet recording method, the ink jet recording method has been commonly used as the output method of images equal to silver halide photographs.

In recent years, further progress in obtaining high-quality images is achieved by minimization of ink droplets and improvement in the color gamut accompanying introduction of a multicolor ink. On the other hand, the demand to a coloring material and ink becomes higher, wherein severer properties are demanded in the improvement in color developabilities and reliability of clogging and ejection stability.

On the other hand, in the ink jet recording method there is a problem in that the resulting recorded matter is inferior in image storage stability. Generally, the image storage stability of the recorded matter obtained by the ink jet recording method is low as compared with silver halide photographs. In particular, when a recorded matter is exposed to light, humidity, heat, environmental gas such as ozone gas that is present in the air, etc. for a long time, there is a problem such that the coloring material on the recorded matter deteriorates and is liable to result in the change of color tone and fading of images.

In order to improve the image storage stability, particularly ozone resistance, a large number of proposals have been conventionally made. For instance, many techniques for improving the fastness of an image, particularly ozone resistance, have been suggested for a coloring material used for an ink jet ink, but these techniques do not reach such a level as to satisfy the higher level fastness required in recent years.

Further, in recent years, a demand that recorded matters are displayed on a wall or a bulletin board without being set in a frame, is increasing. In contrast, with fastness in such a level obtained by an ink widely used at present, a coloring material in an image is significantly faded by an acid gas in the air, particularly ozone, to an unacceptable level in some cases.

Fading of an image is caused primarily by a cyan ink having particularly low ozone resistance among respective inks of cyan, yellow and magenta. Therefore, many proposals for improving ozone resistance of cyan ink have been made (see Japanese Patent Application Laid-Open Nos. 2002-249677, 2002-275386, 2002-294097, 2002-302623, 2002-327132, 2003-3099, and 2003-213168). Further, a proposal has been made in which ozone resistance of an image is improved by introducing a nitrogen-containing heteroaromatic ring into a skeleton of a phthalocyanine type coloring material commonly used as a coloring material for a cyan ink (see Japanese Patent Application Laid-Open No. 2003-34758), and it is described that this phthalocyanine type coloring material may have $(SO_3D)_m$ or $(SO_2NHR)_n$ (wherein m=1 to 4, and n=0 to 3) as a substituent, and the above $SO_2NHR$ is a sulfonamide residual group which can form a complex with $SO_2NH_2$ or a copper ion. (In addition, the above D represents a monovalent alkali metal, ammonium, or organic ammonium). Furthermore, in order to improve ozone resistance of an image, an ink has been proposed containing a plurality of phthalocyanine type coloring materials in combination (see Japanese Patent Application Laid-Open No. 2006-328129).

Further, a technique has been proposed in which attention is concentrated on the aggregation property of a coloring material, and both ozone resistance and bronze resistance are achieved by defining a $d_{75}$ value of a phthalocyanine type coloring material (see Japanese Patent Application Laid-Open No. 2006-45534). However, the level demanded by current users is increasingly raised on a day-to-day basis, and further improvement is thus required.

As described above, there is at present no proposal for such a fundamental solution as to significantly improve ozone resistance.

SUMMARY OF THE INVENTION

Performance required for ozone resistance of a recorded matter obtained by an ink jet recording method has been grown year by year, and with a coloring material conventionally used for a cyan ink, images having ozone resistance at a level satisfying the above described requirements has not been obtained yet. For example, in the inventions described in the above Japanese Patent Application Laid-Open Nos. 2002-249677, 2002-275386, 2002-294097, 2002-302623, 2002-327132, 2003-3099, and 2003-213168, it is intended to improve ozone resistance of an image by introducing various substituents into a coloring material, according to the investigation of the present inventors, although there is a limit to the improvement of ozone resistance only due to characteristics of such a single coloring material.

In the above Japanese Patent Application Laid-Open No. 2003-34758, it is described that $SO_2NH_2$ is preferable as $SO_2NHR$. However, three examples out of the five examples in this Japanese Patent Application Laid-Open No. 2003-34758 do not have $SO_2NHR$, that is, n=0 in these examples. In addition, the result of a color fading test is described in each of the cases where phthalocyanine type coloring materials in which $SO_2NH_2$ and a sulfonamide residual group are substituted for $SO_2NHR$, respectively, are used. However, while it is described in the above Japanese Patent Application Laid-Open No. 2003-34758 that $SO_2NH_2$ is preferable as $SO_2NHR$, the results of the color fading test in the cases of using these phthalocyanine type coloring materials are disclosed as being inferior to the result in the case of n=0. That is, it can be said that the ozone resistance of images obtained by these coloring materials is insufficient. Further, the color tone of an ink is biased toward a red tone by using these coloring materials, which thus causes another problem such that a preferable color tone as a cyan ink cannot be obtained.

Furthermore, by a method of combining a plurality of phthalocyanine type coloring materials described in the above Japanese Patent Application Laid-Open No. 2006-328129, resistance to a bronze phenomenon that is a problem in the case of using a phthalocyanine type coloring material is improved, and at the same time, the ozone resistance of an image is also improved. However, even in this case the ozone resistance does not reach at present such a high level as required in recent years. Thus, the inventors of the present invention considered that it is necessary to make specific studies on a coloring material used for a cyan ink.

Therefore, an object of the present invention is to provide an ink having a cyan color which provides an image excellent in ozone resistance at a high level and having a preferable color tone. Another object of the present invention is to provide an ink jet recording method, an ink cartridge, a recording unit and an ink jet recording apparatus which use the above ink.

The above-described objects are achieved by the following present invention. Specifically, an ink according to an embodiment of the present invention includes at least two coloring materials of a first coloring material and a second coloring material, wherein the first coloring material is a compound represented by the general formula (I):

General Formula (I)

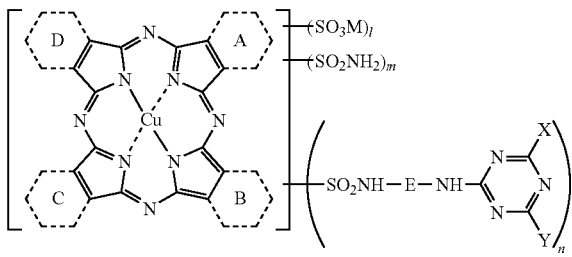

wherein A, B, C and D each independently represent a six-membered ring having aromaticity, M's each independently represent a hydrogen atom, alkali metal, ammonium or organic ammonium, E's each independently represent an alkylene group, X's each independently represent a sulfo-substituted anilino group, a carboxyl-substituted anilino group or a phosphono-substituted anilino group, and the substituted anilino groups may have 1 to 4 of at least one substituent selected from the group consisting of a sulfonic acid group, a carboxyl group, a phosphono group, a sulfamoyl group, a carbamoyl group, a hydroxyl group, an alkoxy group, an amino group, an alkylamino group, a dialkylamino group, an arylamino group, a diarylamino group, an acetylamino group, an ureido group, an alkyl group, a nitro group, a cyano group, halogen, an alkylsulfonyl group and an alkylthio group, Y's each independently represent a hydroxyl group or an amino group, and l, m and n satisfy $0 \leq l \leq 2$, $0 \leq m \leq 3$ and $0.1 \leq n \leq 3$, and $l+m+n=1$ to 4, and the second coloring material is a compound represented by the general formula (II):

General Formula (II)

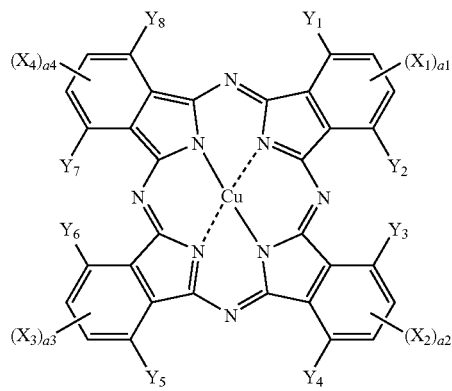

wherein $X_1$, $X_2$, $X_3$ and $X_4$ each independently represent —SO-Z, —SO$_2$-Z, —SO$_2$NR$_1$R$_2$, a sulfonic acid group, —CONR$_1$R$_2$ or CO$_2$R$_1$, where Z's each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, $R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, $Y_1$, $Y_2$, $Y_3$, $Y_4$, $Y_5$, $Y_6$, $Y_7$ and $Y_8$ each independently represent a hydrogen atom, a halogen atom, a substituted or unsubstituted alkyl group, a substituted or unsubstituted aryl group, a cyano group, a substituted or unsubstituted alkoxy group, an amide group, an ureido group, a sulfonamide group, a substituted or unsubstituted carbamoyl group, a substituted or unsubstituted sulfamoyl group, a substituted or unsubstituted alkoxycarbonyl group, a carboxyl group or a sulfonic acid group, and $a_1$, $a_2$, $a_3$ and $a_4$ represent the numbers of $X_1$, $X_2$, $X_3$ and $X_4$, respectively, and each independently represent an integer of 1 or 2.

Further, an ink jet recording method according to another embodiment of the present invention is an ink jet recording method in which ink is ejected by an ink jet system to perform recording on a recording medium by ejecting ink by an ink jet system, wherein the ink is an ink having the above constitution.

Further, an ink cartridge according to another embodiment of the present invention is an ink cartridge provided with an ink storage portion for storing ink, wherein the ink is an ink having the above constitution.

Further, a recording unit according to another embodiment of the present invention is a recording unit provided with an ink storage portion for storing ink and a recording head for ejecting ink, wherein the ink is an ink having the above constitution.

Further, an ink jet recording apparatus according to another embodiment of the present invention is an ink jet recording apparatus provided with an ink storage portion for storing ink and a recording head for ejecting ink, wherein the ink is an ink having the above constitution.

Further, an ink according to another embodiment of the present invention includes at least two coloring materials of a coloring material A and a coloring material B, wherein a dispersion distance, d value, between molecular aggregates in an ink, obtained by a small-angle X-ray scattering method, satisfies the following conditions:

$$d_{A+B} > d_A \text{ and } d_{A+B} > d_B$$

wherein $d_A$ (nm) is a d value of the coloring material A, $d_B$ (nm) is a d value of the coloring material B, and $d_{A+B}$ (nm) is a d value when the coloring material A and the coloring material B are mixed.

According to an embodiment of the present invention, an ink having a cyan color can be provided which forms images having ozone resistance at a high level and having a preferable color tone. Further, according to another embodiment of the present invention, an ink jet recording method, an ink cartridge, a recording unit and an ink jet recording apparatus can be provided which use the above ink.

Further features of the present invention will become apparent from the following description of exemplary embodiments with reference to the accompanying drawings.

DESCRIPTION OF THE EMBODIMENTS

Figure 1:
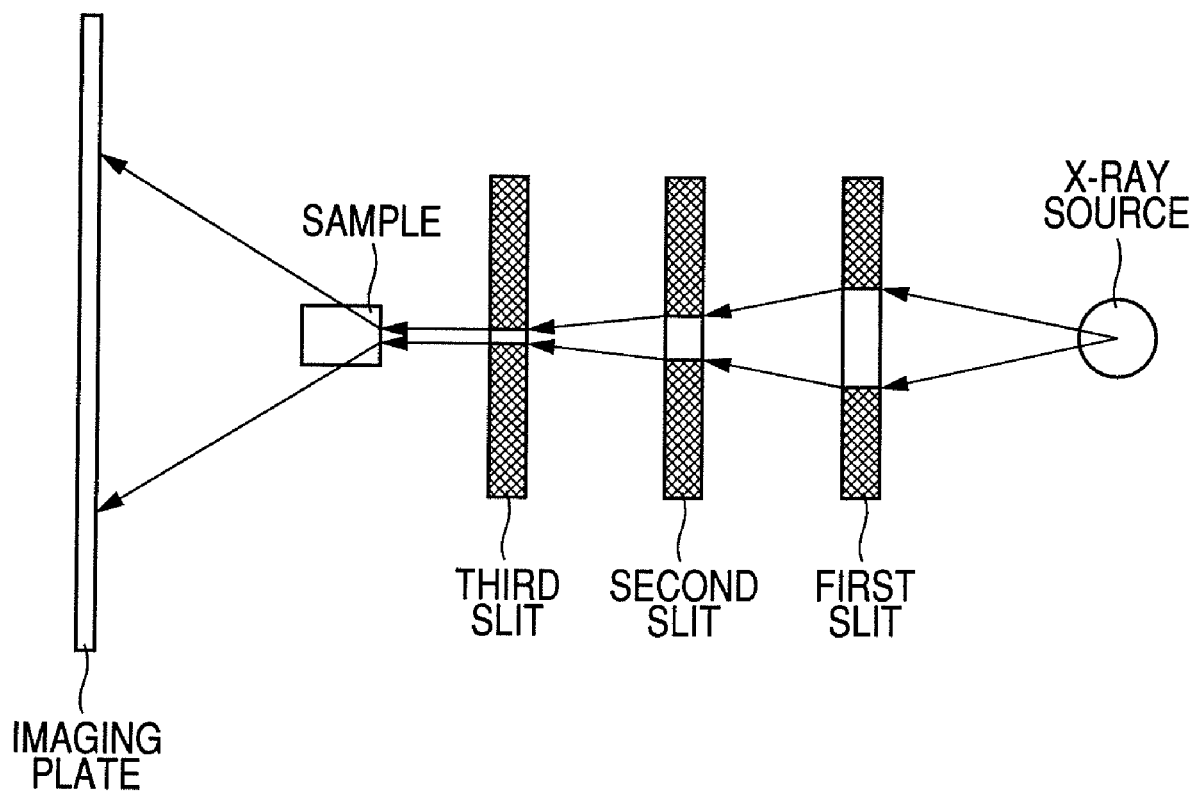
FIG. 1 is a view explaining the principle of a small-angle X-ray scattering method.

The present invention will be described below in detail by giving exemplary embodiments.

In the present invention, when a compound is a salt, the salt is present in ink in a state that it is dissociated into ions, but, for convenience, this state is referred to as "the ink contains a salt". In the following description, a compound represented by the general formula (I) and a compound represented by the general formula (II) are referred to also as "a compound of the general formula (I)" and "a compound of the general formula (II)", respectively.

As a result of studies made by the present inventors, it was found that when an ink has a constitution in which the coloring material includes in combination two types of compounds each having a specific structure, an image having preferable color tone and excellent ozone resistance can be obtained. It is also found that using these compounds in a specific mass ratio enables a recorded matter to particularly have significantly excellent ozone resistance. Furthermore, the inventors obtained important findings in the case of combining two types of compounds having specific structures. Specifically, the present inventors found structures of compounds involved with mutual aggregation properties of these compounds or a factor appropriately controlling characteristics of aggregation and association, which occurs in the case of combining two types of compounds having specific structures.

In the present invention, a compound of the following general formula (I) as a first coloring material and a compound of the following general formula (II) as a second coloring material are used in combination. Hereinafter, these coloring materials will be specifically described.

(First Coloring Material: Compound Represented by the General Formula (I))

It is necessary that the ink of the present invention contains a compound represented by the following general formula (I) as the first coloring material (dye), wherein A, B, C and D each independently represent a six-membered ring having aromaticity, M's each independently represent a hydrogen atom, alkali metal, ammonium or organic ammonium, E's each independently represent an alkylene group, X's each independently represent a sulfo-substituted anilino group, a carboxyl-substituted anilino group or a phosphono-substituted anilino group, and the substituted anilino groups may have 1 to 4 of at least one substituent selected from the group consisting of a sulfonic acid group, a carboxyl group, phosphono group, a sulfamoyl group, a carbamoyl group, a hydroxyl group, an alkoxy group, an amino group, an alkylamino group, a dialkylamino group, an arylamino group, a diarylamino group, an acetylamino group, an ureido group, an alkyl group, a nitro group, a cyano group, halogen, an alkylsulfonyl group and an alkylthio group, Y's each independently represent a hydroxyl group or an amino group, and l, m and n satisfy $0 \leq l \leq 2$, $0 \leq m \leq 3$ and $0.1 \leq n \leq 3$, and $l+m+n=1$ to 4.

It is preferable that the coloring material of the general formula (I) is formed into a state in which the mixed coloring materials easily aggregate, or a state in which the mixed coloring materials easily associate when being mixed with a coloring material of the general formula (II) described later. For example, it is considered that when the surface energy of the coloring material of the general formula (I) and the coloring material of the general formula (II) are close to each other, the above state is likely to be formed.

In the general formula (I), A, B, C and D each independently represent a six-membered ring having aromaticity. Examples of the six-membered ring having aromaticity include a benzene ring and a nitrogen-containing heteroaromatic ring. Examples of a nitrogen-containing heteroaromatic ring include a pyridine ring, a pyrazine ring, pyrimidine ring and a pyridazine ring, and among these, a pyridine rind is particularly preferable. A compound of the general formula (I), which can be used in the present invention includes a compound in which A, B, C and D all represent a benzene ring or a nitrogen-containing heteroaromatic ring, and a compound in which 1 to 3 of A, B, C and D represent a nitrogen-containing heteroaromatic ring, and the remains represent a benzene ring. According to the studies made by the present inventors, the compound of the general formula (I) improves ozone resistance of a recorded matter as the number of nitrogen-containing heteroaromatic rings in the structure thereof increases, but there is a tendency for bronze resistance (suppression of occurrence of a bronze phenomenon) to be lowered. Therefore, considering the balance between ozone General Formula (I)

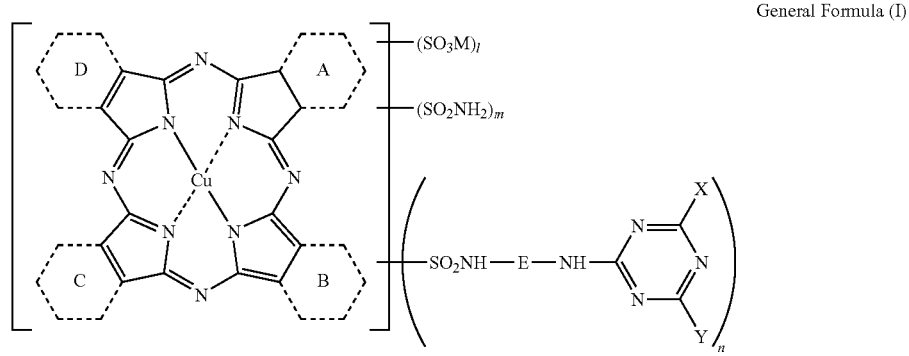

resistance and bronze resistance, it is preferable that the number of nitrogen-containing heteroaromatic rings is adjusted.

E's in the general formula (I) are each independently an alkylene group, and the number of carbon atoms in the alkylene group is 2 to 12, and preferably 2 to 6. Specifically, examples thereof include an ethylene group, propylene group, butylene group, pentylene group, hexylene group, cyclopropylene-di-yl group, 1,2- or 1,3-cyclopentylene-di-yl group, 1,2-, 1,3- or 1,4-cyclohexylene group. Among these, an ethylene group, a propylene group and a butylene group are preferable.

X's in the general formula (I) are each independently a sulfo-substituted anilino group, carboxyl-substituted anilino group or phosphono-substituted anilino group. The substituted anilino groups may have 1 to 4, preferably 1 or 2, of at least one substituent selected from the group consisting of a sulfonic acid group, carboxyl group, phosphono group, sulfamoyl group, carbamoyl group, hydroxyl group, alkoxy group, amino group, alkylamino group, dialkylamino group, arylamino group, diarylamino group, acetylamino group, ureido group, alkyl group, nitro group, cyano group, halogen, alkylsulfonyl group and alkylthio group. Specifically, X includes, for example, a 2,5-disulfoanilino group, 2-sulfoanilino group, 3-sulfoanilino group, 4-sulfoanilino group, 2-carboxyanilino group, 4-ethoxy-2-sulfoanilino group, 2-methyl-5-sulfoanilino group, 2-methoxy-4-nitro-5-sulfoanilino group, 2-chloro-5-sulfoanilino group, 3-carboxy-4-hydroxyanilino group, 3-carboxy-4-hydroxy-5-sulfoanilino group, 2-hydroxy-5-nitro-3-sulfoanilino group, 4-acetylamino-2-sulfoanilino group, 4-anilino-3-sulfoanilino group, 3,5-dicarboxyanilino group, 2-carboxy-4-surfamoylanilino group, 2,5-dichloro-4-sulfoanilino group and 3-phosphonoanilino group.

Y's in the general formula (I) are each independently a hydroxyl group or an amino group.

A sulfonic acid group, a carboxyl group, a phosphono group, etc. in the explanation of X of the compound of the general formula (I) may be in the form of a salt. Examples of a counter ion forming a salt include ions of alkali metals, ammonium and organic ammonium. Examples of the alkali metals include lithium, sodium and potassium. Examples of organic ammonium include onium salts of alkylamines having 1 to 3 carbon atoms such as methylamine and ethylamine, and onium salts of mono-, di- or trialkanolamine (whose alkanol moiety has 1 to 4 carbon atoms) such as monoethanolamine, diethanolamine, triethanolamine, monoisopropanolamine, diisopropanolamine, and triisopropanolamine. Further, the counter ion may be alkali earth metals such as calcium and magnesium.

The compound of the general formula (I) can be synthesized as follows.

First, a compound (copper porphyrazine compound) of the following general formula (III) is synthesized,

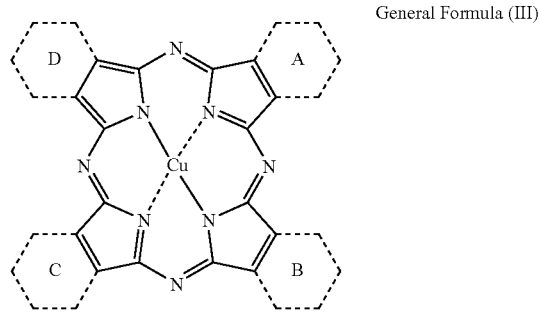

General Formula (III)

wherein A, B, C and D each independently represent a six-membered ring having aromaticity.

The compound of the general formula (III) can be obtained, for example, by reacting a derivative of a nitrogen-containing heteroaromatic ring dicarboxylic acid having aromaticity and a phthalic acid derivative in the presence of a catalyst and a copper compound. In the reaction of a derivative of a nitrogen-containing heteroaromatic ring dicarboxylic acid and a phthalic acid derivative, the molar ratio of the two can be changed to control the number of nitrogen-containing heteroaromatic rings and the number of benzene rings in A, B, C and D.

Examples of a derivative of a nitrogen-containing heteroaromatic ring dicarboxylic acid used herein include the followings: dicarboxylic acid compounds such as quinolic acid, 3,4-pyridinedicarboxylic acid and 2,3-pyrazinedicarboxylic acid, or acid anhydrides thereof; dicarboxyamide compounds such as pyridine-2,3-dicarboxyamide; dicarboxylicmonoamide compounds such as pyrazine-2,3-dicarboxylic monoamide; acid imide compounds such as quinolic acid imide; dicarbonitrile compounds such as pyridine-2,3-dicarbonitrile, and pyrazine-2,3-dicarbonitrile. Examples of a phthalic acid derivative include phthalic acid, phthalic anhydride, phthalamide, phthalamic acid, phthalimide, phthalonitrile, 1,3-diiminoisoindoline, and 2-cyanobenzamide.

A general synthesis method of a copper compound includes a nitrile method and a Wyler method, which are different from each other in reaction conditions. The nitrile method is a method of synthesizing a copper compound using as a raw material a dicarbonitrile compound such as 2,3-pyridinedicarbonitrile, 2,3-pyrazine dicarbonitrile and phthalonitrile. The Wyler method is a method of synthesizing a copper compound using the following compounds as raw materials. Example of compounds that can be used in the Wyler method as raw materials include dicarboxylic acid compounds such as phthalic acid, quinolic acid, 3,4-pyridinedicarboxylic acid, and 2,3-pyrazinedicarboxylic acid, or acid anhydrides thereof; dicarboxyamide compounds such as phthalamide, and 2,3-pyridinedicarboxyamide; dicarboxylic monoamide compounds such as phthalamic acid and 2,3-pyrazinedicarboxylic monoamide; and acid imido compounds such as phthalimide and quinolic acid imide. In addition, when a copper compound is synthesized in the Wyler method, urea is necessary, and the amount of urea to be used is preferably 5 moles to 100 moles with respect to 1 mole in total of a derivative of a nitrogen-containing heteroaromatic ring dicarboxylic acid and a phthalic acid derivative.

In general, a synthesis reaction of a copper compound is carried out in the presence of an organic catalyst. In the nitrile method, an organic solvent having a boiling point of 100° C. or more, preferably 130° C. or more, is used. Examples of the organic catalyst that can be used in the nitrile method includes the following examples: alcohols such as n-amyl alcohol, n-hexanol, cyclohexanol, 2-methyl-1-pentanol, 1-heptanol, 1-octanol, 2-ethylhexanol, N,N-dimethylaminoethanol, and benzyl alcohol; glycols such as ethylene glycol and propylene glycol; trichlorobenzene; chloronaphthalene; nitrobenzene; quinoline, sulfolane, and urea. Further, in the Wyler method, a non-protonic organic catalyst having a boiling point of 150° C. or more, preferably 180° C. or more, is used. Organic catalysts that can be used in the Wyler method include trichlorobenzene, chloro naphthalene, nitrobenzene, quinoline, sulfolane, and urea. The amount of the organic solvent to be used is preferably 1-fold mole to 100-fold moles with respect to the total mass of a derivative of a nitrogen-containing heteroaromatic ring dicarboxylic acid and a phthalic acid derivative.

Catalysts used in the nitrile method include the following examples: amines such as quinoline, 1,8-diazabicyclo[5,4,0]-7-undecene, tributylamine, ammonia, and N,N-dimethylaminoethanol; and alkali metal alcolates such as sodium ethoxide and sodium methoxide. Further, examples of a catalyst used in the Wyler method include ammonium molybdate and boric acid. The amount of the catalyst to be used is preferably 0.001 moles to 1 mole with respect to 1 mole in total of a derivative of a nitrogen-containing heteroaromatic ring dicarboxylic acid and a phthalic acid derivative.

As a copper compound used in the synthesis explained above, metal copper, copper halogenate, copper carboxylate, copper sulfate, copper nitrate, copper acetyl acetonate, a complex of copper, and the like may be used. Specific examples include copper chloride, copper bromide, copper acetate, and copper acetyl acetonate. The amount of the copper compound to be used is preferably 0.15 moles to 0.35 moles with respect to 1 mole in total of a derivative of a nitrogen-containing heteroaromatic ring dicarboxylic acid and a phthalic acid derivative.

Generally, the reaction temperature in the nitrile method is preferably 100° C. to 200° C., and more preferably 130° C. to 170° C. Generally, the reaction temperature in the Wyler method is preferably 150° C. to 300° C., and more preferably 170° C. to 220° C. Further, the reaction time is generally preferably 1 hour to 40 hours although depending on reaction conditions. After completion of the reaction, a copper porphyrazine compound represented by the general formula (III) can be obtained through filtration, washing and drying.

A synthesis method of a compound of the general formula (I) will be further described with an example of a compound in which two of A, B, C and D in the general formula (III) represent a pyridine ring and the remaining two represent a benzene ring (copper dibenzobis(2,3-pyrido)porphyrazine).

Quinolic acid (0.5 moles), phthalic anhydride (0.5 moles), copper (II) chloride (0.25 moles), ammonium phosphoric molybdate (0.004 moles), and urea (6 moles) are reacted in sulfolane, which is an organic solvent, at 200° C. for 5 hours. Thus, copper dibenzobis(2,3-pyrido)porphyrazine in which two of A, B, C and D in the general formula (III) represent a pyridine ring and the remaining two represent a benzene ring can be obtained. Quinolic acid, phthalic anhydride, a metal compound, an organic solvent, and a catalyst are not limited to the above because reactivity is different depending on the types and amounts to be used.

A main product obtained in the above described synthesis flow is copper dibenzobis(2,3-pyrido)porphyrazine, which has five isomers which are different from each other in the position of a pyridine ring and in the position of a nitrogen atom in a pyridine ring (the following structural formulas 1A, 1B, 1C, 1D and 1E). Further, in conjunction with the main product including the five isomers, copper tribenzo(2,3-pyrido)porphyrazine and copper benzotris(2,3-pyrido)porphyrazine are produced as by-products. The above copper tribenzobis(2,3-pyrido)porphyrazine is a compound in which one of A, B, C and D in the general formula (III) represents a pyridine ring and the remaining three represent a benzene ring (the following structural formula 2). The above copper benzotris(2,3-pyrido)porphyrazine is a compound in which three of A, B, C and D in the general formula (III) represent a pyridine ring and the remaining one represents a benzene ring. Also in these compounds, position isomers of a pyridine ring (the following structural formulas 3A, 3B, 3C and 3D) are present. In addition, copper tetrakis(2,3-pyrido)porphyrazine and copper phthalocyanine (copper tetrabenzoporphyrazine) are also produced in small amounts. That is, the product obtained in the above described synthesis flow is a mixture of these compounds.

Generally, it is very difficult to isolate only a desired compound from the mixture of these. Therefore, in most cases, the mixture of these is used as "copper dibenzobis(2,3-pyrido) porphyrazine in which, on average, two are a pyridine ring and remaining two are a benzene rings".

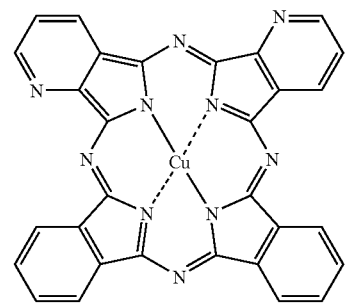

Structural formula 1A

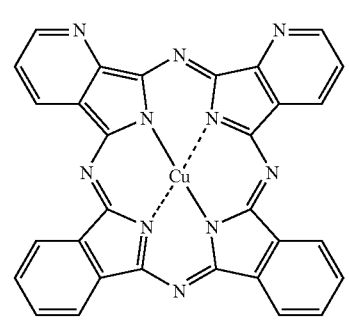

Structural formula 1B

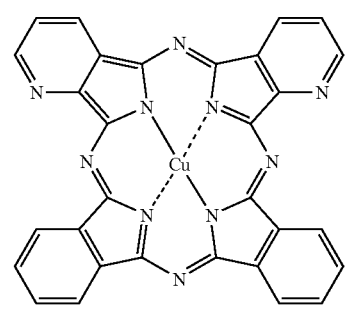

Structural formula 1C

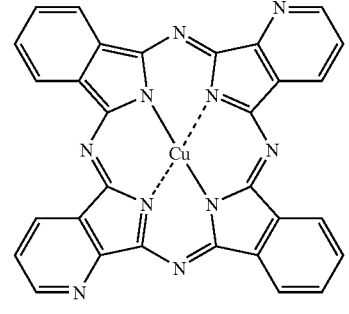

Structural formula 1D

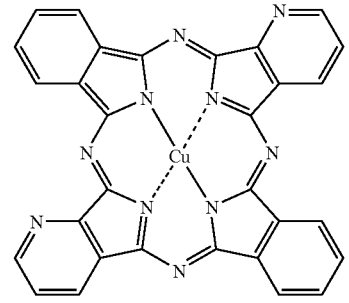

Structural formula 1E

-continued

Structural formula 2

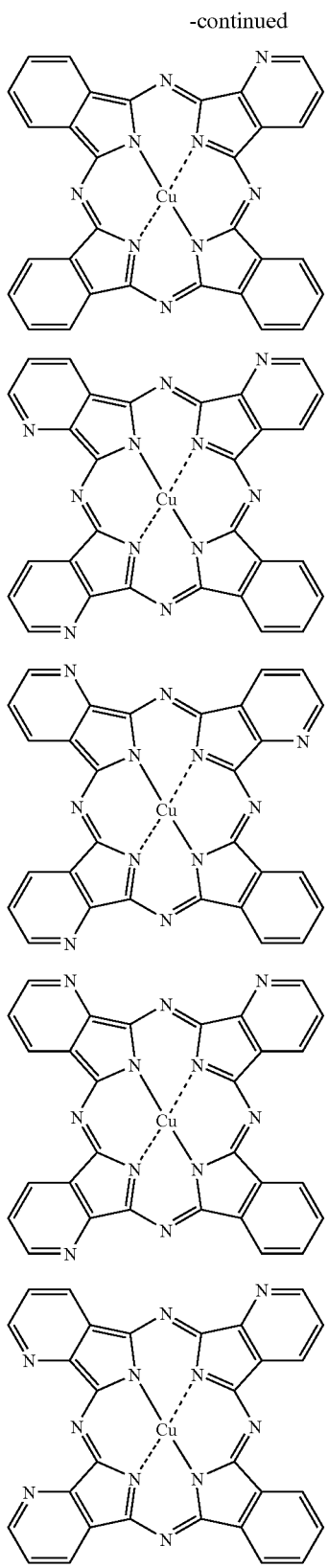

Structural formula 3A

Structural formula 3B

Structural formula 3C

Structural formula 3D

Next, a compound represented by the following general formula (IV) (copper chlorosulfonyl porphyrazine compound) is synthesized, General Formula (IV)

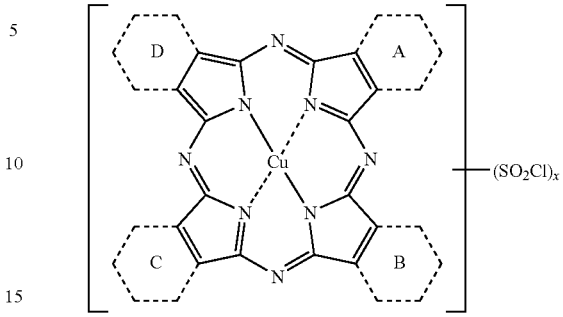

wherein A, B, C and D each independently represent a six-membered ring having aromaticity, and x represents 1 to 4.

A compound of the general formula (IV) is obtained by chlorosulfonating a compound of the general formula (III) in chlorosulfonic acid. Alternatively, it is obtained by sulfonating a compound of the general formula (III) in sulfuric acid or fuming sulfuric acid, and then deriving a sulfonic acid group into a chlorosulfonic acid group by a chlorinating agent. The thus obtained chlorosulfonic acid group or sulfonic acid group is introduced on a benzene ring when A, B, C and D in the general formula (III) represent a benzene ring, and are not introduced when A, B, C and D represent a heteroaromatic ring. That is, among A, B, C and D in the general formula (III), the chlorosulfonic acid group or sulfonic acid group is introduced only into a benzene ring.

Chlorosulfonic acid is generally used as a solvent in a reaction when the compound of the general formula (III) is chlorosulfonated. The amount of chlorosulfonic acid to be used is preferably 3 times to 20 times, and further preferably 5 times to 10 times the mass of the compound of the general formula (III). In general, the reaction temperature is preferably 100° C. to 150° C., and further preferably 120° C. to 150° C. It is preferable that the reaction time is generally 1 hour to 10 hours although being different according to conditions such as reaction temperature. A substituent of the obtained compound of the general formula (IV) is a mixture of chlorosulfonic acid and sulfonic acid groups, and the proportion of chlorosulfonic acid can be increased by adding a chlorinating agent in a reaction system. Examples of the chlorinating agent include chlorosulfonic acid, thionyl chloride, sulfuryl chloride, phosphorus trichloride, phosphorus pentachloride, and phosphorus oxychloride. It is a matter of course that the present invention is not limited to these.

The above compound of the general formula (IV) can be also produced by the following method other than the above described method. First, sulfophthalic acid having a sulfonic acid group or sulfophthalic acid having a sulfonic acid group and quinolic acid are subjected to condensation and ring closure, thereby synthesizing a compound represented by the general formula (V) (copper porphyrazine compound having a sulfonic acid group). Then, a sulfonic acid group in the compound of the general formula (V) is derived into a chlorosulfonic group, thereby obtaining the compound of the general formula (IV).

General Formula (V)

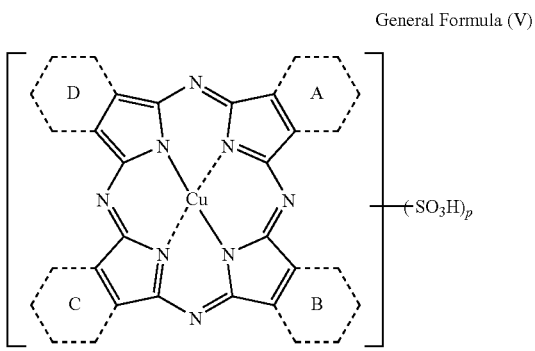

wherein A, B, C and D each independently represent a six-membered ring having aromaticity, and p represents 1 to 4.

A sulfonic acid group in a compound of the above general formula (V) can be converted into a chlorosulfonic acid group by reacting the compound of the general formula (V) and a chlorinating agent. Examples of the solvent used in the chlorination reaction include sulfuric acid, fuming sulfuric acid, chlorosulfonic acid, benzene, toluene, nitrobenzene, chlorobenzene, N,N-dimethylformamide, and N,N-dimethylacetoamide. Examples of the chlorinating agent include chlorosulfonic acid, thionyl chloride, sulfuryl chloride, phosphorus trichloride, phosphorus pentachloride, and phosphorus oxychloride. It is a matter of course that the present invention is not limited to these.

Finally, the compound of the general formula (IV) obtained in the above described manner, a compound of the following general formula (VI) (organic amine), and ammonia are reacted, and the desired compound of the general formula (I) is thus synthesized.

General Formula (VI)

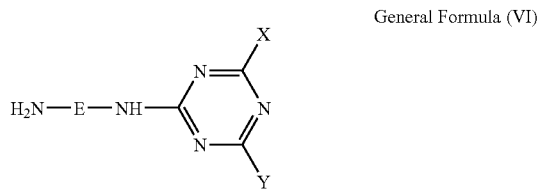

wherein E represents an alkylene group, X represents a sulfo-substituted anilino group, a carboxyl-substituted aniline-group or a phosphono-substituted anilino group, and these substituted anilino groups may have 1 to 4 of at least one substituent selected from the group consisting of a sulfonic acid group, carboxyl group, phosphono group, sulfamoyl group, carbamoyl group, hydroxyl group, alkoxy group, amino group, alkylamino group, dialkylamino group, arylamino group, diarylamino group, acetylamino group, ureido group, alkyl group, nitro group, cyano group, halogen, alkylsulfonyl group, and alkylthio group, and Y represents a hydroxyl group or an amino group.

Specifically, the compound of the general formula (I) used in the present invention can be synthesized by the following procedure. Specifically, the compound can be obtained by reacting a compound of the general formula (IV), a compound of the general formula (VI), and ammonia (aminating agent) for 1 hour to 20 hours generally under the conditions of pH 8 to 10 and a temperature of 5° C. to 70° C. In this reaction, using, for example, ammonium salts such as ammonium chloride and ammonium sulfate, urea, ammonia water and ammonia gas, ammonia can be introduced into the reaction system. The reaction of a compound of the general formula (IV), a compound of the general formula (VI) and an aminating agent is generally carried out in water. The amount of the compound of the general formula (IV) to be used is preferably 1-fold mole or more of the theoretical value with respect to one mole of the compound of the general formula (IV), but may be changed depending on the reactivity of the compound of the general formula (IV) and the reaction conditions.

The compound of the general formula (VI) used above can be synthesized as follows. Substituted anilines corresponding to X in the above general formula (VI) (0.95 to 1.1 moles) and 2,4,6-trichloro-S-triazine (cyanuric chloride) (1 mole) are reacted in water for 2 hours to 12 hours under the conditions of pH 3 to 7 and a temperature of 5° C. to 40° C. to thereby obtain a first condensate. When obtaining the compound of the general formula (VI) having the structure in which Y in the formula represents an amino group, the first condensate obtained above and 0.95 moles to 2.0 moles of ammonia are then reacted for 0.5 hours to 12 hours under the conditions of pH 4 to 10 and a temperature of 5° C. to 80° C., thereby obtaining a compound having the structure of the above described general formula (VI). Alternatively, when obtaining the compound of the general formula (VI) having the structure in which Y in the formula represents a hydroxyl group, a hydroxide of an alkali metal such as sodium hydroxide is added to the first condensate obtained above, and reacted for 0.5 hours to 8 hours under the conditions of pH 4 to 10 and a temperature of 5° C. to 80° C., thereby obtaining a compound of the general formula (VI). For adjusting pH at the time of condensation, it is possible to use a hydroxide of an alkali metal such as sodium hydroxide and potassium hydroxide, and a carbonate of an alkali metal such as sodium carbonate and potassium carbonate. Further, the order of condensation can be suitably determined according to the reactivity of each of the compounds.

As described above, a compound of the general formula (I) used in the present invention can be synthesized from the compound of the general formula (IV) and the compound of the general formula (VI) in the presence of ammonia. Accordingly, it is theoretically considered that part of a chlorosulfonyl group in the compound of the general formula (IV) is hydrolyzed by water present in the reaction system, and a compound converted into sulfonic acid of the general formula (IV) is produced as a by-product and mixed into the compound of the general formula (I). However, in a mass spectrometry, it is hard to distinguish an unsubstituted sulfamoyl group from a sulfonic acid group. Therefore, chlorosulfonyl groups in the compound of the general formula (IV) except for those reacted with the compound of the general formula (VI) (organic amine) are all described as those converted into unsubstituted sulfamoyl groups ($-SO_2-NH_2$).

When the compound of the formula (I) is synthesized by the above method, the compounds may include impurities because copper porphyrazine rings (Pz) are connected via bivalent connecting groups (L) to form dimers (Pz-L-Pz) and trimers (Pz-L-Pz-L-Pz) as by-products. The bivalent connecting group (L) in this case includes $-SO_2-$, $-SO_2-$ and $NH-SO_2-$. In the case of a trimer, by-products including a combination of these two Ls may be produced.

The compound of the general formula (I) thus obtained can be taken out from the reaction system by filtration, etc., after performing acid-precipitation or salting-out. Salting-out can be performed under from acidity to alkaline, and further, is preferably carried out in the range of pH 1 to 11. It is also preferable that salting-out is preformed by adding salt, etc., after heating to 40° C. to 80° C., further 50° C. to 70° C.

The compound of the general formula (I) synthesized in the above described method is obtained as a free acid type or a salt type thereof. In order to convert the compound of the general formula (I) into a free acid type, for example, acid-precipitation may be performed. Alternatively, in order to convert the compound of the general formula (I) into a salt type, salting-out may be performed, and in the case where a desired salt cannot be obtained by salting-out, for example, after conversion into a free acid type, a normal salt exchange method of adding desired organic or inorganic base may be utilized.

Preferable specific examples of a compound of the general formula (I) include exemplified compounds I-1 to I-25 shown in the following table 1. In table 1, parts of A, B, C, D, E, X and Y in the general formula (I) are respectively shown. Of course, the present invention is not limited to the following exemplified compounds inasmuch as the structure of the general formula (I) and the definition thereof are satisfied. When A, B, C and D in the general formula (I) represent a pyridine ring, since position isomers of nitrogen atoms are present as described above, a mixture of these position isomers are contained when a compound is synthesized. It is hard to isolate these isomers, and it is also hard to analyze and identify these isomers. Therefore, the compound of the general formula (I) is generally used as a mixture. However, even in a state in which isomers are contained, the effects of the present invention can be obtained without any change, and thus, in the present specification, the isomers are described without being distinguished. Further, in the present invention, when the number of pyridine rings among A, B, C and D in the general formula (I) is preferably 1 to 3, more preferably 1 or 2, the effects of the present invention can be effectively achieved, which is thus particularly preferable. Specifically, among the following exemplified compounds, it is particularly preferable to use the exemplified compounds I-1 to I-3, I-10 to I-12, I-21 to I-23, and I-25.

TABLE 1-1

Exemplified compounds of the general formula (I)

| Exemplified compounds | A | B | C | D | E | X | Y | l | m | n |
|---|---|---|---|---|---|---|---|---|---|---|
| I-1 | 2,3-PD | Bz | Bz | Bz | Et | 2,5-disulfoanilino | $NH_2$ | 0 | 2 | 1 |
| I-2 | 2,3-PD | 2,3-PD | Bz | Bz | Et | 2,5-disulfoanilino | $NH_2$ | 0 | 1 | 1 |
| I-3 | 2,3-PD | Bz | 2,3-PD | Bz | Et | 2,5-disulfoanilino | $NH_2$ | 0 | 1 | 1 |
| I-4 | 2,3-PD | 2,3-PD | 2,3-PD | Bz | Et | 2,5-disulfoanilino | $NH_2$ | 0 | 0 | 1 |
| I-5 | 2,3-PD | Bz | Bz | Bz | Et | 4-sulfoanilino | $NH_2$ | 0 | 2 | 1 |
| I-6 | 2,3-PD | Bz | Bz | Bz | Et | 2,5-disulfoanilino | OH | 0 | 2 | 1 |
| I-7 | 2,3-PD | Bz | Bz | Bz | Et | 3,5-Dicarboxyanilino | $NH_2$ | 0 | 2 | 1 |
| I-8 | 2,3-PD | Bz | Bz | Bz | Pr | 2,5-disulfoanilino | $NH_2$ | 0 | 2 | 1 |
| I-9 | 2,3-PD | Bz | Bz | Bz | Et | 2-carboxy-4-Sulfoanilino | $NH_2$ | 0 | 2 | 1 |
| I-10 | 2,3-PZ | Bz | Bz | Bz | Et | 2,5-disulfoanilino | $NH_2$ | 0 | 2 | 1 |
| I-11 | 2,3-PZ | 2,3-PZ | Bz | Bz | Et | 2,5-disulfoanilino | $NH_2$ | 0 | 1 | 1 |
| I-12 | 2,3-PZ | Bz | 2,3-PZ | Bz | Et | 2,5-disulfoanilino | $NH_2$ | 0 | 1 | 1 |
| I-13 | 2,3-PZ | 2,3-PZ | 2,3-PZ | Bz | Et | 2,5-disulfoanilino | $NH_2$ | 0 | 0 | 1 |

2,3-PD: 2,3-pyrido
2,3-PZ: 2,3-pyrazino
Bz: Benzo
Et: Ethylene
Pr: Propylene

TABLE 1-2

Exemplified compounds of the general formula (I)

| Exemplified compounds | A | B | C | D | E | X | Y | l | m | n |
|---|---|---|---|---|---|---|---|---|---|---|
| I-14 | 2,3-PD | Bz | Bz | Bz | Et | 2-methoxy-5-sulfoanilino | $NH_2$ | 0 | 2 | 1 |
| I-15 | 2,3-PD | Bz | Bz | Bz | Et | 2-nitro-4-Sulfoanilino | $NH_2$ | 0 | 2 | 1 |
| I-16 | 2,3-PD | Bz | Bz | Bz | Et | 2,5-dichloro-4-Sulfoanilino | $NH_2$ | 0 | 2 | 1 |
| I-17 | 2,3-PD | Bz | Bz | Bz | Bt | 2,5-disulfoanilino | $NH_2$ | 0 | 2 | 1 |

TABLE 1-2-continued

Exemplified compounds of the general formula (I)

| Exemplified compounds | A | B | C | D | E | X | Y | l | m | n |
|---|---|---|---|---|---|---|---|---|---|---|
| I-18 | 2,3-PD | Bz | Bz | Bz | Et | 3-carboxy-4-hydroxy-5-sulfoanilino | $NH_2$ | 0 | 2 | 1 |
| I-19 | 2,3-PD | Bz | Bz | Bz | Et | 2-sulfoanilino | OH | 0 | 2 | 1 |
| I-20 | 2,3-PD | Bz | Bz | Bz | Et | 3-sulfoanilino | OH | 0 | 2 | 1 |
| I-21 | 3,4-PD | Bz | Bz | Bz | Et | 2,5-disulfoanilino | $NH_2$ | 0 | 2 | 1 |
| I-22 | 3,4-PD | 3,4-PD | Bz | Bz | Et | 2,5-disulfoanilino | $NH_2$ | 0 | 1 | 1 |
| I-23 | 3,4-PD | Bz | 3,4-PD | Bz | Et | 2,5-disulfoanilino | $NH_2$ | 0 | 1 | 1 |
| I-24 | 3,4-PD | 3,4-PD | 3,4-PD | Bz | Et | 2,5-disulfoanilino | $NH_2$ | 0 | 0 | 1 |
| I-25 | Bz | Bz | Bz | Bz | Et | 2,5-disulfoanilino | $NH_2$ | 1 | 2 | 1 |

2,3-PD: 2,3-pyrido
3,4-PD: 2,3-pyrido
Bz: Benzo
Et: Ethylene
Bt: Butylene (Second Coloring Material: Compound Represented by the General Formula (II))

It is necessary that the ink of the present invention contains a compound of the following general formula (II) as the second coloring material (dye),

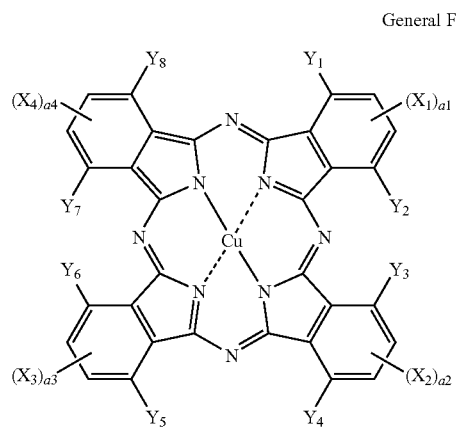

General Formula (II)

wherein $X_1$, $X_2$, $X_3$ and $X_4$ each independently represent —SO-Z, —$SO_2$-Z, —$SO_2NR_1R_2$, a sulfonic acid group, —$CONR_1R_2$, or $CO_2R_1$, where Z's independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, $R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, $Y_1$, $Y_2$, $Y_3$, $Y_4$, $Y_5$, $Y_6$, $Y_7$ and $Y_8$ each independently represent a hydrogen atom, a halogen atom, a substituted or unsubstituted alkyl group, a substituted or unsubstituted aryl group, a cyano group, a substituted or unsubstituted alkoxy group, an amide group, an ureido group, a sulfonamide group, a substituted or unsubstituted carbamoyl group, a substituted or unsubstituted sulfamoyl group, a substituted or unsubstituted alkoxycarbonyl group, a carboxyl group, or a sulfonic acid group, and $a_1$, $a_2$, $a_3$ and $a_4$ represent the numbers of $X_1$, $X_2$, $X_3$ and $X_4$, respectively, and each independently represent an integer of 1 or 2.

In addition, when a coloring material of the general formula (II) is mixed with the coloring material of the above described general formula (I), it is preferable that the mixed coloring materials are in a state of being likely to aggregate, or a state of being likely to associate. For instance, when the surface energy of the coloring material of the general formula (I) and the surface energy of the coloring material of the general formula (II) are closer to each other, it is considered that the above described state is apt to be formed.

$X_1$, $X_2$, $X_3$ and $X_4$ in the general formula (II) each independently represent —SO-Z, —$SO_2$-Z, —$SO_2NR_1R_2$, a sulfonic acid group, —$CONR_1R_2$ or $CO_2R_1$. Among these, —SO-Z, —$SO_2$-Z, —$SO_2NR_1R_2$ and $CONR_1R_2$ are preferable, and further, —$SO_2$-Z and $SO_2NR_1R_2$ are more preferable, and particularly, —$SO_2$-Z is preferable. When any one of $a_1$, $a_2$, $a_3$ and $a_4$ expressing respectively the numbers of $X_1$, $X_2$, $X_3$ and $X_4$ is 2, two of $X_1$, $X_2$, $X_3$ or $X_4$ may be the same or different, and each independently represents any one of the substitutes described above. $X_1$, $X_2$, $X_3$ and $X_4$ are all the same substituents or different substituents. In the case of different substituents, for example, $X_1$, $X_2$, $X_3$ and $X_4$ all represent —$SO_2$-Z, and as in the case where Z's are different, the types of substituents are the same, but partially different substituents may be contained. In addition, for example, as in the case of containing —$SO_2$-Z and —$SO_2NR_1R_2$, substituents different from each other may be contained.

Z's each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Among these, a substituted or unsubstituted alkyl group, a substituted or unsubstituted aryl group, or a substituted or unsubstituted heterocyclic group is preferable, and further, a substituted alkyl group, a substituted aryl group, or a substituted heterocyclic group is more preferable.

$R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Among these, a hydrogen atom, a substituted or unsubstituted alkyl group, a substituted or unsubstituted aryl group, or a substituted or unsubstituted heterocyclic group is preferable, and further, a hydrogen atom, a substituted alkyl group, a substituted aryl group, or a substituted heterocyclic group is more preferable. However, it is not preferable that both $R_1$ and $R_2$ are hydrogen atoms.

$R_1$, $R_2$ and Z in the general formula (II) are more specifically described below. The number of carbon atoms in each of the groups described in the following does not include the number of carbon atoms in substituents.

Examples of an alkyl group include substituted or unsubstituted alkyl groups having 1 to 30 carbon atoms. Among these, from the viewpoints of solubility of a coloring material and stability of an ink, a branched alkyl group is preferable, and an alkyl group having asymmetric carbon atoms (used as a racemic body) is particularly preferable. An alkyl group may further have a substituent, and specific examples of the substituent are the same as those of a substituent in the case where Z, $R_1$, $R_2$, and $Y_1$ to $Y_8$ described later can further have a substituent. Among these, a hydroxyl group, an ether group, an ester group, a cyano group, an amide group, or a sulfonamide group is particularly preferable because these groups can enhance the association property of a coloring material, and improve fastness. Moreover, an alkyl group may have a halogen atom and an ionic hydrophilic group.

Examples of a cycloalkyl group include substituted or unsubstituted cycloalkyl groups having 5 to 30 carbon atoms. Among these, from the viewpoints of solubility of a coloring material and stability of an ink, a cycloalkyl group having asymmetric carbon atoms (used as a racemic body) is particularly preferable. A cycloalkyl group may further have a substituent, and specific examples of the substituent are the same as those of a substituent in the case where Z, $R_1$, $R_2$, and $Y_1$ to $Y_8$ described later can further have a substituent. Among these, a hydroxyl group, an ether group, an ester group, a cyano group, an amide group, or a sulfonamide group is particularly preferable because these groups can enhance the association property of a coloring material, and improve fastness. Moreover, a cycloalkyl group may have a halogen atom and an ionic hydrophilic group.

Examples of an alkenyl group include substituted or unsubstituted alkenyl groups having 2 to 30 carbon atoms. Among these, from the viewpoints of solubility of a coloring material and stability of an ink, a branched alkenyl group is preferable, and an alkenyl group having asymmetric carbon atoms (used as a racemic body) is particularly preferable. An alkenyl group may further have a substituent, and specific examples of the substituent are the same as those of a substituent in the case where Z, $R_1$, $R_2$, $Y_1$ to $Y_8$ described later can further have a substituent. Among these, a hydroxyl group, an ether group, an ester group, a cyano group, an amide group, or a sulfonamide group is particularly preferable because these groups can enhance the association property of a coloring material, and improve fastness. Moreover, an alkenyl group may have a halogen atom and an ionic hydrophilic group.

Examples of an aralkyl group include substituted or unsubstituted aralkyl groups having 7 to 30 carbon atoms. Among these, from the viewpoints of solubility of a coloring material and stability of an ink, a branched aralkyl group is preferable, and an aralkyl group having asymmetric carbon atoms (used as a racemic body) is particularly preferable. An aralkyl group may further have a substituent, and specific examples of the substituent are the same as those of a substituent in the case where Z, $R_1$, $R_2$, and $Y_1$ to $Y_8$ described later can further have a substituent. Among these, a hydroxyl group, an ether group, an ester group, a cyano group, an amide group, or a sulfonamide group is particularly preferable because these groups can enhance the association property of a coloring material, and improve fastness. Moreover, an aralkyl group may have a halogen atom and an ionic hydrophilic group.

Examples of an aryl group include substituted or unsubstituted aryl groups having 6 to 30 carbon atoms. An aryl group may further have a substituent, and specific examples of the substituent are the same as those of a substituent in the case where Z, $R_1$, $R_2$, and $Y_1$ to $Y_8$ described later can further have a substituent. Among these, an electron withdrawing group is particularly preferable because fastness can be improved if an oxidation electric potential of a coloring material is noble. Examples of an electron withdrawing group include those having Hammett's substituent constants, σp values, of positive numbers. Among these, the following is preferable: a halogen atom, a heterocyclic group, cyano group, a carboxyl group, an acylamino group, a sulfonamide group, a sulfamoyl group, a carbamoyl group, a sulfonyl group, an imido group, an acyl group, a sulfonic acid group, or a quaternary ammonium group. Further, the following is particularly preferable: a cyano group, a carboxyl group, a sulfamoyl group, a carbamoyl group, a sulfonyl group, an imido group, an acyl group, a sulfonic acid group, or a quaternary ammonium group.

A heterocyclic group is a 5-membered or 6-membered ring, which is a substituted or unsubstituted, and aromatic or nonaromatic heterocyclic ring, and whose rings may be condensed. Specific examples in the case where $R_1$, $R_2$ and Z are heterocyclic groups are described below as heterocyclic rings in which substitution positions are omitted. The substitution positions are not limited to the following description, and for example, in the case of pyridine, it may be substituted at the 2-, 3-, and 4-positions. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiphene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidazolizine, and thiazoline. Among these, aromatic heterocyclic groups are preferable. Further, the following is particularly preferable: pyridine, pyrazine, pyrimidine, pyridazine, triazine, pyrazole, imidazole, benzimidazole, triazole, thiazole, benzothiazole, isothiazole, benzisothiazole, and thiadiazole.

These heterocyclic groups may further have substituents, and specific examples of the substituent are the same as those of a substituent in the case where Z, $R_1$, $R_2$, and $Y_1$ to $Y_8$ described later can further have a substituent. Among these, an electron withdrawing group is particularly preferable because fastness can be improved if an oxidation electric potential of a coloring material is noble. Examples of an electron withdrawing group include those having Hammett's substituent constants, σp values, of positive numbers. Among these, the following is preferable: a halogen atom, a heterocyclic group, a cyano group, a carboxyl group, an acylamino group, a sulfonamide group, a sulfamoyl group, a carbamoyl group, a sulfonyl group, an imido group, an acyl group, a sulfonic acid group, or a quaternary ammonium group. Further, the following is particularly preferable:s a cyano group, a carboxyl group, a sulfamoyl group, a carbamoyl group, a sulfonyl group, an imido group, an acyl group, a sulfonic group, or a quaternary ammonium group.

$Y_1, Y_2, Y_3, Y_4, Y_5, Y_6, Y_7$ and $Y_8$ in the general formula (II) each independently represent a hydrogen atom, a halogen atom, a substituted or unsubstituted alkyl group, a substituted or unsubstituted aryl group, cyano group, a substituted or unsubstituted alkoxy group, an amide group, ureido group, a sulfonamide group, a substituted or unsubstituted carbamoyl group, a substituted or unsubstituted sulfamoyl group, a substituted or unsubstituted alkoxycarbonyl group, a carboxyl group, or a sulfonic acid group. Among these, a hydrogen atom, a halogen atom, a cyano group, a carboxyl group, or a sulfonic acid group is preferable, and further, a hydrogen atom is particularly preferable.

$Y_1, Y_2, Y_3, Y_4, Y_5, Y_6, Y_7$ and $Y_8$ in the general formula (II) are more specifically described below. The number of carbon atoms in each of the groups described in the following does not include the number of carbon atoms in substituents.

Examples of a halogen atom include a chlorine atom, a bromine atom, and an iodine atom, and among these, a chlorine atom or a bromine atom is preferable, and a chlorine atom is particularly preferable.

Examples of an alkyl group include substituted or unsubstituted alkyl groups having 1 to 30 carbon atoms. Specific examples include methyl, ethyl, butyl, t-butyl, n-octyl, eicosyl, 2-chloroethyl, hydroxyethyl, cyanoethyl, and 4-sulfobutyl.

Examples of an aryl group include substituted or unsubstituted aryl groups having 6 to 30 carbon atoms. Specific examples include phenyl, p-tolyl, naphthyl, m-chlorophenyl, and o-hexadecanoylaminophenyl.

Examples of an alkoxyl group include substituted or unsubstituted alkoxyl groups having 1 to 30 carbon atoms. Specific examples include methoxy, ethoxy, isopropoxy, n-octyloxy, methoxyethoxy, hydroxyethoxy, and 3-carboxypropoxy.

Examples of a carbamoyl group include substituted or unsubstituted carbamoyl groups having 1 to 30 carbon atoms. Specific examples include carbamoyl, N-methylcarbamoyl, N,N-dimethylcarbamoyl, N,N-di-n-octylcarbamoyl, and N-(methylsulfonyl)carbamoyl.

Examples of a sulfamoyl group include substituted or unsubstituted sulfamoyl groups having 1 to 30 carbon atoms. Specific examples include N-methylsulfamoyl, N-(3-dodecyloxypropyl)sulfamoyl, N,N-dimethylsulfamoyl, N-acetylsulfamoyl, N-benzoylsulfamoyl, and N—(N'-phenylcarbamoyl)sulfamoyl.

Examples of an alkoxycarbonyl group include substituted or unsubstituted alkoxycarbonyl groups having 2 to 30 carbon atoms. Specific examples include methoxycarbonyl, ethoxycarbonyl, t-butoxycarbonyl, and n-octadecyloxycarbonyl.

When Z, $R_1$, $R_2$, and $Y_1$ to $Y_8$ are groups capable of further having substituents, they may further have substituents described in the following. Examples of substituents in this case include a straight chain or branched chain alkyl group having 1 to 12 carbon atoms, a straight chain or branched chain aralkyl group having 7 to 18 carbon atoms, a straight chain or branched chain alkenyl group having 2 to 12 carbon atoms, a straight chain or branched chain alkynyl group having 2 to 12 carbon atoms, a straight chain or branched chain cycloalkyl group having 3 to 12 carbon atoms, and a straight chain or branched chain cycloalkenyl group having 3 to 12 carbon atoms. These substituents are preferably branched, and further particularly preferably have asymmetric carbon atoms from the viewpoints of solubility of a coloring material and stability of an ink.

Specific examples of the substituent include: substituted or unsubstituted alkyl groups such as methyl, ethyl, propyl, isopropyl, sec-butyl, t-butyl, 2-ethylhexyl, 2-methylsulfonylethyl, 3-phenoxypropyl, trifluoromethyl, and cyclopentyl; halogen atoms such as a chlorine atom and a bromine atom; aryl groups such as phenyl, 4-t-butylphenyl, and 2,4-di-t-amylphenyl; heterocyclic groups such as imidazolyl, pyrazolyl, triazolyl, 2-furyl, 2-thienyl, 2-pyrimidinyl, and 2-benzothiazolyl; a cyano group; a hydroxyl group; a nitro group; a carboxyl group; an amino group; alkyloxy groups such as methoxy, ethoxy, 2-methoxyethoxy, and 2-methane sulfonyl ethoxy; aryloxy groups such as phenoxy, 2-methylphenoxy, 4-t-butylphenoxy, 3-nitrophenoxy, 3-t-butyloxycarbamoylphenoxy, and 3-methoxycarbamoyl; acylamino groups such as acetoamide, benzamide, and 4-(3-t-butyl-4-hydroxyphenoxy) butaneamide; alkylamino groups such as methylamino, butylamino, diethylamino, and methylbutylamino; anilino groups such as phenylamino, and 2-chloroanilino; ureido groups such as phenylureido, methylureido, and N,N-dibutylureido; sulfamoylamino groups such as N,N-dipropylsulfamoylamino; alkylthio groups such as methylthio, octylthio, and 2-phenoxyethylthio; arylthio groups such as phenylthio, 2-buthoxy-5-t-octylphenylthio, and 2-carboxyphenylthio; alkyloxycarbonylamino groups such as methoxycarbonylamino; sulfonamide groups such as methanesulfonamide, benzenesulfonamide, and p-toluenesulfonamide; carbamoyl groups such as N-ethylcarbamoyl and N,N-dibutylcarbamoyl; sulfamoyl groups such as N-ethylsulfamoyl, N,N-dipropylsulfamoyl, and N-phenylsulfamoyl; sulfonyl groups such as methanesulfonyl, octanesulfonyl, benzenesulfonyl, and toluenesulfonyl; alkyloxycarbonyl groups such as methoxycarbonyl and butyloxycarbonyl; heterocyclicoxy groups such as 1-phenyltetrazole-5-oxy, and 2-tetrahydropyranyloxy; azo groups such as phenylazo, 4-methoxyphenylazo, 4-pivaloylaminophenylazo, and 2-hydroxy-4-propanoylphenylazo; acyloxy groups such as acetoxy; carbamoyloxy groups such as N-methylcarbamoyloxy and N-phenylcarbamoyloxy; silyloxy groups such as trimethylsilyloxy and dibutylmethylsilyloxy; aryloxycarbonylamino groups such as phenoxycarbonylamino; imido groups such as N-succinimide and N-phthalimido; heterocyclicthio groups such as 2-benzothiazolylthio, 2,4-di-phenoxy-1,3,5-triazole-6-thio, and 2-pyridylthio; sulfinyl groups such as 3-phenoxypropylsulfinyl; phosphonyl groups such as phenoxyphosphonyl, octyoxyphosphonyl, and phenylphosphonyl; aryloxycarbonyl groups such as phenoxycarbonyl; acyl groups such as acetyl, 3-phenylpropanoyl, and benzoyl; and ionic hydrophilic groups such as carboxyl group, sulfo group, phosphono group, and quaternary ammonium group. It is preferable that at least 2 of ionic hydrophilic groups in the general formula (II) are present in one molecule, and further, it is particularly preferable that at least 2 of sulfonic acid groups and/or carboxyl groups are present in one molecule.

$a_1, a_2, a_3$ and $a_4$ represent the numbers of $X_1$ to $X_8$, respectively. $a_1, a_2, a_3$ and $a_4$ each independently represent an integer of 1 or 2. When at least one of $a_1, a_2, a_3$ and $a_4$ is 2, at least one of $X_1, X_2, X_3$ and $X_4$ is present in a plural number. In this case, substituents present in a plural number may be the same or different. In the present invention, it is particularly preferable that $a_1, a_2, a_3$ and $a_4$ represent 1.

In the compound of the general formula (II), phthalocyanine rings (Pc) may be connected via a bivalent connecting group (L) to form a dimmer (Pc-Cu-L-Cu-Pc) or a trimer (Pc-Cu-L-Cu-L-Cu-Pc). L is a bivalent connecting group, and is preferably an oxy group (—O—), a thio group (—S—), a carbonyl group (—CO—), a sulfonyl group (—$SO_2$—), an imino group (—NH—), a methylene group (—$CH_2$—), or a combination thereof.

In the present invention, at least one substituent of the substituents in the general formula (II) is preferably a substituent described above, and further, two or more substituents are preferably the substituents described above, and particularly, all substituents are preferably the substituents described above. It is preferable that the compound of the general formula (II) has water solubility, and in this case, a substituent in the general formula (II) preferably contains an ionic hydrophilic group. Examples of an ionic hydrophilic group include a sulfonic acid group, a carboxyl group, a phosphono group, and a quaternary ammonium group, and among these, a carboxyl group, a phosphono group, or a sulfonic acid group is preferable, and further, a carboxyl group or a sulfonic acid group is particularly preferable. A carboxyl group, a phosphono group, and a sulfonic acid group may be in the form of a salt, and for instance, examples of a counter ion forming a salt include an alkali metal ion, an ammonium ion, and an organic cation. Examples of an alkali metal ion include a lithium ion, a sodium ion, and a potassium ion. Examples of an organic cation include a tetramethyl ammonium ion, a tetramethylguanidium ion, and tetramethylphosphonium. Among these, an alkali metal salt is preferable, and a lithium salt is particularly preferable from the viewpoints of solubility of a coloring material and solubility of an ink.

In the present invention, the compound of the general formula (II) is used in combination with the compound of the general formula (I) described above. Therefore, the compound of the general formula (II) particularly preferably has a moiety capable of forming a hydrogen bond with the compound of the general formula (I), for example, a hydroxyl group, in a sate of being mixed with the compound of the general formula (I).

Further, it is preferable that the compound of the general formula (II) is made up by introducing at least one electron withdrawing group such as a sulfinyl group, a sulfonyl group, and a sulfamoyl group into each of four benzene rings in a phthalocyanine skeleton. Furthermore, it is particularly preferable that the compound of the general formula (II) has such a structure that the total Hammett's substituent constants, σp values, of all of the above described electron withdrawing groups substituted in the phthalocyanine skeleton of the general formula (II) is 1.60 or more.

Herein, the Hammett equation and Hammett's substituent constant, σp value (hereinafter, referred to as a Hammett's σp value) will be described. The Hammett equation is an empirical rule proposed by L. P. Hammett in 1935 to quantitatively discuss an influence of a substituent exerted on a reaction and equilibrium of a benzene derivative, and nowadays, its validity has been widely recognized. Substitution constants found by the Hammett equation include a σp value and a am value, and these values are described in many general scientific articles. There are specific descriptions in, for example, Lange's Handbook of Chemistry edited by J. A. Dean, 12th edition, 1979, McGraw-Hill, and Region of Chemistry, extra number, No. 122, pp 96-103, 1979, Nankodo Co., Ltd.

In the present invention, each substituent is defined by the Hammett's σp value. However, the present invention is not limited to only substituents whose σp values are specifically described in the documents as described above. Even substituents whose σp values are not described in the aforementioned documents are included in the present invention, if, when σp values are calculated based on the Hammett equation, they are considered to fall within the range. In the following, specific examples of a substituent usable as an electron withdrawing group whose Hammett's σp value is a positive value in a compound of the general formula (II) in the present invention are shown along with their Hammett's σp values.

Examples of an electron withdrawing group having a Hammett's σp value of 0.60 or more include a cyano group, a nitro group, an alkylsulfonyl group such as a methanesulfonyl group, and an arylsulfonyl group such as a benzenesulfonyl group.

Examples of an electron withdrawing group having a Hammett's σp value of 0.45 or more include, in addition to the above described groups, an acyl group (e.g. acetyl group), an alkoxycarbonyl group (e.g. dodecyloxycarbonyl group), an aryloxycarbonyl group (e.g. m-chlorophenoxycarbonyl group), an alkylsulfinyl group (e.g. n-propylsulfinyl group), an arylsulfinyl group (e.g. phenylsulfinyl group), a sulfamoyl group (e.g. N-ethylsulfamoyl group, and N,N-dimethylsulfamoyl group), and a halogenated alkyl group (e.g. trifluoromethyl group).

Examples of an electron withdrawing group having a Hammett's σp value of 0.30 or more include, in addition to the above described groups, an acyloxy group (e.g. acetoxy group), a carbamoyl group (e.g. N-ethylcarbamoyl group, N,N-dibutylcarbamoyl group), a halogenated alkoxy group (e.g. trifloromethyloxy group), a halogenated aryloxy group (e.g. pentaflorophenyloxy group), a sulfonyloxy group (e.g. methylsulfonyloxy group), a halogenated alkylthio group (e.g. difloromethylthio group), and a heterocyclic ring (e.g. 2-benzooxazolyl group, 2-benzothiazolyl group, and 1-phenyl-2-benzimidazolyl group). In addition, an aryl group substituted with 2 or more electron withdrawing groups having a σp value of 0.15 or more may be cited.

Examples of an electron withdrawing group having a Hammett's σp value of 0.20 or more include, in addition to the above described groups, halogen atoms (e.g. fluorine atom, chlorine atom, bromine atom).

Herein, the α-position and the β-position in a phthalocyanine compound will be described with reference to the following structural formula. The α-position indicates the 1-position and/or the 4-position, the 5-position and/or the 8-position, the 9-position and/or the 12-position, and the 13-position and/or the 16-position, and an α-position substitution-type phthalocyanine compound refers to a phthalocyanine compound having one specific substituent in at least one of these positions. The β-position indicates at least one of the 2-position and/or the 3-position, the 6-position and/or the 7-position, the 10-position and/or the 11-position, and the 14-position and/or the 15-position, and a β-position substitution-type phthalocyanine compound refers to a phthalocyanine compound having one specific substituent in at least one of these positions. Specifically, a compound of the general formula (II) is a phthalocyanine compound in which $X_1$, $X_2$, $X_3$ and $X_4$ are substituted at α position, and $Y_1$, $Y_2$, $Y_3$, $Y_4$, $Y_5$, $Y_6$, $Y_7$ and $Y_8$ are substituted at β position, respectively.

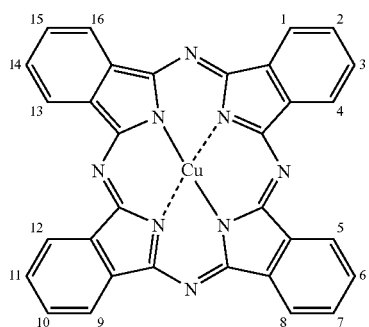

As described above, when a large number of electron withdrawing groups such as a sulfamoyl group are introduced into a phthalocyanine skeleton, an oxidation electric potential is nobler, and ozone resistance of an image formed by an ink can be improved. However, when synthesis is performed by the above described method, the number of electron withdrawing groups is small, that is to say, it is inevitable that a phthalocyanine compound whose oxidation electric potential is more ignoble is included therein. Accordingly, in order to improve ozone resistance of an image formed by an ink, it is particularly preferable to perform synthesis by such a method as to suppress production of a phthalocyanine compound whose oxidation electric potential is more ignoble.

The compound of the general formula (II) can be synthesized by, for example, the following two synthesis flows. The compound of the general formula (II) (β-position substitution-type) can be synthesized by reacting a phthalonitrile derivative and/or a diiminoisoindoline derivative with a copper derivative. The compound of the general formula (II) (β-position substitution-type) can be synthesized from a tetrasulfophthalocyanine compound obtained by reacting a 4-sulfophthalonitrile derivative with a copper derivative.

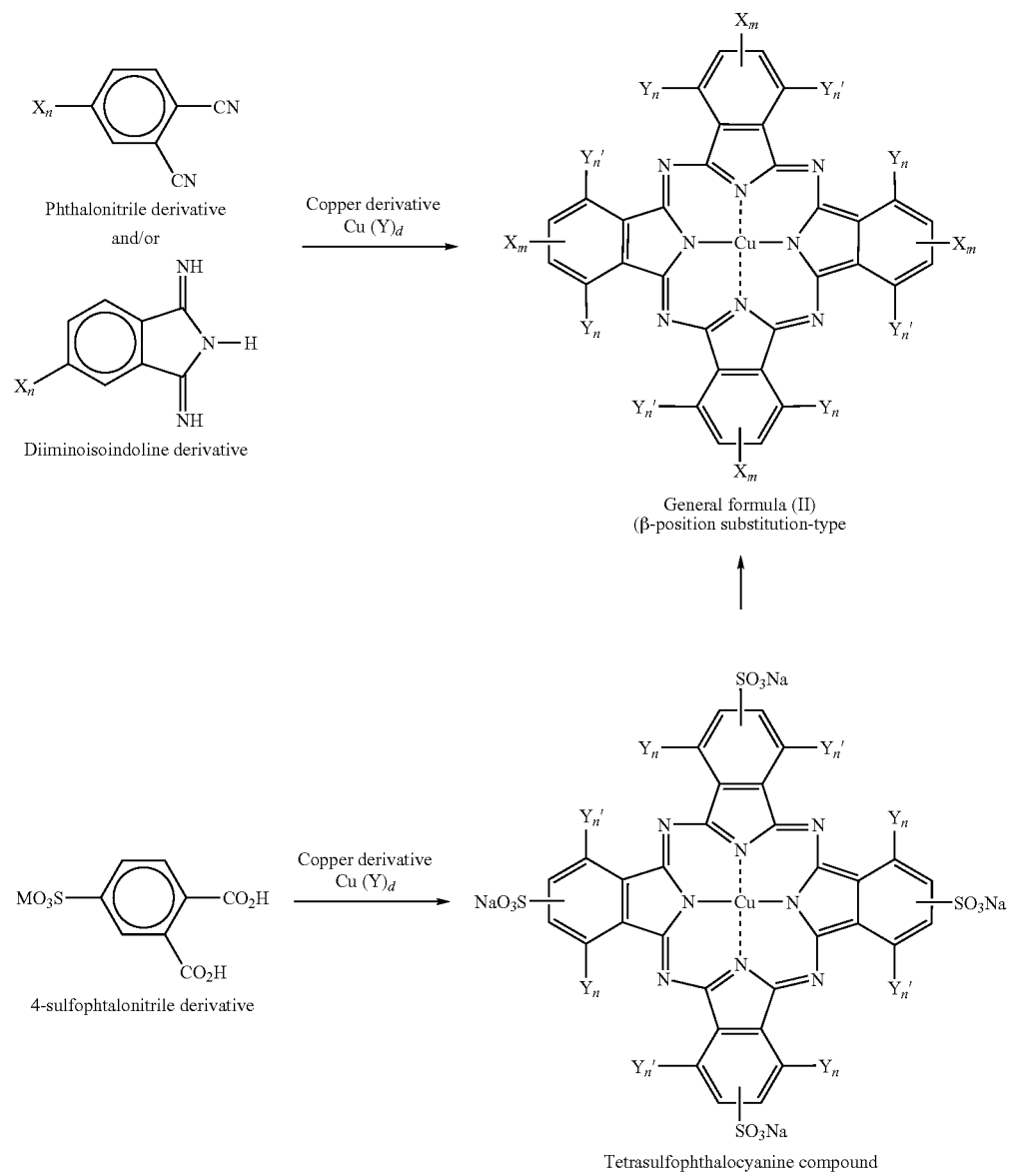

In the above described synthesis flow, $X_m$ corresponds to $X_1$, $X_2$, $X_3$ or $X_4$ in the general formula (II). Further, $Y_n$ corresponds to $Y_1$, $Y_3$, $Y_5$ or $Y_7$ in the general formula (II), and $Y_{n'}$ corresponds to $Y_2$, $Y_4$, $Y_6$ or $Y_8$ in the general formula (II). M in a 4-sulfophthalonitrile derivative represents a cation, and specifically includes alkali metal ions such as Li, Na, and K, or organic cations such as a triethyl ammonium ion, and a pyridinium ion. Y in a copper derivative $(Cu(Y)_d)$ represents a monovalent or bivalent ligand, and specifically includes a halogen atom, an acetic acid anion, acetyl acetonate, and oxygen, and d represents an integer of 1 to 4.

According to the synthesis flows described above, the desired number of desired substituents can be introduced into a copper phthalocyanine skeleton. Particularly, as in the present invention, when a large number of electron withdrawing groups are intended to be introduced into a copper phthalocyanine skeleton in order to make oxidation electric potential noble, the above described flows are significantly effective.

Preferable specific examples of a compound of the general formula (II) include the following exemplified compounds II-1 to II-102. As a matter of course, the examples are not limited to the following exemplified compounds as long as the structure and definition thereof are included in the general formula (II). In the present invention, among the following exemplified compounds, it is preferable to use an exemplified compound having a hydroxyl group. It is particularly preferable to use the exemplified compound II-66.

Exemplified Compound II-1

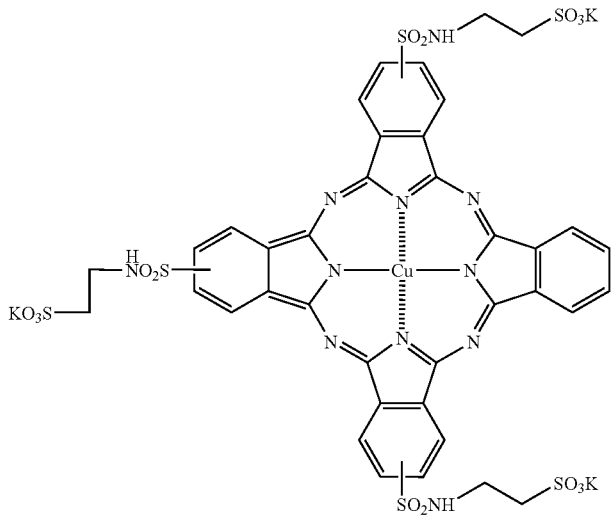

Exemplified Compound II-2

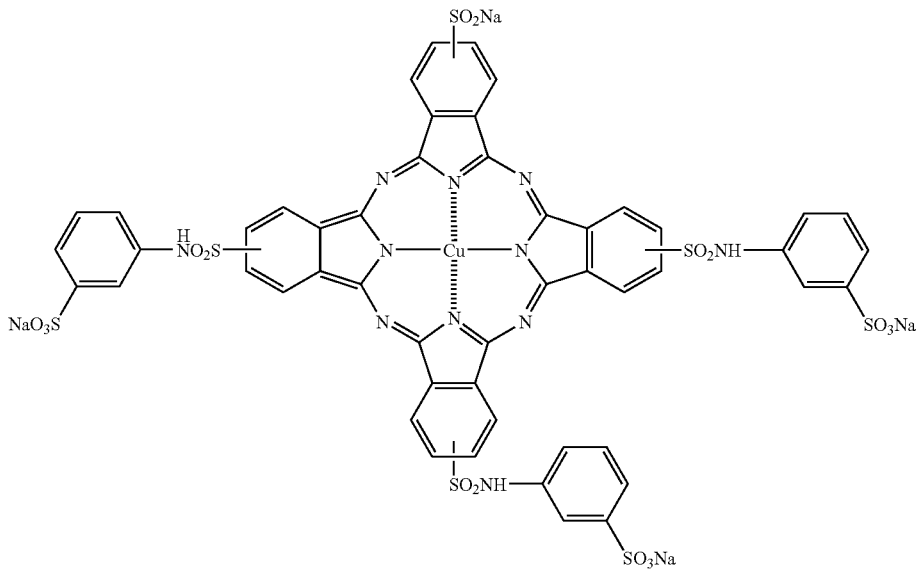

-continued
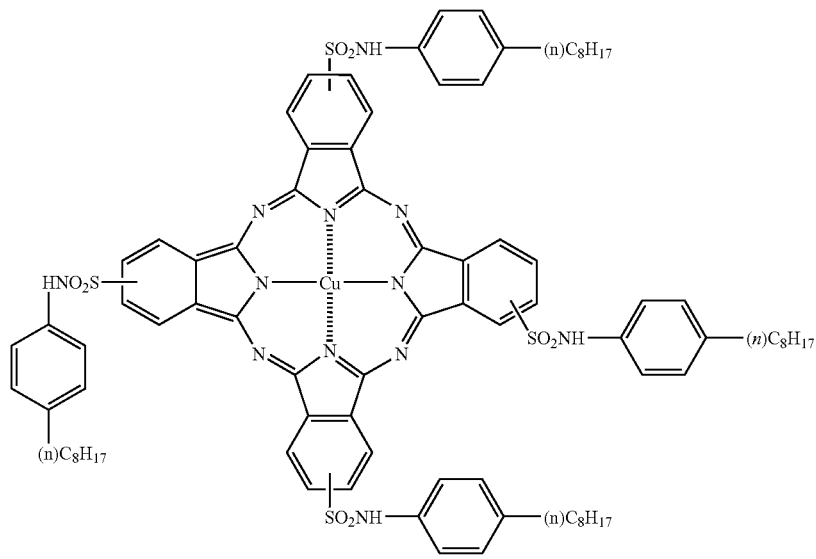
Exemplified Compound II-3
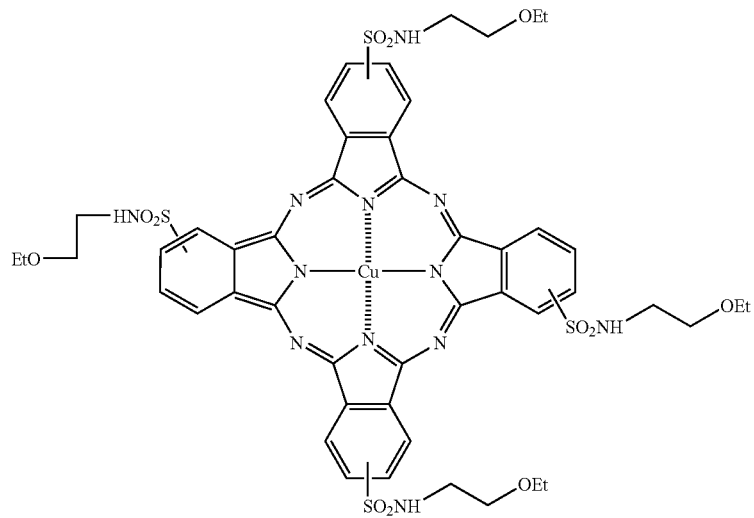
Exemplified Compound II-4

Exemplified Compound II-5
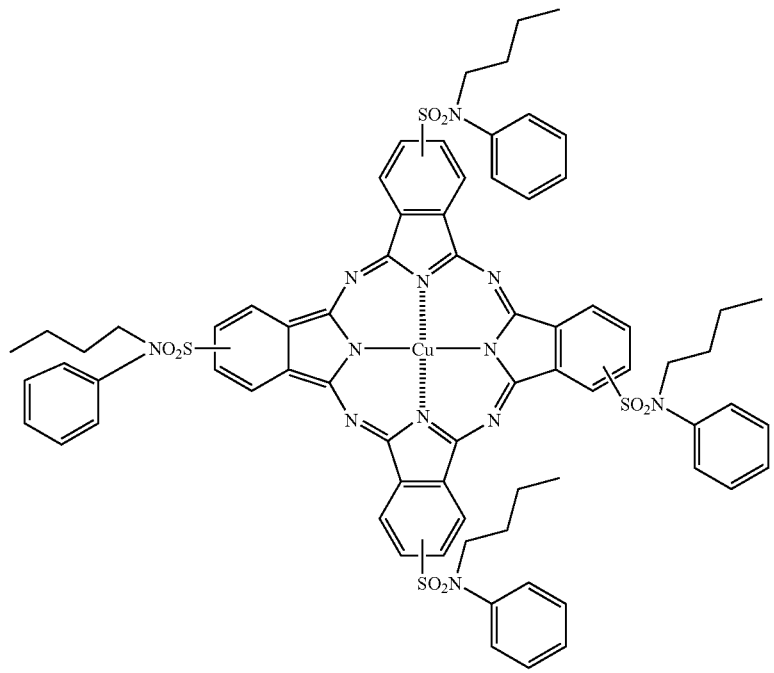
Exemplified Compound II-6
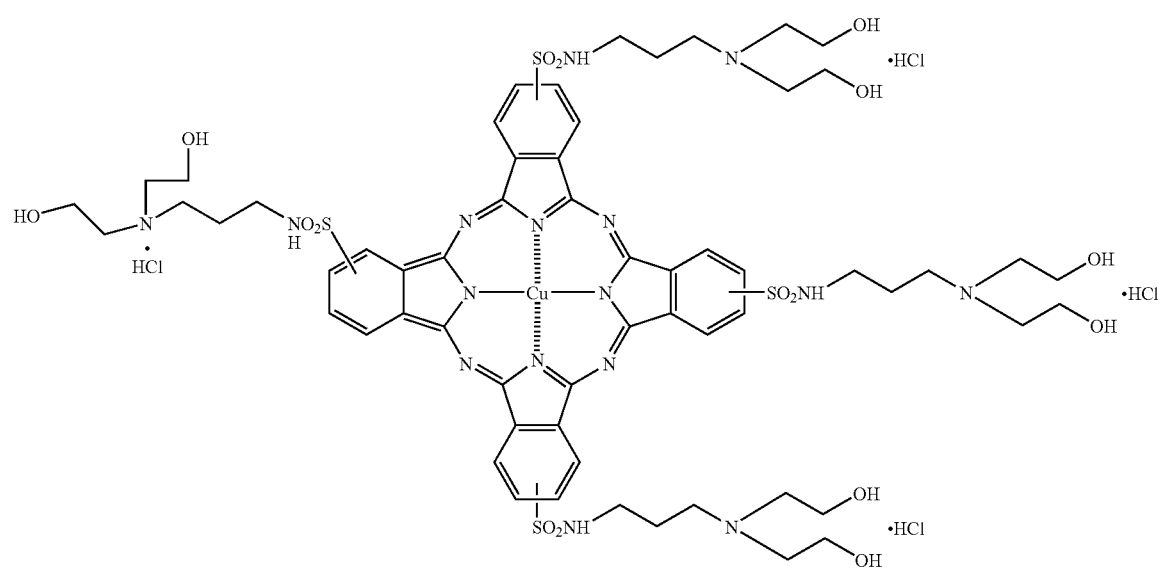

Exemplified Compound II-7
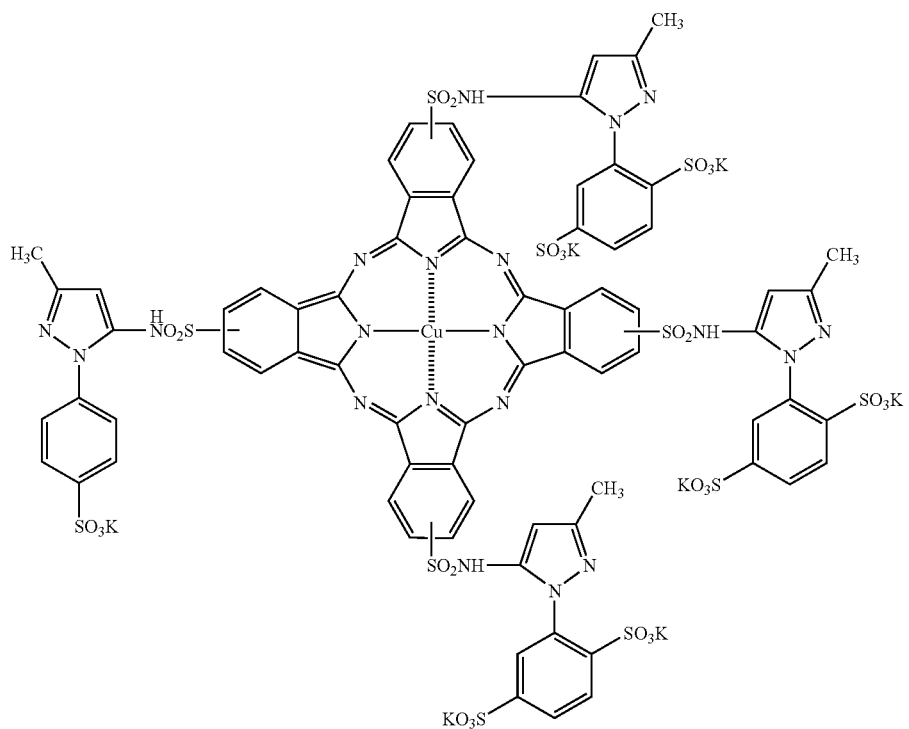
Exemplified Compound II-8
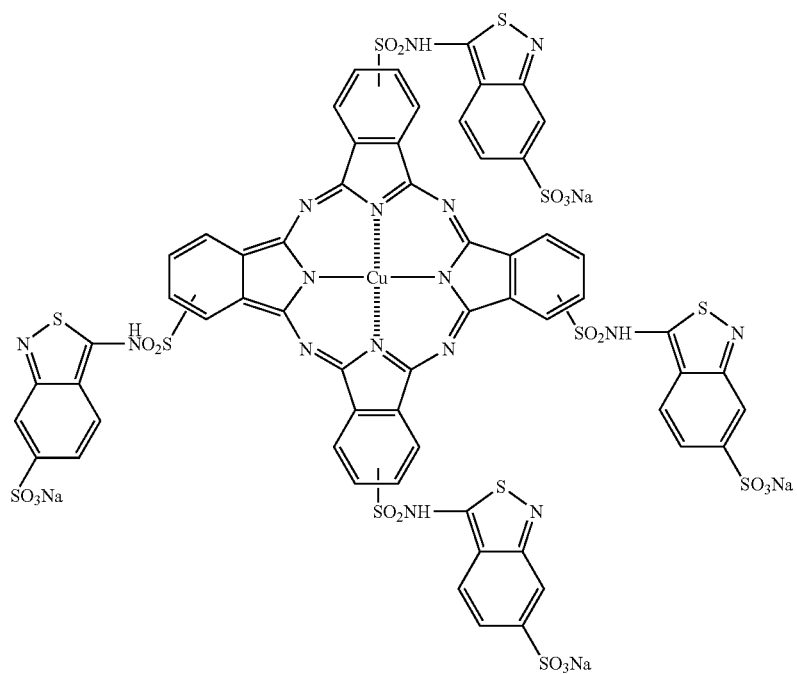

-continued
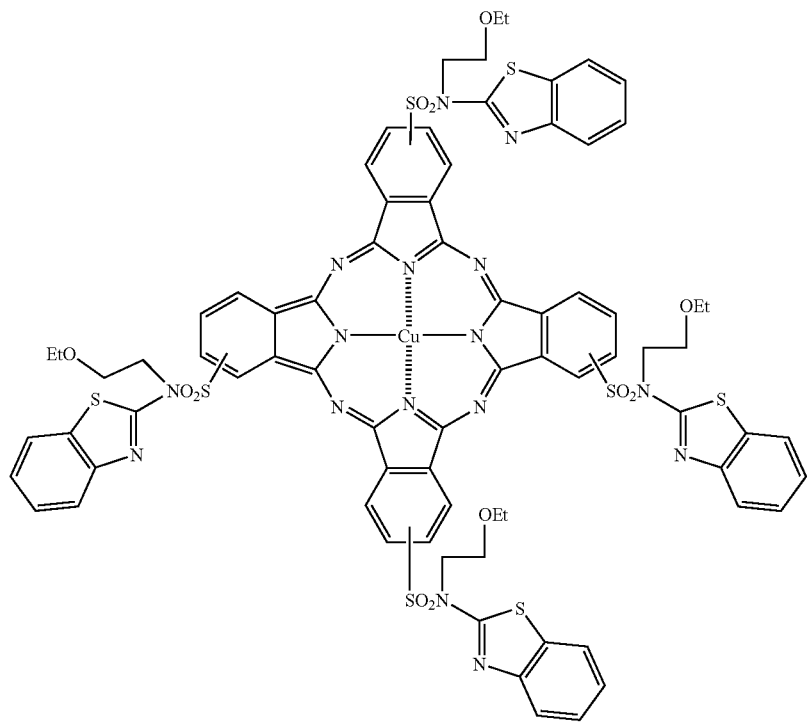
Exemplified Compound II-9
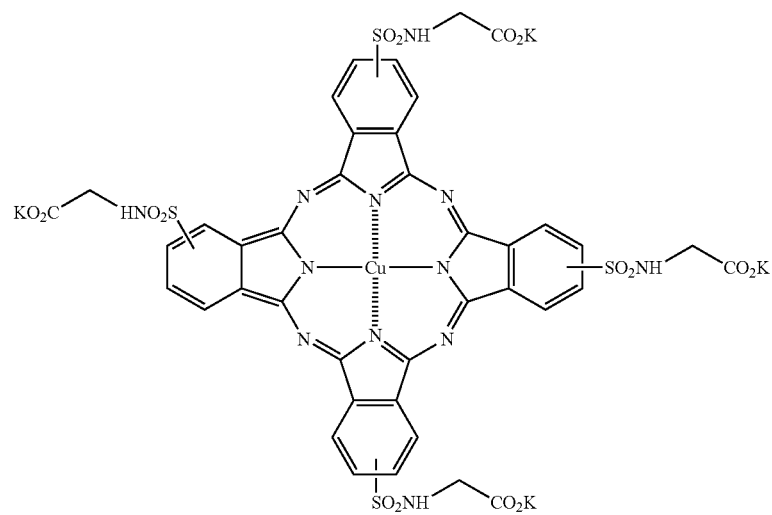
Exemplified Compound II-10

Exemplified Compound II-11
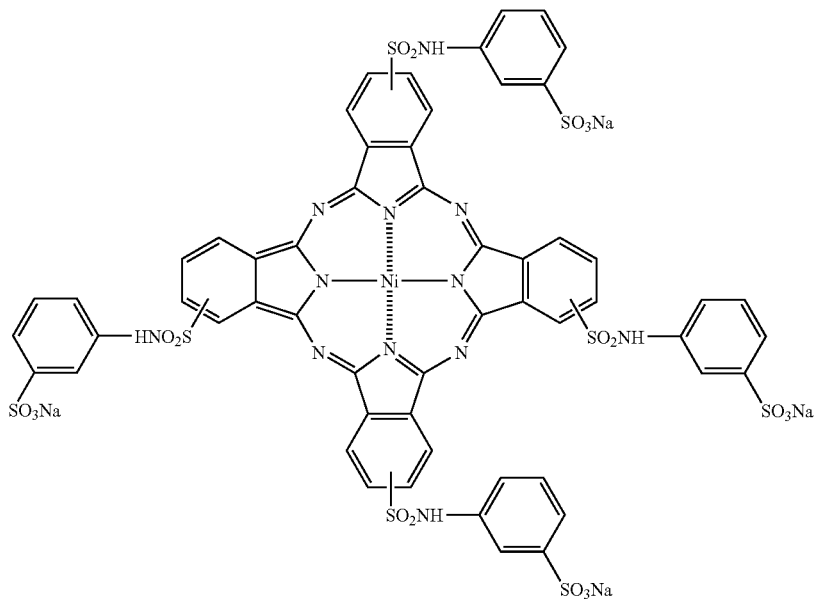
Exemplified Compound II-12
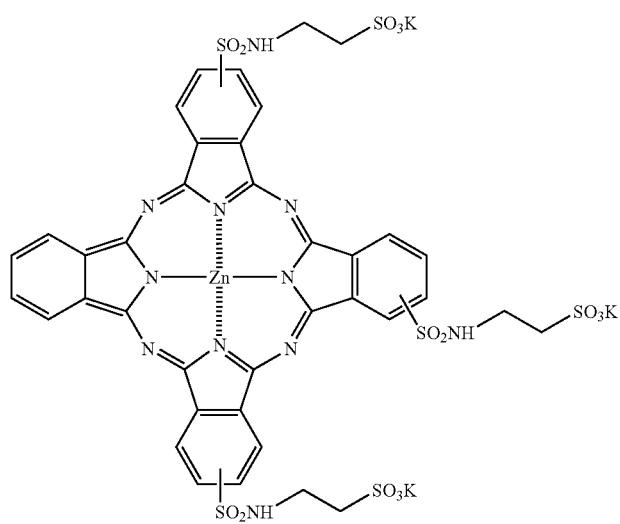

The exemplified compounds II-13 to II-57 are shown in the following table, and a group of $X_m$ and a group of ($Y_n$ and $Y_{n'}$) in the table represent respective substituents in the following general formula included in the general formula (II). These groups are each independently in random order in the general formula:

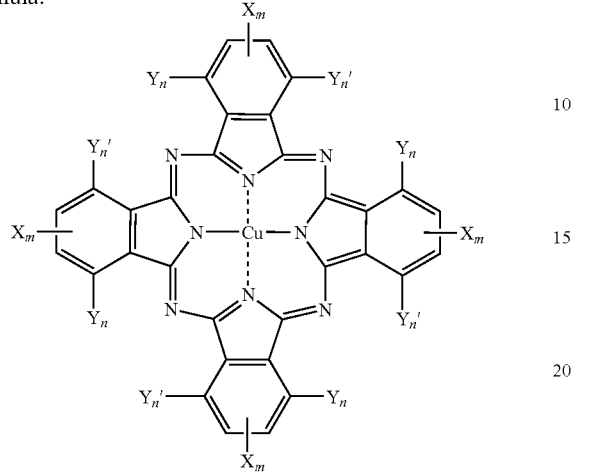

TABLE 2-1

Exemplified compounds of the general formula (II)

| Exemplified Compounds | Group of Xm | | Group of Yn and Yn' | |
|---|---|---|---|---|
| II-13 | —SO$_2$—NH—CH$_2$—CH$_2$—SO$_3$Li | —H | —H, —H |
| II-14 | —SO$_2$—NH—CH$_2$—CH(OH)—CO—NH—CH$_2$CH$_2$—SO$_3$Na | —H | —Cl, —H |
| II-15 | —SO$_2$—NH—CH$_2$—CH$_2$—CH$_2$—SO$_2$NH—CH$_2$CH(OH)—SO$_3$Li | —H | —H, —H |
| II-16 | —SO$_2$—NH—C$_6$H$_4$—SO$_2$NH—CH$_2$CH$_2$—SO$_3$Li | —H | —H, —H |
| II-17 | —SO$_2$—NH—CH$_2$—CH$_2$—CO—NH—CH(CH$_2$—COONa)—COONa | —H | —Cl, —H |
| II-18 | —SO$_2$—NH—CH$_2$—CH$_2$—SO$_2$—NH—CH$_2$—COONa | —CN | —H, —H |
| II-19 | —SO$_2$—CH$_2$—CH$_2$—CH$_2$—SO$_2$—NH—CH(CH$_2$—OH)—COOLi | —H | —H, —H |
| II-20 | —SO$_2$—CH$_2$—CH$_2$—CH$_2$—SO$_3$Li | —H | —H, —H |
| II-21 | —SO$_2$—CH$_2$—CH$_2$—CH$_2$—SO$_3$K | —H | —H, —H |
| II-22 | —SO$_2$—(CH$_2$)$_3$—CO$_2$K | —H | —H, —H |
| II-23 | —SO$_2$—NH—CH$_2$—CH$_2$—CH$_2$—SO$_2$—NH—CH$_2$CH(OH)—CH$_2$—SO$_3$Li | —H | —H, —H |
| II-24 | —SO$_2$—NH—CH$_2$—CH$_2$—CH$_2$—SO$_2$NH—CH$_2$—CH(OH)—CH$_3$ | —SO$_3$Li | —H, —H |
| II-25 | —SO$_2$—CH$_2$—CH(OH)—CH$_2$SO$_3$K | —H | —H, —H |

TABLE 2-1-continued

Exemplified compounds of the general formula (II)

| Exemplified Compounds | Group of Xm | | Group of Yn and Yn' |
|---|---|---|---|
| II-26 | —SO$_2$—CH$_2$—CH(OH)—CH$_3$ | —SO$_3$Li | —H, —H |
| II-27 | —SO$_2$NH(CH$_2$)$_3$N$^{\oplus}$(CH$_3$)(CH$_2$CH$_2$OH)$_2$   CH$_3$—C$_6$H$_4$—SO$_3^{\ominus}$ | —H | —H, —H |
| II-28 | —CO—NH—CH$_2$—CH(OH)—CH$_2$SO$_3$K | —H | —H, —H |
| II-29 | —CO—NH—CH(COOLi)—CH$_2$CH$_2$SO$_3$Li | —H | —H, —H |
| II-30 | —SO$_2$CH$_2$CH$_2$CH(CH$_3$)(SO$_3$Li) | —H | —H, —H |

TABLE 2-2

Exemplified compounds of the general formula (II)

| Exemplified Compounds | Group of Xm | Group of Yn and Yn' | |
|---|---|---|---|
| II-31 | —SO$_2$—CH$_2$—CH(OH)—CH$_2$—SO$_3$Na | —H | —H, —H |
| II-32 | —SO$_2$—CH$_2$—CH$_2$—CH(CH$_3$)—COOLi | —H | —H, —H |
| II-33 | —SO$_2$(CH$_2$)$_3$SO$_2$NHCH$_2$—CH(OH)—CH$_2$—SO$_3$Li | —H | —H, —H |
| II-34 | —CO$_2$CH$_2$CH$_2$CH$_2$SO$_2$—NH—CH$_2$—CH(OH)—CH$_2$—SO$_3$Li | —H | —H, —H |
| II-35 | —SO$_2$NH—C$_8$H$_{17}$(t) | —H | —H, —H |
| II-36 | —SO$_2$—NH—CH$_2$—CH(CH$_2$CH$_3$)—CH$_2$CHCH$_2$—CH$_3$ | —H | —H, —H |
| II-37 | —SO$_2$CH$_2$CH$_2$CH$_2$SO$_2$—NH—CH$_2$—CH(CH$_3$)—CH$_2$—CH$_3$ | —H | —H, —H |
| II-38 | —SO$_2$—CH$_2$—CH$_2$—CH$_2$—CO$_2$—CH(CH$_3$)—CH$_2$—O—CH$_3$ | —H | —H, —H |
| II-39 | —SO$_2$CH$_2$CH$_2$CH$_2$SO$_2$NHCH$_2$CH$_2$CH$_2$O—CH(CH$_3$)$_2$ | —H | —H, —H |

TABLE 2-2-continued

Exemplified compounds of the general formula (II)

| Exemplified Compounds | Group of Xm | | Group of Yn and Yn' |
|---|---|---|---|
| II-40 | —SO$_2$—CH$_2$—CH(O—CH$_3$)—CH$_2$—O—CH$_2$ | —CN | —H, —H |
| II-41 | —CO—NH—CH$_2$—CH(CH$_2$CH$_3$)—CH$_2$—CH$_2$—CH$_2$CH$_3$ | —H | —Cl, —H |
| II-42 | —CO$_2$—CH(CH$_3$)—CH$_2$—O—C$_4$H$_9$(t) | —H | —H, —H |
| II-43 | —SO$_2$—CH$_2$—CH$_2$—CH(CH$_3$)—SO$_2$—NH—[2,5-(SO$_3$Li)$_2$C$_6$H$_3$] | —H | —H, —H |
| II-44 | —SO$_2$NH—[3,5-(CO$_2$C$_6$H$_{13}$(n))$_2$C$_6$H$_3$] | —H | —H, —H |
| II-45 | —SO$_2$NH—[4-OCH$_2$CH$_2$OCH$_3$-3-(SO$_2$NHCH$_2$CH(C$_2$H$_5$)C$_4$H$_9$)C$_6$H$_3$] | —H | —H, —H |
| II-46 | —SO$_2$NH—C$_6$H$_4$—SO$_2$—NH—CH$_2$—CH(CH$_2$CH$_3$)—CH$_2$CH$_2$—CH$_2$—CH$_3$ | —H | —H, —H |
| II-47 | —SO$_2$—[3-(CO$_2$Na)C$_6$H$_4$] | —H | —H, —H |
| II-48 | —SO$_2$N(C$_4$H$_9$(n))(C$_6$H$_5$) | —H | —H, —H |

TABLE 2-3
Exemplified compounds of the general formula (II)
| Exemplified Compounds | Group of Xm | | Group of Yn and Yn' | |
|---|---|---|---|---|
| II-49 | 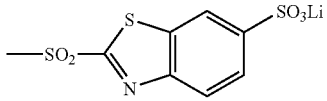 | —H | —H, —H |
| II-50 | 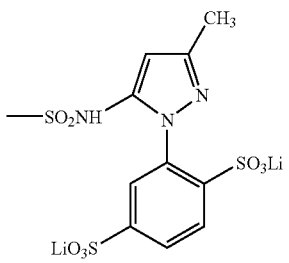 | —H | —H, —H |
| II-51 | 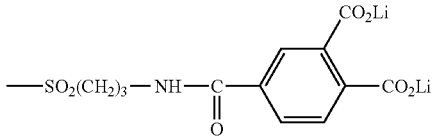 | —Cl | —H, —H |
| II-52 | 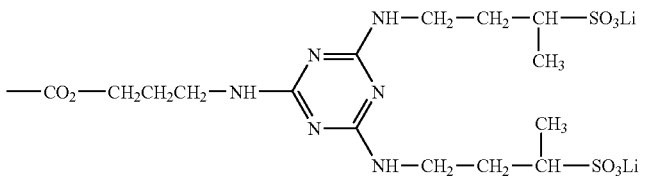 | —H | —H, —H |
| II-53 | 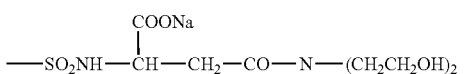 | —H | —H, —H |
| II-54 | 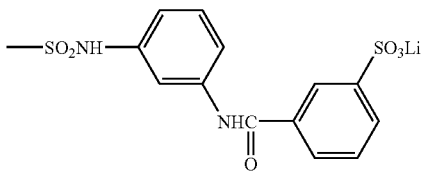 | —H | —H, —H |
| II-55 | 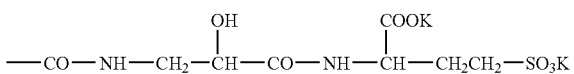 | —H | —H, —H |
| II-56 | 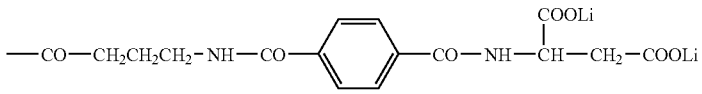 | —H | —H, —H |
| II-57 | —SO$_2$CH$_2$CH$_2$OCH$_2$CH$_2$OCH$_2$CH$_2$SO$_3$Li | —H | —H, —H |

The exemplified compounds II-58 to II-102 represented by the following formula included in the above described general formula (II) are shown in the following table. In the table, $X_{pr}$ each independently represents $P_1$ or $P_2$, and the number of $P_1$ substituted in a copper phthalocyanine skeleton is m, the number of $P_2$ is n, and $Y_q$ is a hydrogen atom. Each of the substituents $P_1$ and $P_2$ is attached at the β-position of a copper phthalocyanine skeleton, and substitution positions at the β-position are in random order.

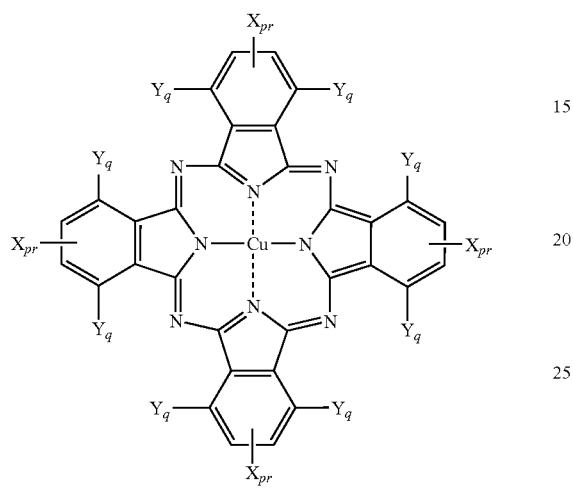

TABLE 2-4

| Exemplified compounds of the general formula (II) | | |
|---|---|---|
| Exemplified Compounds | $P_1$ | m |
| II-58 | —SO$_2$—NH—CH$_2$—CH(CH$_3$)—SO$_3$Li | 3 |
| II-59 | —SO$_2$—NH—CH$_2$—CH$_2$SO$_3$Li | 3 |
| II-60 | —SO$_2$—NH—CH$_2$—CH(CH$_3$)—SO$_3$Li | 3 |
| II-61 | —SO$_2$—NH—CH$_2$—CH(CH$_3$)—SO$_3$Li | 2 |
| II-62 | —SO$_2$—NH—CH$_2$—CH$_2$—SO$_3$—NH—CH$_2$CH$_2$—COONa | 3 |
| II-63 | —SO$_2$—NH—C$_6$H$_4$—SO$_3$NH—CH$_2$—CH(OH)—SO$_3$Li | 3 |
| II-64 | —SO$_2$—CH$_2$—CH$_2$—CH(CH$_3$)—SO$_3$Li | 2.5 |
| II-65 | —SO$_2$—CH$_2$—CH$_2$—CH(CH$_3$)—SO$_3$Na | 2 |
| II-66 | —SO$_2$—CH$_2$—CH$_2$—CH$_2$—SO$_3$Li | 3 |
| II-67 | —SO$_2$—CH$_2$—CH$_2$—CH$_2$—COOK | 2 |

TABLE 2-4-continued

Exemplified compounds of the general formula (II)

| | | |
|---|---|---|
| II-68 | —SO$_2$—CH$_2$—CH$_2$—CH$_2$—SO$_3$Li | 3 |
| II-69 | —SO$_2$—CH$_2$—CH$_2$—O—CH$_2$—CH$_2$SO$_3$Li | 2 |
| II-70 | —SO$_2$—CH$_2$—CH(OH)—CH$_2$—SO$_3$Li | 3 |
| II-71 | —SO$_2$NHCH$_2$CH$_2$—SO$_3$Li | 3 |
| II-72 | —SO$_2$—CH$_2$—CH$_2$—O—CH$_2$—CH$_2$—O—CH$_2$—SO$_3$Na | 3 |
| II-73 | —SO$_2$CH$_2$CH$_2$CH$_2$SO$_3$Li | 3 |
| II-74 | —SO$_2$CH$_2$CH$_2$CH$_2$SO$_3$Li | 2 |
| II-75 | —SO$_2$CH$_2$CH$_2$CH$_2$SO$_3$K | 3 |
| II-76 | —SO$_2$CH$_2$CH$_2$CH$_2$SO$_3$Li | 2 |
| II-77 | —CO—NH—CH$_2$—CH$_2$—SO$_3$K | 3 |
| II-78 | —CO—NH—CH$_2$—CH$_2$—SO$_2$—NH—CH$_2$—CH$_2$—COONa | 3 |
| II-79 | —SO$_2$(CH$_2$)$_3$SO$_2$NHCH$_2$—CH(OH)—CH$_2$CO$_2$Li | 2.5 |
| II-80 | —CO$_2$—CH$_2$—CH$_2$—CH(CH$_3$)—SO$_3$Na | 2 |
| II-81 | —CO$_2$—CH$_2$—CH$_2$—CH$_2$—SO$_3$Li | 3 |
| II-82 | —CO$_2$—CH$_2$—CH$_2$—CH$_2$COOK | 2 |

| Exemplified Compounds | P$_2$ | n |
|---|---|---|
| II-58 | —SO$_2$—NH—CH$_2$—CH(OH)—CH$_3$ | 1 |
| II-59 | —SO$_2$—NH—CH$_2$—CH$_2$—CH$_2$—SO$_2$—NH—CH$_2$—CH(OH)—CH$_3$ | 1 |
| II-60 | —SO$_2$NH—CH$_2$—CH$_2$—CH$_2$—SO$_2$—NH—CH$_2$—CH$_2$—O—CH$_2$—CH$_2$—OH | 1 |
| II-61 | —SO$_2$—NH—CH$_2$—CH$_2$—CH$_2$—CO—N-(CH$_2$—CH$_2$—CH)$_2$ | 2 |
| II-62 | —SO$_2$NH—CH(CH$_3$)—CH$_2$OH | 1 |
| II-63 | —SO$_2$NH—CH$_2$—CH$_2$—O—CH$_2$—CH$_2$—OH | 1 |
| II-64 | —SO$_2$—CH$_2$—CH$_2$—O—CH$_2$—CH$_2$—OH | 1.5 |
| II-65 | —SO$_2$—CH$_2$—CH$_2$—CH$_2$—CO—N-(CH$_2$—CH$_2$—CH)$_2$ | 2 |
| II-66 | —SO$_2$—CH$_2$—CH$_2$—CH$_2$—SO$_2$—NH—CH$_2$—CH(OH)—CH$_3$ | 1 |
| II-67 | —SO$_2$—CH$_2$—CH$_2$—CH$_2$—SO$_2$—NH—CH$_2$—CH(OH)—CH$_3$—COOK | 2 |
| II-68 | —SO$_2$—CH$_2$—CH(OH)—CH$_2$—SO$_3$Li | 1 |
| II-69 | —SO$_2$—CH$_2$—CH$_2$—CH$_2$—CO$_2$—CH$_2$—CH$_2$—CH(OH)—CH$_2$—COOK | 2 |
| II-70 | —SO$_2$—CH$_2$—C$_6$H$_4$—SO$_2$NH—CH$_2$—CH(OH)—CH$_2$—CH | 1 |
| II-71 | —SO$_2$—CH$_2$—CH$_2$—CH$_2$—SO$_2$—NH—CH$_2$—CH(OH)—CH$_3$ | 1 |

TABLE 2-4-continued

Exemplified compounds of the general formula (II)

II-72  —SO$_2$—CH$_2$—CH$_2$—CH$_2$—CO—N(CH$_2$—CH$_2$—COONa)(CH$_2$—COONa)  1

II-73  —SO$_2$CH$_2$CH$_2$CH$_2$SO$_2$NHCH$_2$—CH(OH)—CH$_2$SO$_3$Li  1

II-74  —SO$_2$CH$_2$CH$_2$OCH$_2$CH$_2$OCH$_2$CH$_2$OH  2

II-75  —SO$_2$CH$_2$CH$_2$CH$_2$SO$_2$NH—CH(CH$_3$)—CH$_2$—OH  1

II-76  —SO$_2$CH$_2$CH$_2$CH$_2$SO$_2$N(CH$_2$CH$_2$OH)$_2$  2
II-77  —CO—NH—CH$_2$—CH$_2$—O—CH$_2$—CH$_2$—OH  1

II-78  —CO—NH—CH$_2$—CH(OH)—CH$_3$  1

II-79  —CO—NH—CH$_2$—CH$_2$—CH$_2$—CO—N(CH$_2$—CH$_2$—OH)$_2$  1.5
II-80  —CO—CH$_2$—CH$_2$—CH$_2$—CO—N(CH$_2$—CH$_2$—OH)$_2$  2

II-81  —CO$_2$—CH$_2$—CH$_2$—CH$_2$—SO$_2$—NH—CH$_2$—CH(OH)—CH$_3$  1

II-82  —CO$_2$—CH$_2$—CH$_2$—CH$_2$—SO$_2$—NH—CH$_2$—CH(OH)—CH$_2$—COOK  2

TABLE 2-5

Exemplified compounds of the general formula (II)

| Exemplified Compounds | P$_1$ | m |
|---|---|---|
| II-83 | —CO$_2$—CH$_2$—CH$_2$—O—CH$_2$—CH$_2$—O—CH$_2$—CH$_2$—SO$_3$Na | 3 |
| II-84 | —SO$_2$CH$_2$CH$_2$OCH$_2$CH$_2$O—CH$_2$CH$_2$SO$_3$K | 2 |
| II-85 | —SO$_2$(CH$_2$)$_3$SO$_2$NHCH$_2$CHCH$_2$OH with OH | 2 |
| II-86 | —SO$_2$(CH$_2$)$_3$SO$_2$NHCH$_2$—CH(OH)—CH$_2$SO$_3$K | 3 |
| II-87 | —SO$_2$(CH$_2$)$_3$SO$_2$NH(CH$_2$)$_3$N(CH$_2$CH$_2$OH)$_2$ | 2 |
| II-88 | —SO$_2$—CH$_2$—CH$_2$—CH$_2$—SO$_2$—NH—CH$_2$—CH(OH)—CH$_3$ | 2 |
| II-89 | —SO$_2$—CH$_2$—CH$_2$—O—CH$_2$—CH$_2$—O—CH$_3$ | 2 |
| II-90 | —SO$_2$—CH$_2$—CH$_2$—O—CH$_2$—CH$_2$—O—CH$_2$—CH$_2$—OH | 3 |
| II-91 | —SO$_2$—CH$_2$—CH(CH$_2$CH$_3$)—CH$_2$CH$_2$—CH$_2$CH$_3$ | 2 |
| II-92 | —SO$_2$—CH$_2$—CH$_2$—CH$_2$—SO$_2$—NH—CH$_2$—CH(O—CH$_3$)—CH$_3$ | 3 |
| II-93 | —SO$_2$—CH$_2$—CH$_2$—CH$_2$—CO$_2$—NH—CH(CH$_3$)—CH$_2$—CH$_3$ | 3 |

TABLE 2-5-continued

| Exemplified compounds of the general formula (II) | | |
|---|---|---|
| II-94 | —SO$_2$—CH$_2$—CH$_2$—CH$_2$—SO$_2$NH—CH$_2$—CH(OH)—CH$_3$ | 2.5 |
| II-95 | —SO$_2$—CH$_2$—CH$_2$—CH$_2$—CO$_2$—NH—CH(CH$_3$)—CH$_2$—CH$_3$ | 2 |
| II-96 | —SO$_2$—CH$_2$—CH$_2$—CH$_2$—SO$_2$—NH—CH$_2$—CH(OH)—CH$_3$ | 3 |
| II-97 | —SO$_2$—CH$_2$—CH$_2$—CH$_2$—SO$_2$—NH—CH$_2$—CH(OH)—CH$_3$ | 3 |
| II-98 | —SO$_2$—CH$_2$—CH$_2$—CH$_2$—CO$_2$—NH—CH(CH$_3$)—CH$_2$—CH$_3$ | 3 |
| II-99 | —SO$_2$—CH$_2$—CH$_2$—CH$_2$—SO$_2$—NH—CH(CH$_3$)$_2$ | 3 |
| II-100 | —CO$_2$—CH$_2$—CH$_2$—CH$_2$—CO$_2$—NH—CH(CH$_3$)—CH$_2$—CH$_3$ | 3 |
| II-101 | —CO—NH—CH$_2$—CH$_2$—SO$_2$—NH—CH(CH$_3$)$_2$ | 3 |
| II-102 | —CO—NH—CH$_2$—CH(CH$_2$CH$_3$)—CH$_2$—CH$_2$—CH$_2$ CH$_3$ | 3 |

| Exemplified Compounds | P$_2$ | n |
|---|---|---|
| II-83 | —CO$_2$—CH$_2$—C$_6$H$_4$—SO$_3$NH—CH$_2$—CH(OH)—CH$_2$—OH | 1 |
| II-84 | —CO$_2$—CH$_2$—CH$_2$—CH$_2$—CO$_2$—CH$_2$—CH$_2$—CH(OH)—CH$_2$—COOK | 2 |
| II-85 | —CO$_2$—CH$_2$—CH(OH)—CH$_2$—SO$_3$Li | 2 |
| II-86 | —CO$_2$—CH$_2$—CH$_2$—CH$_2$—SO$_2$—NH—CH$_2$—CH(OH)—CH$_3$ | 1 |
| II-87 | —CO$_2$—CH$_2$—CH$_2$—CH$_2$—CO—N(CH$_2$—CH$_2$—COOLi)—CH$_2$—COOLi | 2 |
| II-88 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| II-89 | —SO$_2$—CH$_2$—CH$_2$—CH$_2$—SO$_2$—NH—CH$_2$—CH(OH)—CH$_3$ | 1 |
| II-90 | —SO$_2$—CH$_2$—CH$_2$—CH$_2$—CO$_2$—NH—CH$_2$—CH(CH$_2$CH$_3$)—CH$_2$CH$_3$—CH$_2$CH$_3$ | 1 |
| II-91 | —SO$_2$—CH$_2$—CH$_2$—CH$_2$—SO$_2$—NH—CH$_2$—CH(O—CH$_3$)—CH$_3$ | 2 |

TABLE 2-5-continued

Exemplified compounds of the general formula (II)

| | | |
|---|---|---|
| II-92 | —SO$_2$NH—CH$_2$—CH$_2$—SO$_2$NH—CH$_2$—CH$_2$—O—CH$_2$—CH$_2$—OH | 1 |
| II-93 | —SO$_2$—CH$_2$—CH$_2$—CH$_2$—SO$_2$—NH—CH(CH$_3$)$_2$ | 1 |
| II-94 | —SO$_2$—CH$_2$—CH$_2$—CH$_2$—CO$_2$—NH—CH(CH$_3$)—CH$_2$—CH$_3$ | 1.5 |
| II-95 | —SO$_2$—CH$_2$—CH$_2$—CH$_2$—SO$_2$—NH—(CH$_2$)$_3$—CH$_2$—O—CH$_2$CH$_3$—OH | 2 |
| II-96 | —SO$_2$—CH$_2$—CH$_2$—O—CH$_2$—CH$_2$—O—CH$_3$ | 1 |
| II-97 | —SO$_2$—CH$_2$—CH$_2$—O—CH$_2$—CH$_2$—O—CH$_2$—CH$_2$—O—CH$_3$ | 1 |
| II-98 | —SO$_2$—CH$_2$—CH$_2$—O—CH$_2$—CH$_2$—O—CH$_2$—CH$_2$—OH | 1 |
| II-99 | —CO$_2$—CH$_2$—CH(CH$_2$CH$_3$)—CH$_2$—CH$_2$—CH$_2$CH$_3$ | 1 |
| II-100 | —CO$_2$—CH$_2$—CH$_2$—O—CH$_2$—CH$_2$—O—CH$_3$ | 1 |
| II-101 | —SO$_2$—NH—CH$_2$—CH(CH$_2$CH$_3$)—CH$_2$—CH$_2$—CH$_2$—CH$_3$ | 1 |
| II-102 | —CO—NH—CH$_2$—CH$_2$—O—CH$_2$—CH$_2$—O—CH$_3$ | 1 |

[Verification Method of Coloring Material]

The following verification methods (1) to (3) using high performance chromatography (HPLC) is applicable to verification as to whether or not the coloring material of the general formula (II) used in the present invention is contained in an liquid (ink).

(1) Peak retention time
(2) Maximum absorption wavelength of the peak of (1) obtained by an absorbance detector
(3) M/Z (posi and nega) of a mass spectrum for the peak of (1) obtained by mass spectrometry The analysis conditions for high performance chromatography are as shown below. A liquid diluted 1,000-fold with pure water was used as a sample for measurement. Then, analysis was performed for the sample by high performance chromatography under the following conditions, and the peak retention time and the maximum absorption wavelength of the peak obtained by a visible light absorbance detector were measured.

Column: SunFire C18, 2.1 mm×150 mm
Column temperature: 40° C.
Flow rate: 0.2 mL/min
PDA: 200 nm to 700 nm
Mobile phase and gradient conditions: Table 3 below

TABLE 3

| | 0 to 5 min. | 5 to 25 min. | 25 to 26 min. | 26 to 45 min. |
|---|---|---|---|---|
| A: Water | 75% | 75 → 30% | 30 → 0% | 0% |
| B: Acetonitrile | 20% | 20 → 65% | 65 → 95% | 95% |
| C: 0.2 mol/L ammonium acetate aqueous solution | 5% | 5% | 5% | 5% |

In addition, analysis conditions for a mass spectrum by a mass spectroscope are as shown below. A mass spectrum was measured for the peak obtained by HPLC under the following conditions, and the M/Z most strongly detected was measured for each of positive and negative.

Ionization method
ESI
Capillary voltage: 3.5 kV
Desolvation gas: 300° C.
Ion source temperature: 120° C.
Detector posi: 40 V 200 to 1,500 amu/0.9 sec
nega: 40 V 200 to 1,500 amu/0.9 sec Table 4 shows a retention time, maximum absorption wavelength, M/Z (posi), and M/Z (nega) for an exemplified compound II-66 which is a specific example of the second coloring material. As a result of the same measurement as described above for an unknown ink, when the resulting values are in the range of the values shown in Table 4, the ink can be judged to include a coloring material corresponding to the compound used in the present invention.

TABLE 4

| | Retention time (min) | Maximum absorption wavelength (nm) | M/Z posi | M/Z nega |
|---|---|---|---|---|
| Exemplified compound II-66 | 13.0 to 14.0 | 625 to 635 | 1375 to 1379 | 1374 to 1377 |

[Content of Coloring Material]

The content (% by mass) of the first coloring material (compound of the general formula (I)) in an ink is preferably from 0.1% by mass or more to 10.0% by mass or less based on the total mass of the ink. The content (% by mass) of the second coloring material (compound of the general formula (II)) in an ink is preferably from 0.1% by mass or more to 10.0% by mass or less based on the total mass of the ink.

The total content of the first coloring material (compound of the general formula (I)) and the second coloring material (compound of the general formula (II)) in an ink is preferably from 0.1% by mass or more to 20.0% by mass or less based on the total mass of the ink. Further, the above total content is particularly preferably from 0.5% by mass or more to 10.0% by mass or less. When the total content is less than 0.1% by mass, ozone resistance and color developability cannot be sufficiently achieved in some cases. When the total content is more than 20.0% by mass, ink jet characteristics such as resistance to fixing cannot be obtained in some cases.

The mass ratio of the content (% by mass) of a first coloring material (compound of the general formula (I)) to the content (% by mass) of a second coloring material based on the total ink mass, (a first coloring material/a second coloring material), is preferably from 1.25 times or more to 5.0 times or less. Further, the mass ratio is particularly preferably from 1.5 times or more to 3.0 times or less. As a result of studies made by the present inventors, it was found that when the first coloring material and the second coloring material are mixed, a mass ratio thereof correlates with ozone resistance, and that when the mass ratio of the contents is in the above range, the effect of improving ozone resistance can be particularly significantly obtained. Specifically, when this mass ratio is satisfied, particularly excellent ozone resistance far beyond the performance anticipated from ozone resistance inherent in each of the compound of the general formula (I) and the compound of the general formula (II). Further, when setting the mass ratio within the above range, a preferable color tone as a cyan ink can be obtained. When the mass ratio exceeds 5.0 times, an effect exerted on aggregating properties by a mixture of the coloring materials is small, and thus, the ozone resistance may come to be close to that in the case of using one of these coloring materials. In addition, since a color tone is biased toward red, and thus, a preferable color tone as a cyan ink may be unable to be obtained. On the other hand, when the mass ratio is less than 1.25 times, an effect exerted on aggregating properties by a mixture of the coloring materials is small, and thus, the ozone resistance may come to be close to that in the case of using one of these coloring materials. In addition, since a color tone is biased toward green, and thus, a preferable color tone as a cyan ink may be unable to be obtained. In other words, in the present invention, mixing the first coloring material and the second coloring material in a specific mass ratio enables images to have both ozone resistance far beyond an anticipated level and a preferable color tone as a cyan ink.

Specifically, the desirable color tone as cyan ink in the present invention refers to the following. An image formed using cyan ink by setting the recording duty as 100% is measured for $a^*$ and $b^*$ in the $L^*a^*b^*$ color system defined by CIE (International Commission on Illumination). The hue angle (H°) is calculated from the resulting values of $a^*$ and $b^*$ according to the following formula (I). An ink having a hue angle (H°) of from 237° or more to 244° or less is defined as an ink having a desirable color tone in the present invention. The values of the above $a^*$ and $b^*$ can be measured using, for example, a spectrophotometer (trade name: Spectrolino; manufactured by Gretag Macbeth). As a matter of course, the present invention is not limited thereto.

Formula (I)

In $a^* \geq 0$, $b^* \geq 0$ (the first quadrant): $H° = \tan^{-1}(b^*/a^*)$

In $a^* \leq 0$, $b^* \geq 0$ (the second quadrant): $H° = 180 + \tan^{-1}(b^*/a^*)$ In $a^* \leq 0$, $b^* \leq 0$ (the third quadrant): $H° = 180 + \tan^{-1}(b^*/a^*)$ In $a^* \geq 0$, $b^* \leq 0$ (the fourth quadrant): $H° = 360 + \tan^{-1}(b^*/a^*)$

[Mechanism of Improving Ozone Resistance]

As described above, by using the first coloring material and the second coloring material in combination, a synergistic effect is exerted, and ozone resistance of an image is improved far beyond an anticipated level. The present inventors presumes a mechanism of such an improvement as follows.

As a result of the studies made by the present inventors, it has been found that there is the correlation between the aggregation property and ozone resistance of the coloring materials. Specifically, it was found that ozone resistance is improved when an aggregation property in a state that specific coloring materials are mixed, i.e., in a case where coloring materials are present as associates, is higher than that in a case where each of coloring materials is present singly in an ink. According to this fact, the aggregation property of associates of coloring materials formed by mixing specific coloring materials is controlled so that the coloring materials are more aggregated than when each of coloring materials is singly present in an ink. Thus, it is considered that particularly excellent ozone resistance beyond an anticipated level is achieved. Additionally, it is considered that controlling the aggregation property of coloring materials present in an ink has the same effect as controlling the aggregation property of associates of the coloring materials applied onto a recording medium.

As described above, if an ink whose aggregation property is so controlled as to be in a state that it is easily aggregated, is applied onto a recording medium, associates of coloring materials are aggregated to form larger aggregates on the recording medium. Then, when oxidation gas such as ozone gas in the air brings about a reaction causing the coloring material on the recording medium to deteriorate, molecules near the surfaces of the aggregates deteriorate, but it is difficult for molecules in the insides of the aggregates to deteriorate, and thus, the proportion of the coloring materials which do not undergo deterioration is increased on the whole. In the present invention, ozone resistance can be particularly significantly increased by such a mechanism.

Since the aggregation property is determined by performance inherent in a coloring material in an ink containing one type of coloring material, it is hard to freely control the aggregation property depending only on characteristics of the coloring material in many cases. It is supposed that one type of coloring material having a high aggregation property of the coloring material itself is selected. However, in such a case, it is often difficult to achieve both of a preferable color tone of cyan and an aggregation property at the same time. Moreover, also when two or more types of coloring materials are mixed, since, with conventional coloring materials, the states of their aggregating properties depends on the aggregating properties inherent in respective coloring materials in many cases, it has been hard to control the aggregating properties even by simply mixing the coloring materials.

However, as a result of studies made by the present inventors, it was found that in the case where two or more types of coloring materials are used in combination, when using coloring materials having certain specific substituents, the two or more coloring materials specifically causes aggregation. One of the coloring materials preferably has a substituted sulfamoyl group in a compound of the above described general formula (I), and further the substituted sulfamoyl group particularly preferably has an alkylene group. The alkylene group of the substituted sulfamoyl group in a compound of the general formula (I) has an effect of lowering solubility of a coloring material in an aqueous medium, and thus the coloring material comes to be in a state in which it is more apt to aggregate, and it is considered that ozone resistance is improved. The other coloring material preferably has a group capable of forming a hydrogen bond with the substituted sulfamoyl group, and it has been found that particularly when the group is a hydroxyl group, ozone resistance is particularly significantly improved.

That is, in the present invention, coloring materials having a specific structure which specifically causes aggregation, in particular, coloring materials having the above described substituents are selected, and these coloring materials are used in combination, whereby the following effects are obtained. Specifically, it is possible to achieve ozone resistance far beyond the performance anticipated from ozone resistance inherent in each of the coloring materials in the case of combining these coloring materials. The reason for this effect is considered that since an aggregation property in the case of using the coloring materials in combination is higher than an aggregation property inherent in each of the coloring materials, larger aggregates are apt to be formed on a recording medium, and the deterioration rate of the coloring materials is reduced. In the present invention, when (first coloring material/second coloring material)=from 1.25 times or more to 5.0 times or less, further when the ratio is from 1.5 times or more to 3.0 times or less, particularly excellent ozone resistance of an image can be realized, thus being particularly preferable.

[Aggregating Property of Coloring Materials]

A small-angle X-ray scattering method can be applied to measurement of the aggregating properties of coloring materials. The small-angle X-ray scattering method is a technique generally used for calculation of the distance between molecules in a colloidal solution, as described in "New Colloid Chemistry" (Kodansha Scientific Ltd., Fumio Kitahara and Kunio Furusawa), "Surface State and Colloid State" (Tokyo Kagaku Dozin Co., Ltd., Masayuki Nakagaki), and the like.

The overview of a small-angle X-ray scattering apparatus will be described with reference to FIG. 1 that is a conceptual diagram explaining the principle of the small-angle X-ray scattering method. The X-ray emitted from the X-ray source is narrowed down to a focal point size of about a few mm or less during passing through the first to third slits, and a sample solution is irradiated with the X-ray thus narrowed down. The X-ray with which the sample solution has been irradiated is scattered by particles in the sample solution, and thereafter detected on an imaging plate. The scattered X-ray is interfered due to a difference in optical path difference, and thus the distance between molecules, a d value, can be found from the obtained θ value according to the Bragg equation (the following formula (A)). The d value found herein can be considered to be a distance from the center to the center of particles arranged at a constant interval.

$$d = \frac{\lambda}{2\sin\theta} \qquad \text{Formula A}$$

In the formula (A), λ represents a wavelength of the X-ray, d represents the distance between particles, and θ represents a scattering angle.

Figure 2:
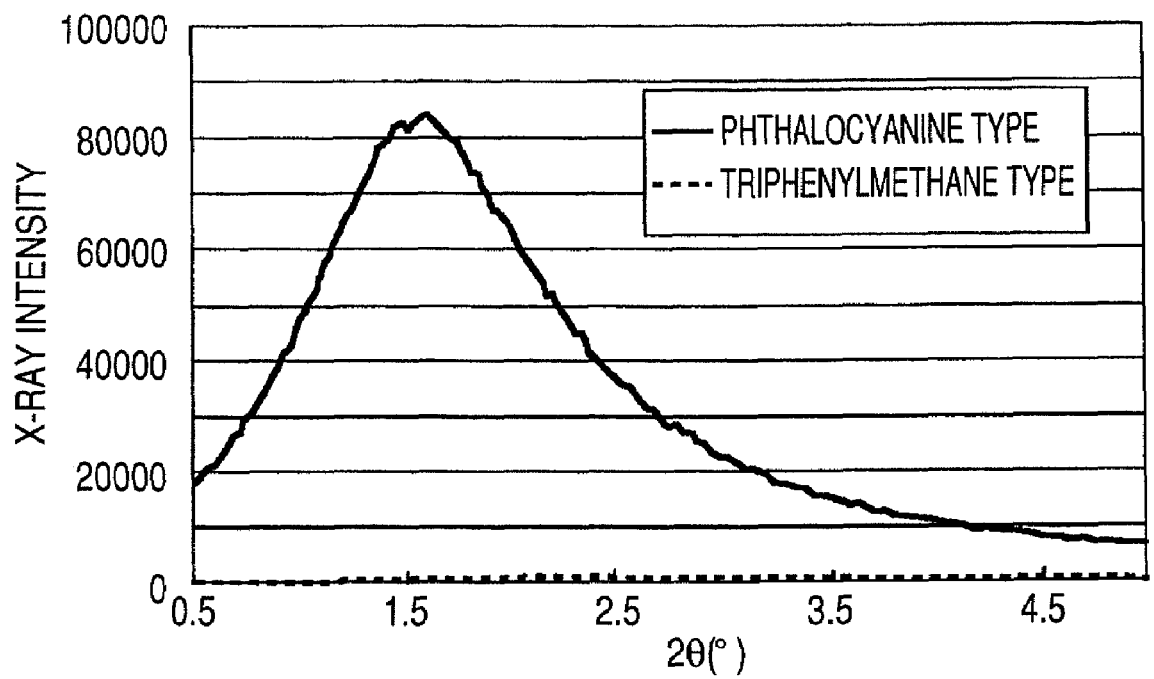
FIG. 2 is a small-angle X-ray scattering profile of each of a triphenylmethane type coloring material and a phthalocyanine type coloring material.

In general, when particles in a solution are not regularly arranged, a peak does not occur in a scattering angle profile. In the case of an aqueous solution of a compound used in the present invention, in which aromatic rings corresponding to A, B, C and D in the general formula (I) are all benzo rings, a strong peak having a maximum value in the range of 2θ=0° to 5° is detected. Therefore, it is found that particles formed by aggregation of phthalocyanine type coloring material molecules (molecular aggregate) are arranged according to in a certain regulation. FIG. 2 illustrates scattering angle profiles in a 10% aqueous solutions of each of the following compound (A) which is a triphenylmethane type coloring material and a compound in which aromatic rings corresponding to A, B, C and D in the general formula (I) are all benzo rings. According to FIG. 2, even though being a coloring material having the same cyan color hue, a phthalocyanine type coloring material specifically has a scattering angle peak. That is, in the case of a phthalocyanine type coloring material, some of phthalocyanine molecules are aggregated in an aqueous solution to form molecular aggregates, and thus the distance between the molecular aggregates has certain distribution as shown in the scattering angle profile.

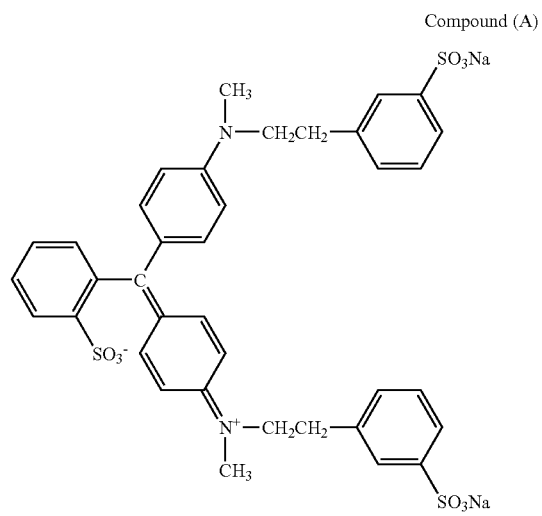

Compound (A)

Figure 3:
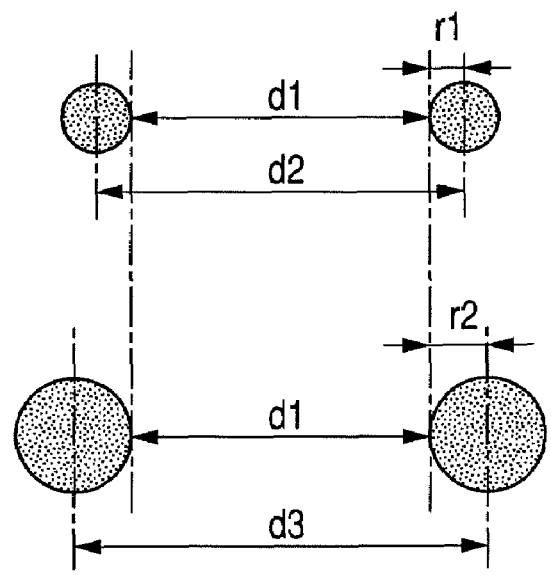
FIG. 3 is a conceptual diagram of a dispersion distance of a molecular aggregate of a phthalocyanine based coloring material.

FIG. 3 illustrates a conceptual diagram of a dispersion distance of molecular aggregates of a phthalocyanine type coloring material. As shown in FIG. 3, a radius of a molecular aggregate of a certain phthalocyanine based coloring material is represented by r1, and the distance between the molecular aggregates is represented by d1. Assuming that d1 is constant at all times, as the radium of the molecular aggregate formed by a phthalocyanine type coloring material becomes larger (r1 →r2), the d value measured by the small-angle X-ray scattering method is considered to become larger (d2 →d3). Therefore, the d value measured by the above described method is considered to be an index that indicates the size of the molecular aggregate of the phthalocyanine type coloring material, and it is thus considered that the larger the d value, the larger the size of the molecular aggregate formed from the coloring material molecules is. In this way, the aggregation property of a coloring material, i.e., the size of an aggregate can be represented by the d value.

As a result of studies made by the present inventors, it was found that the d value in the case of mixing a compound of the general formula (I) and a compound of the general formula (II) in a certain ratio is larger than the d value of each of only the compound of the general formula (I) and only the compound of the general formula (II). Furthermore, it was also found that a synergistic effect is exerted by a combination of coloring materials having a relationship such that the d value in a mixed state is larger than the d value of each of compounds, and ozone resistance is particularly significantly improved. However, there was not a correlation between a small or large d value in a mixed state and performance of ozone resistance.

Specifically, the ink according to another aspect of the present invention is an ink containing at least two coloring materials of a coloring material A and a coloring material B, and it is preferable that a dispersion distance, a d value of molecular aggregates in an ink, obtained by the small-angle X-ray scattering method satisfies the following conditions. In this case, when a compound of the general formula (I) and a compound of the general formula (II) are combined, a synergistic effect is exerted and ozone resistance is particularly significantly improved as compared with ozone resistance of each of only a compound of the general formula (I) and only a compound of the general formula (II). Herein, the compound of the general formula (I) indicates "coloring material A" and the compound of the general formula (II) indicates "coloring material B".

$$d_{A+B>dA} \text{ and } d_{A+B>dB}$$

In the above formula, $d_A$ (nm) represents a d value of the coloring material A, $d_B$ (nm) represents a d value of the coloring material B, and $d_{A+B}$ (nm) represents a d value where the coloring material A and the coloring material B are mixed.

(Aqueous Medium)

One of water and an aqueous medium which is a mixed solvent of water and a water-soluble organic solvent can be used in the ink of the present invention. Deionized water (ion exchange water) is preferably used as the water. The content (% by mass) of water in ink is preferably from 10.0% by mass or more to 90.0% by mass or less based on the total ink mass.

The water-soluble organic solvent is not particularly limited as long as it is water-soluble, and examples thereof include alcohols, polyhydric alcohols, polyglycols, glycol ethers, nitrogen-containing polar solvents and sulfur-containing polar solvents. The content (% by mass) of the water-soluble organic solvent in ink is preferably from 5.0% by mass or more to 90.0% by mass or less, more preferably from 10.0% by mass or more to 50.0% by mass or less based on the total ink mass. When the content of the water-soluble organic solvent is lower than the above described range, reliability such as ejection stability may not be obtained in the case of using the ink for an ink jet recording apparatus. On the other hand, when the content of the water-soluble organic solvent is higher than the above described range, the viscosity of the ink may be increased to cause a poor ink supply.

Specific examples of the water-soluble organic solvent include: alkyl alcohols having from 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; one of ketones and ketoalcohols such as acetone and diacetone alcohol; ethers such as tetrahydrofuran and dioxane; polyalkylene glycols such as polyethylene glycol and polypropylene glycol; glycols such as ethylene glycol, propylene glycol, butylene glycol, diethylene glycol, triethylene glycol, hexylene glycol and thiodiglycol; alkylene glycols in which an alkylene group has from 2 to 6 carbon atoms such as 1,5-pentanediol, 1,6-hexanediol, 2-methyl-1,3-propanediol, 3-methyl-1,5-pentanediol and 1,2,6-hexanetriol; bis(2-hydroxyethyl) sulfone; lower alkyl ether acetates such as polyethylene glycol monomethyl ether acetate; polyhydric alcohol alkyl ethers such as ethylene glycol monomethyl ether, ethylene glycol monoethyl ether, diethylene glycol methyl ether, diethylene glycol ethyl ether, triethylene glycol monomethyl ether and triethylene glycol monoethyl ether; N-methyl-2-pyrrolidone, 2-pyrrolidone and 1,3-dimethyl-2-imidazolidinone. Of course, the present invention is not limited to these. These water-soluble organic solvents can be used individually or in combination as required.

(Other Additives)

The ink of the present invention may contain a water-soluble organic compound which is solid at ordinary temperature, such as polyhydric alcohols including trimethylolpropane and trimethylolethane, and urea derivatives including urea and ethyleneurea, besides the above-described components, if required. Further, the ink of the present invention may contain various additives such as a surfactant, a pH adjuster, a rust-inhibitor, antiseptics, an antifungal agent, an antioxidant, an anti-reducing agent, an evaporation accelerator, a chelating agent and a water-soluble polymer, as required.

<Other Inks>

Further, in order to form full color images, the ink of the present invention can be used in combination with an ink having a color tone different from the color tone of the ink of the present invention. The ink of the present invention is preferably used in combination with, for example, at least one ink selected from the group consisting of black ink, cyan ink, magenta ink, yellow ink, red ink, green ink and blue ink. Furthermore, a so-called light ink which has substantially the same color tone as the color tone of each of these inks can also be used in combination. The coloring materials for these inks or light inks may be known coloring materials or newly synthesized coloring materials.

<Recording Medium>

The recording medium to be used for forming images using the ink of the present invention may be any recording medium as long as it is a recording medium for recording by applying ink thereto. In the present invention, it is preferred to use a recording medium for ink jets in which coloring materials such as a dye and a pigment are allowed to adsorb to the particulates which form a porous structure of an ink receiving layer. It is particularly preferred to use a recording medium having a so-called void-absorbing type ink receiving layer which absorbs ink by the voids formed in the ink receiving layer on a support. The void-absorbing type ink receiving layer essentially includes particulates and may further include a binder and other additives as required.

Specifically, the followings can be used for the particulates: inorganic pigments such as silica, clay, talc, calcium carbonate, kaolin, aluminum oxide such as alumina and hydrated alumina, diatomaceous earth, titanium oxide, hydrotalcite and zinc oxide; and organic pigments such as a urea formalin resin, an ethylene resin and a styrene resin. These particulates can be used individually or in combination as required.

The binder includes a water-soluble polymer and latex, and specific examples thereof include the followings: polyvinyl alcohol, starch, gelatin and modified body thereof; gum arabic; cellulose derivatives such as carboxymethylcellulose, hydroxyethylcellulose and hydroxypropylmethylcellulose; vinyl copolymer latex such as SBR latex, NBR latex, methyl methacrylate-butadiene copolymer latex, functional group-modified polymer latex and an ethylene-vinyl acetate copolymer; polyvinyl pyrrolidone; and maleic anhydride and a copolymer thereof and an acrylate copolymer. These binders can be used individually or in combination as required.

In addition, additives can be used as required. Examples of the additives include a dispersant, a thickener, a pH adjuster, a lubricant, a fluidity modifier, a surfactant, a defoaming agent, a release agent, a fluorescent brightener, an ultraviolet absorber, an antioxidant and a dye fixing agent.

In particular, in forming an image using the ink of the present invention, it is preferred to use a recording medium in which an ink receiving layer is formed by using particulates having an average particle size of not more than 1 μm. Specific examples of the particulates include silica particulates and aluminum oxide particulates. Preferred silica particulates include those typified by colloidal silica. Commercially available colloidal silica can be used, but it is particularly preferred to use, for example, colloidal silica described in Japanese Patent Nos. 2803134 and 2881847. Preferred aluminum oxide particulates include hydrated alumina particulates (an alumina pigment).

Among the above alumina pigment, hydrated alumina such as pseudoboehmite represented by the following formula can be particularly mentioned as a suitable one:

$$AlO_{3-n}(OH)_{2n} \cdot mH_2O$$

wherein n is an integer of 1 to 3; and m is 0 to 10, preferably 0 to 5, provided that m and n are not simultaneously 0.

In many cases, $mH_2O$ also represents an eliminable aqueous phase which does not participate in the formation of $mH_2O$ crystal lattices. For this reason, m may take one of an integer and a value which is not an integer. Further, when this type of hydrated alumina is heated, m may reach 0.

The hydrated alumina can be produced by the following known methods. For example, it can be produced by hydrolysis of an aluminum alkoxide and sodium aluminate as disclosed in U.S. Pat. No. 4,242,271 and U.S. Pat. No. 4,202,870. Further, it can be produced by a method in which an aqueous solution of one of sodium sulfate and aluminum chloride is added to an aqueous solution of sodium aluminate to effect neutralization as disclosed in Japanese Patent Application Laid-Open No. S57-044605.

The recording medium preferably has a support for supporting the above-described ink receiving layer. Any material may be used for the support without any limitation as long as the material allows the ink receiving layer to be formed from the above-described porous particulates and forms a support which is rigid enough to be transported by a transport mechanism of an ink jet recording apparatus. For example, a paper support including a pulp raw material which essentially includes natural cellulose fibers can be used. A plastic support including a material such as polyester (for example, polyethylene terephthalate), cellulose triacetate, polycarbonate, polyvinyl chloride, polypropylene and polyimide can also be used. A resin-coated paper (example: RC paper) having a polyolefin resin coating layer, to which a white pigment is added, on at least one side of a base paper can also be used.

<Ink Jet Recording Method>

The ink of the present invention is particularly preferably used for the ink jet recording method in which ink is ejected by an ink jet system to perform recording on a recording medium. The ink jet recording method includes a recording method in which ink is ejected by applying mechanical energy on the ink and a recording method in which ink is ejected by applying thermal energy on the ink. In particular, in the present invention, the ink jet recording method using thermal energy can be preferably used.

<Ink Cartridge>

A suitable ink cartridge for recording by using the ink of the present invention includes an ink cartridge provided with an ink storage portion for storing ink.

<Recording Unit>

A suitable recording unit for recording using the ink of the present invention includes a recording unit provided with an ink storage portion for storing the ink and a recording head for ejecting the ink. In particular, a recording unit can be preferably used in which the above recording head ejects the ink by applying thermal energy corresponding to a recording signal to the ink. In particular, a recording head having a heating portion surface in contact with liquid including at least one of metals and metal oxides is preferably used in the present invention. Specific examples of at least one of the metals and the metal oxides from which the above heating portion surface in contact with liquid is formed include metals such as Ta, Zr, Ti, Ni and Al, and metal oxides thereof.

<Ink Jet Recording Apparatus>

A suitable ink jet recording apparatus using the ink of the present invention includes an ink jet recording apparatus provided with an ink storage portion for storing the ink and a recording head for ejecting the ink. In particular, an ink jet recording apparatus may be cited in which the ink in the recording head having an ink storage portion for storing the ink is ejected by applying thermal energy corresponding to a recording signal to the ink.

A schematic constitution of a mechanism portion of an ink jet recording apparatus will be described below. An ink jet recording apparatus has a sheet feeding portion, a sheet conveying portion, a carriage portion, a sheet discharge portion, a cleaning portion and an external packaging portion for protecting the above portions and providing them with a design, each of which plays a role of each mechanism.

Figure 4:
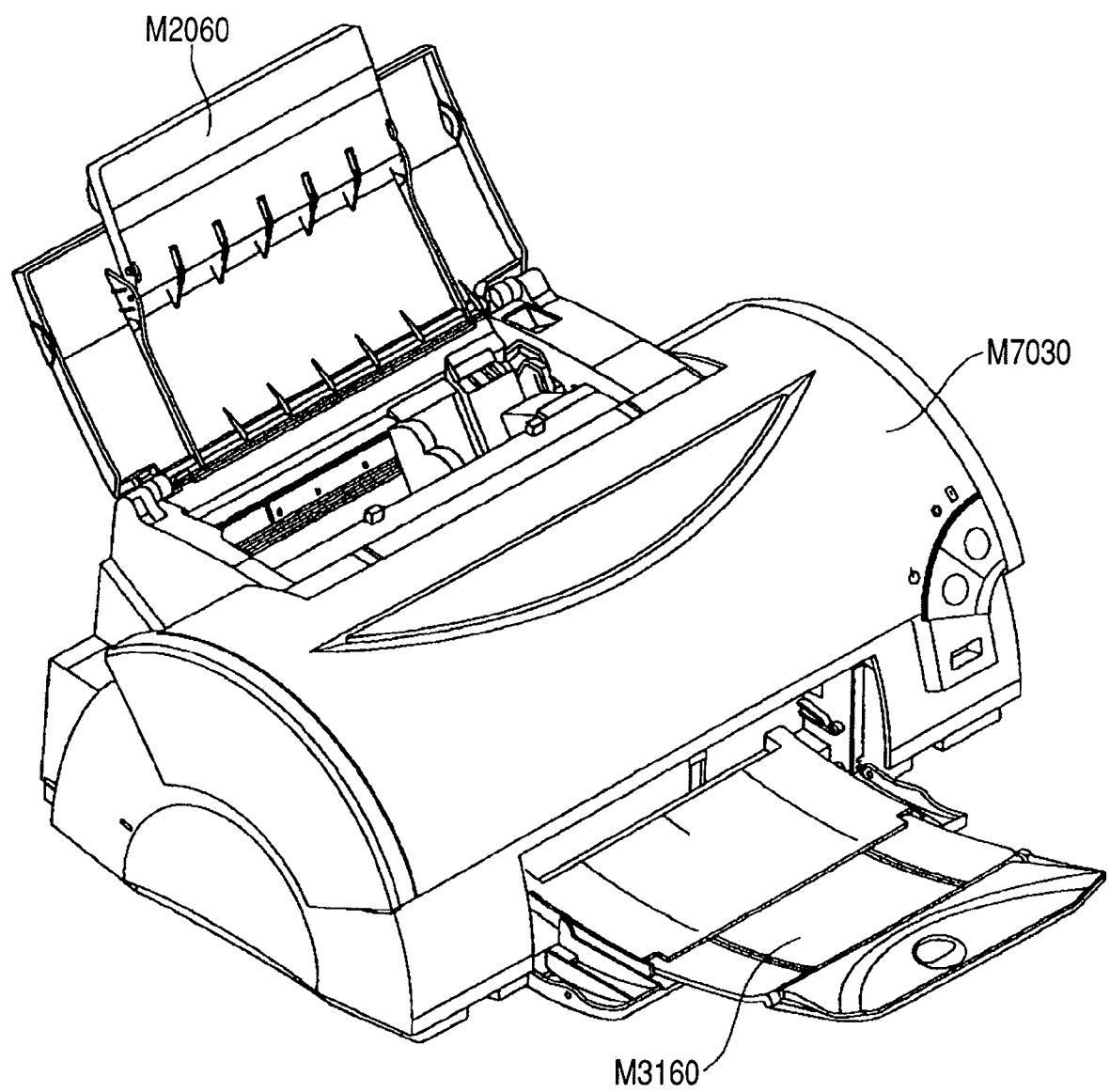
FIG. 4 is a perspective view of an ink jet recording apparatus.
Figure 5:
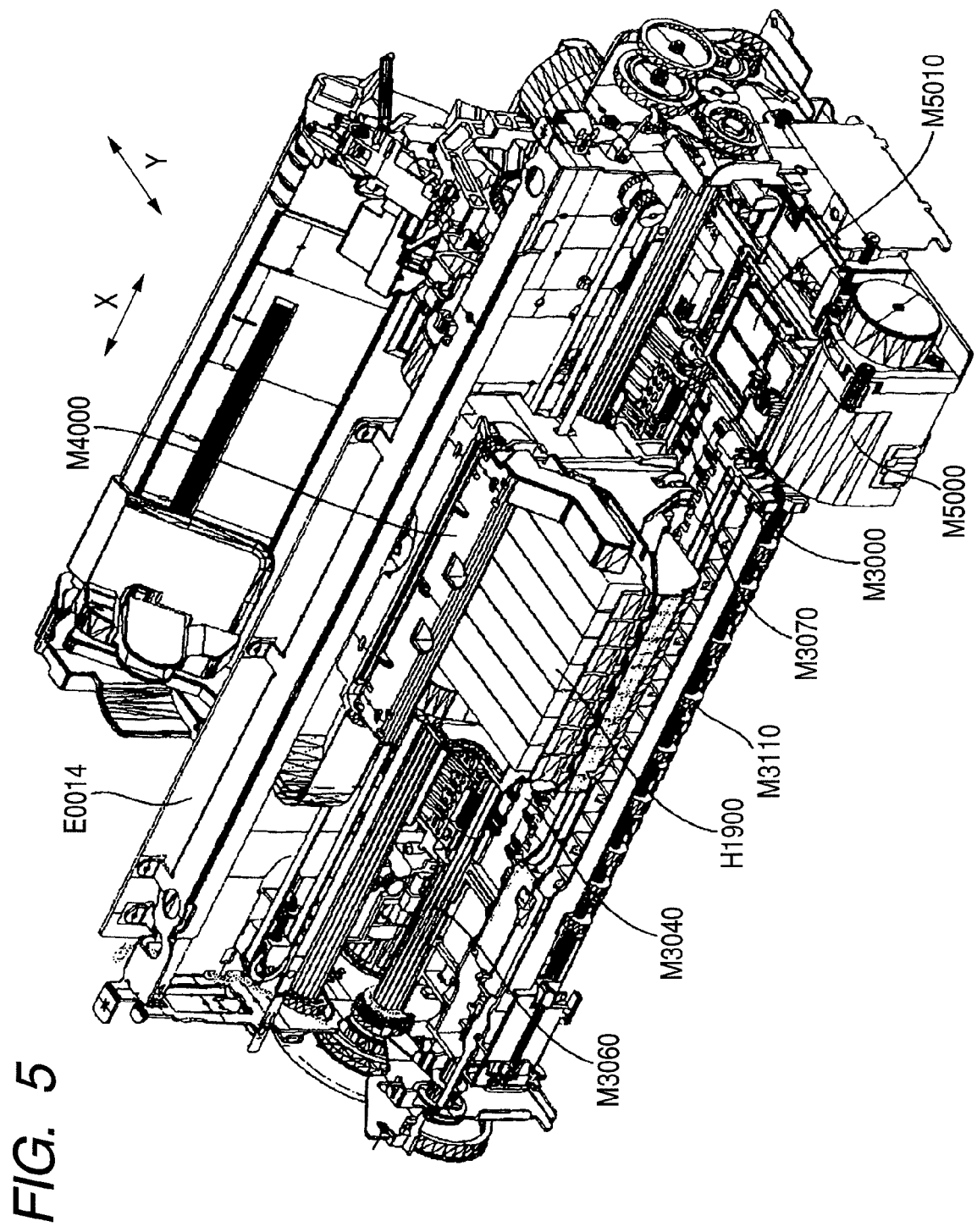
FIG. 5 is a perspective view of a mechanism portion of an ink jet recording apparatus.
Figure 6:
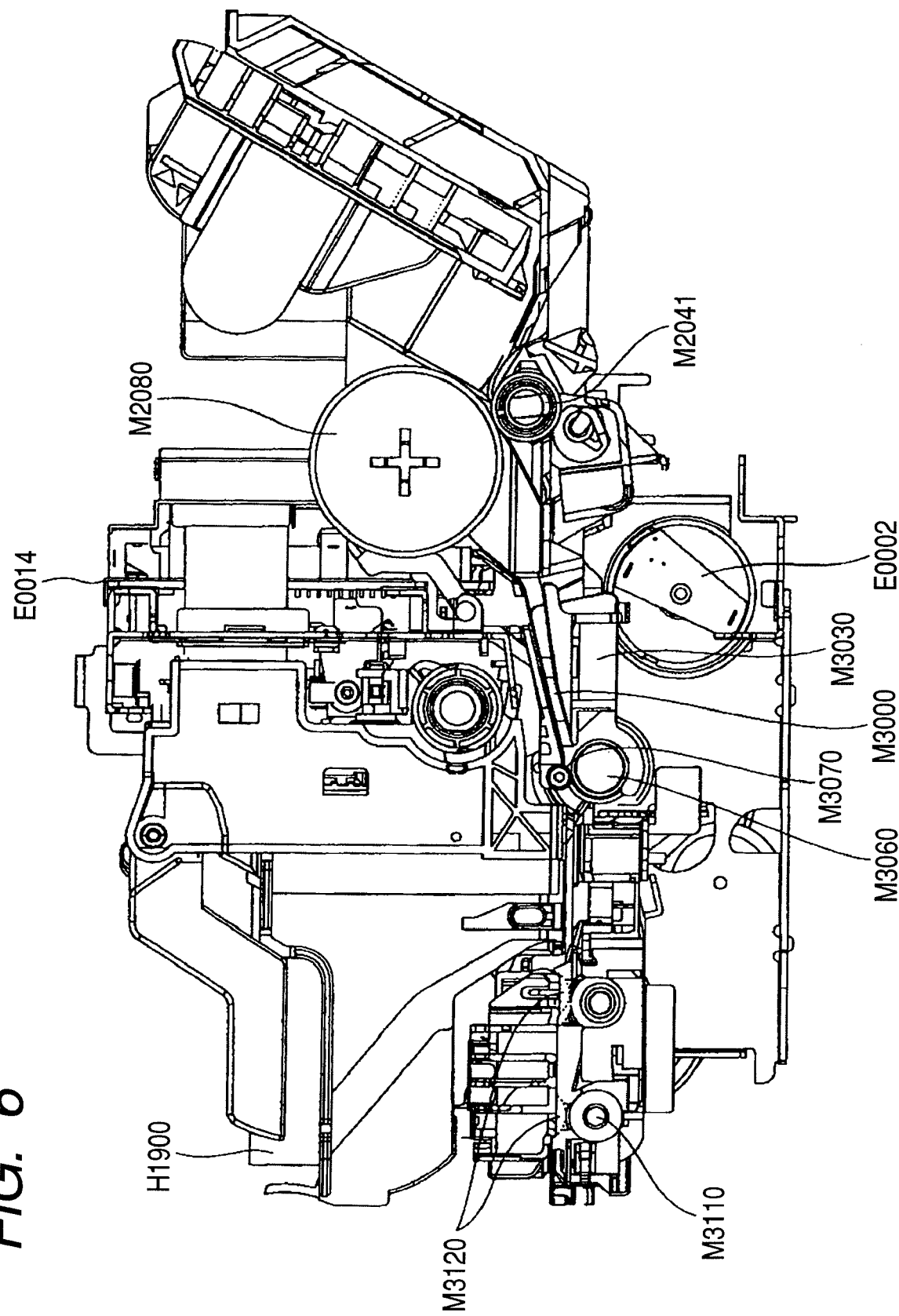
FIG. 6 is a sectional view of an ink jet recording apparatus.

FIG. 4 is a perspective view of an ink jet recording apparatus. FIGS. 5 and 6 are views for illustrating the internal mechanism of an ink jet recording apparatus, wherein FIG. 5 illustrates a perspective view seen from an upper right portion, and FIG. 6 illustrates the sectional side elevation of the ink jet recording apparatus.

When sheets are fed into the recording apparatus, only a specified number of recording media is sent to a nip portion including a sheet feeding roller M2080 and a separating roller M2041 in the sheet feeding portion including a sheet feeding tray M2060. The sent recording media are separated at the nip portion, and only the uppermost recording medium is conveyed. The recording medium conveyed to the sheet conveying portion is guided by a pinch roller holder M3000 and a paper guide flapper M3030 to be sent to a roller pair including a conveying roller M3060 and a pinch roller M3070. The roller pair including the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIGS. 7A and 7B: about the constitution will be detailed later) is arranged at a target image forming position, and ink is ejected onto the recording medium according to a signal from an electrical substrate E0014. While recording is performed by the recording head H1001, main scanning in which a carriage M4000 scans in the column direction and sub scanning in which a recording medium is conveyed in the row direction by the conveying roller M3060 are alternately repeated, whereby an image is formed on the recording medium. Finally, the recording medium on which an image has been formed is pinched at a nip between a first sheet discharge roller M3110 and a spur M3120 in the sheet discharge portion, conveyed, and discharged to a sheet discharge tray M3160.

The cleaning portion cleans the recording head H1001 before and after forming an image. A pump M5000 is operated while capping the ejection orifice of the recording head H1001 with a cap M5010 so that unnecessary ink is sucked from the ejection orifice of the recording head H1001. Further, the ink remaining in the inside of the cap M5010 is sucked with the cap M5010 opened so as to prevent sticking and other harmful effects by the residual ink.

(Constitution of Recording Head)

Figure 7A:
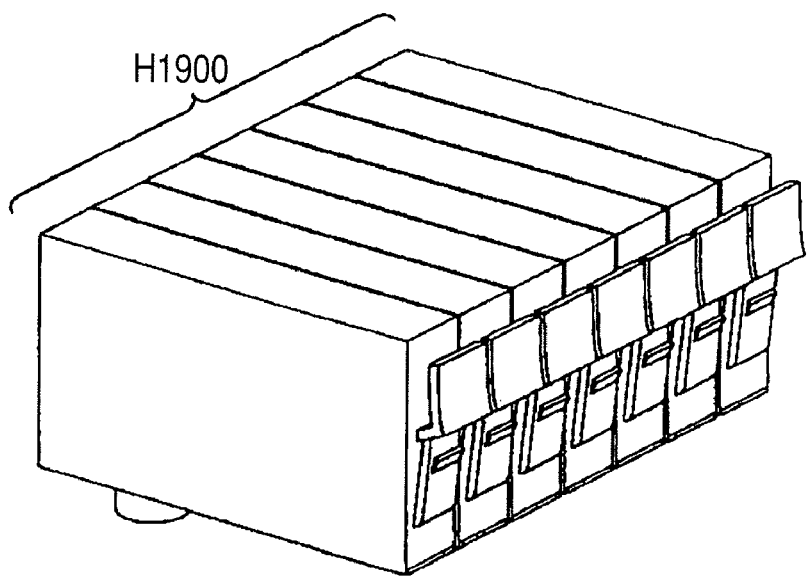
FIGS. 7A and 7B are perspective views illustrating the state of mounting an ink cartridge on a head cartridge.
Figure 7B:
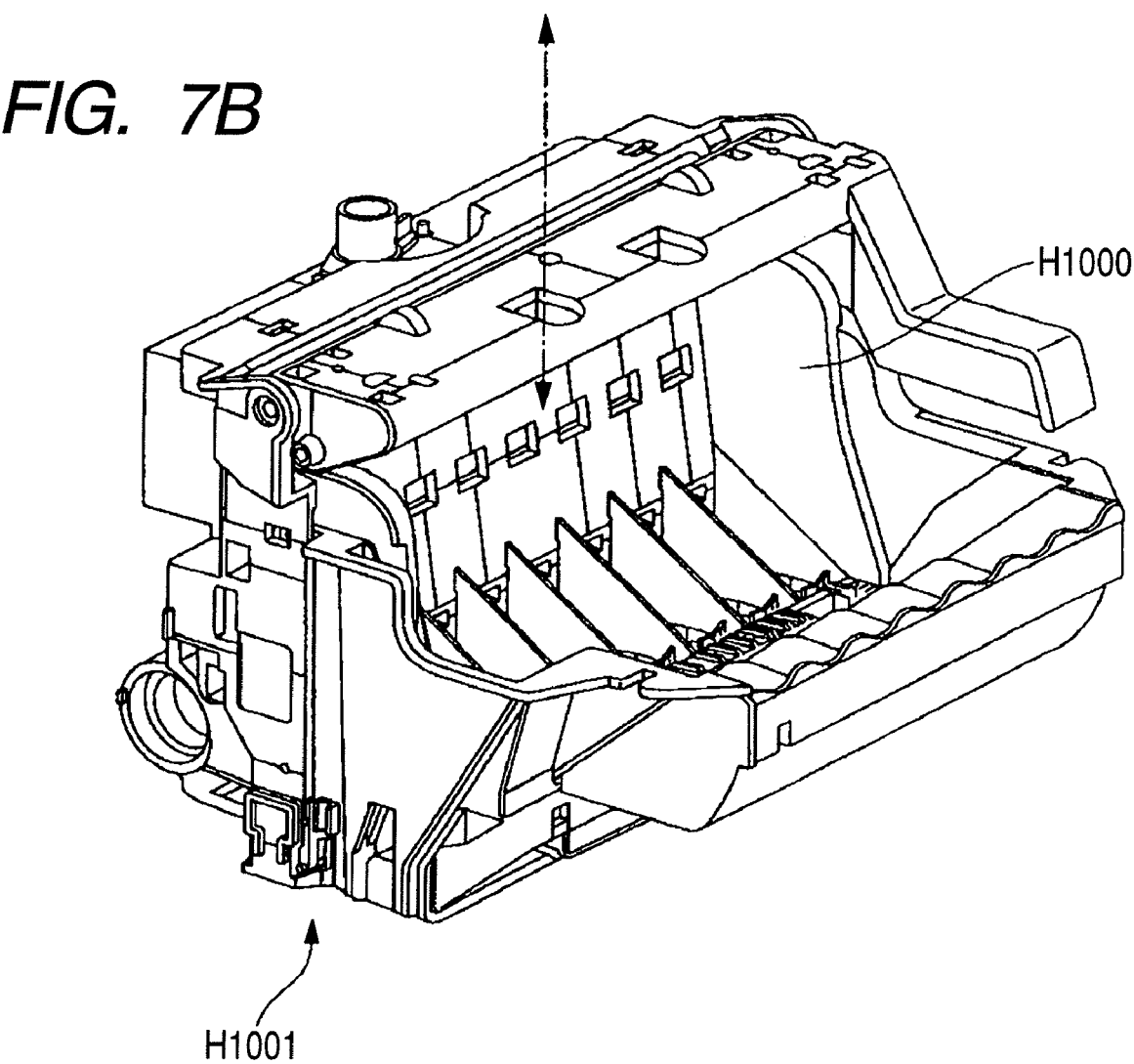

The constitution of a head cartridge H1000 will be described. FIGS. 7A and 7B are views illustrating the constitution of a head cartridge H1000 and how the ink cartridge H1900 is mounted on the head cartridge H1000. The head cartridge H1000 has a recording head H1001, a unit to mount an ink cartridge H1900 and a unit to supply ink to the recording head from the ink cartridge H1900, and is detachably mounted on a carriage M4000.

The ink jet recording apparatus forms images with yellow, magenta, cyan, black, light magenta, light cyan and green inks. Therefore, the ink cartridges H1900 are independently prepared for seven colors. Note that, the ink of the present invention is used for at least one of the above inks. In addition, as illustrated in FIGS. 7A and 7B, each ink cartridge H1900 is detachable relative to the head cartridge H1000. The ink cartridge H1900 can also be attached and detached in such a state that the head cartridge H1000 is mounted on the carriage M4000.

Figure 8:
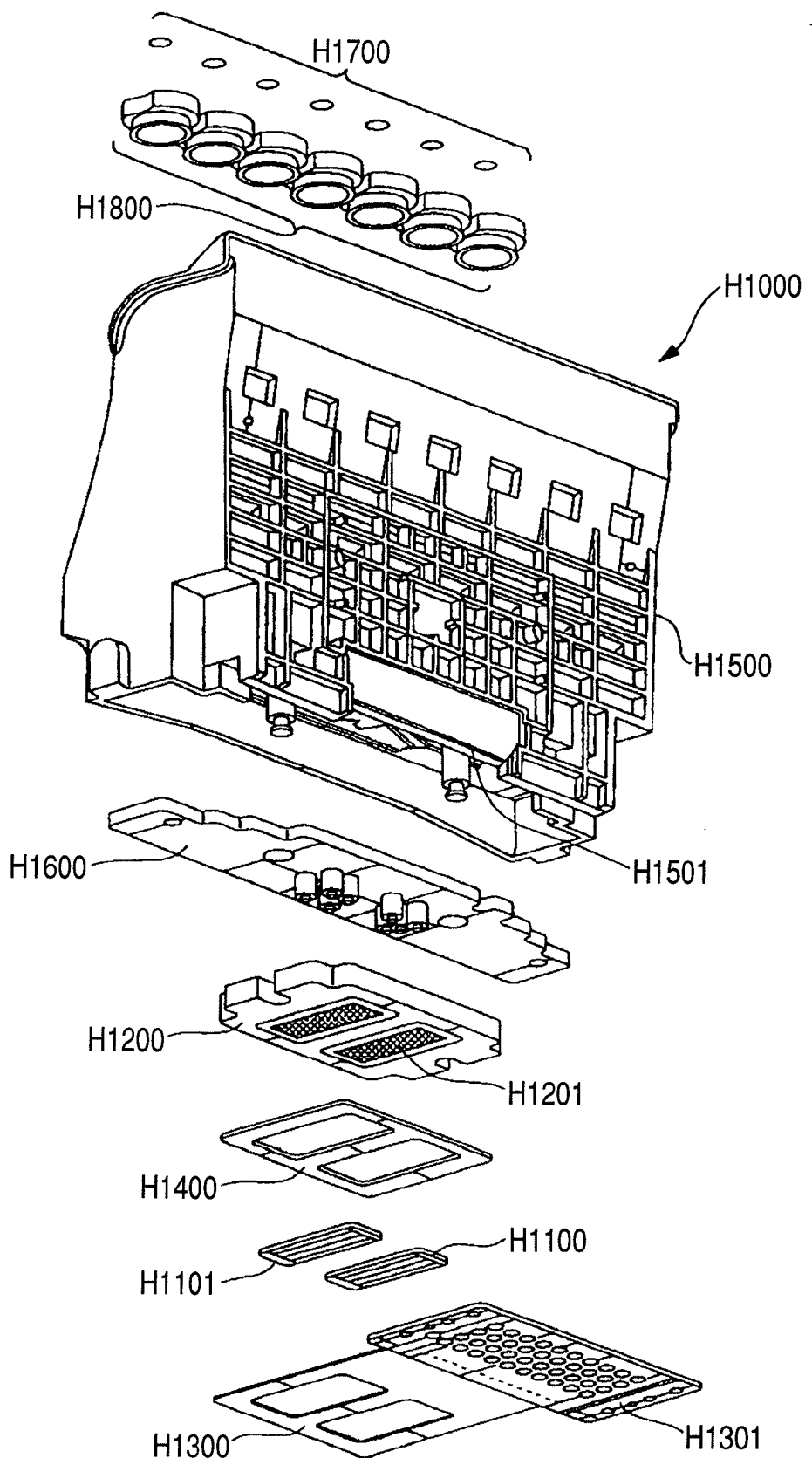
FIG. 8 is an exploded perspective view of a head cartridge.

FIG. 8 is an exploded perspective view of the head cartridge H1000. The head cartridge H1000 includes a recording element substrate, a plate, an electrical wiring substrate H1300, a cartridge holder H1500, a flow path forming member H1600, a filter H1700 and a seal rubber H1800. The recording element substrate includes a first recording element substrate H1100 and a second recording element substrate H1101, and the plate comprises a first plate H1200 and a second plate H1400.

Each of the first recording element substrate H1100 and the second recording element substrate H1101 is a Si substrate, and a plurality of recording elements (nozzles) for ejecting ink is formed on one side thereof by means of photolithography. Electrical wiring made of Al etc. to supply electric power to each recording element is formed by means of a film forming technique, and a plurality of ink flow paths corresponding to the individual recording elements is formed by photolithography. Further, ink supply ports for supplying ink to the plurality of ink flow paths are formed so as to be open on the rear surface.

Figure 9:
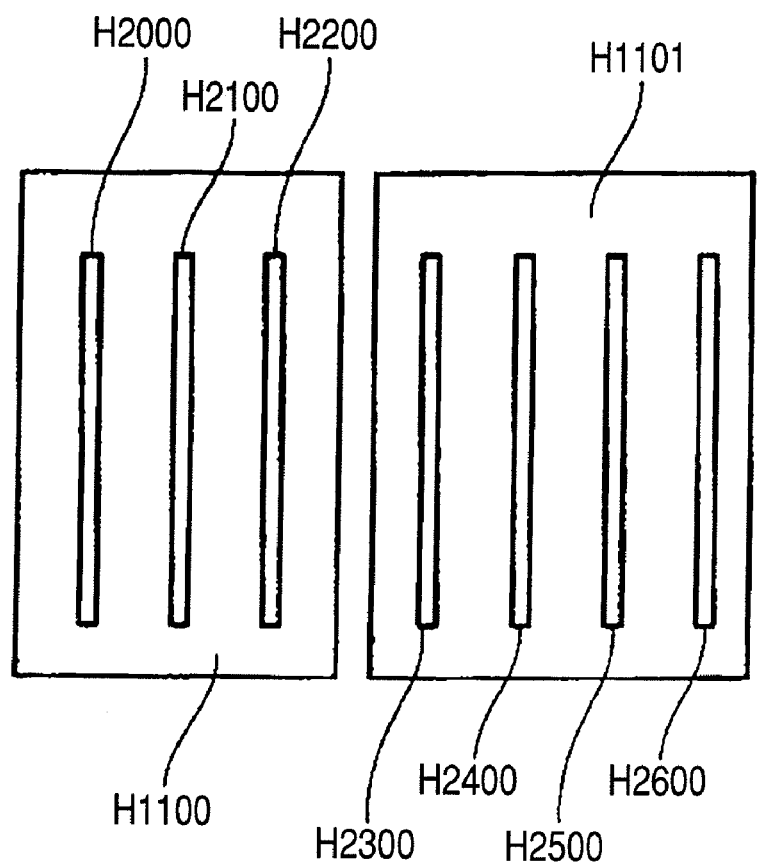
FIG. 9 is a front view illustrating a recording element substrate in a head cartridge.

FIG. 9 is an enlarged front view for describing the constitution of the first recording element substrate H1100 and the second recording element substrate H1101, which illustrates recording element trains H2000 to H2600 (hereinafter also referred to as nozzle trains) corresponding to different ink colors. The first recording element substrate H1100 has nozzle trains for three colors: a nozzle line H2000 for yellow ink, a nozzle line H2100 for magenta ink and a nozzle line H2200 for cyan ink. The second recording element substrate H1101 has nozzle trains for four colors: a nozzle line H2300 for light cyan ink, a nozzle line H2400 of black ink, a nozzle line H2500 for green ink and a nozzle line H2600 of light magenta ink.

Each nozzle train comprises 768 nozzles arranged at intervals of 1,200 dpi (dot/inch; reference value) in the conveying direction of a recording medium, and each nozzle ejects about 2 picoliter of ink. An opening area in each nozzle ejection orifice is set to be about 100 $\mu m^2$.

Hereinafter, the present invention will be described with reference to FIGS. 7 and 8. The first recording element substrate H1100 and the second recording element substrate H1101 are bonded and fixed to the first plate H1200, on which are formed ink supply ports H1201 for supplying ink to the first recording element substrate H1100 and the second recording element substrate H1101. The second plate H1400 having openings is also bonded and fixed to the first plate H1200. The second plate H1400 holds the electrical wiring substrate H1300 in such a manner that the electrical wiring substrate H1300, the first recording element substrate H1100 and the second recording element substrate H1101 are electrically connected.

The electrical wiring substrate H1300 applies electrical signals for causing each of the nozzles formed on the first recording element substrate H1100 and the second recording element substrate H1101 to eject ink. The electrical wiring substrate H1300 has: electrical wiring corresponding to each of the first recording element substrate H1100 and the second recording element substrate H1101; and an external signal input terminal H1301 which is positioned at the end portion of the electrical wiring to receive electrical signals from the ink jet recording apparatus. The external signal input terminal H1301 is positioned, and fixed to, the back surface side of the cartridge holder H1500.

A flow path forming member H1600 is fixed to a cartridge holder H1500 for holding the ink cartridges H1900 by means of, for example, ultrasonic welding. Thus, an ink flow path H1501 passing from the ink cartridges H1900 to the first plate H1200 is formed. A filter H1700 is provided at the end portion on the ink cartridge side of the ink flow path H1501 engaged with the ink cartridges H1900 so that the filter H1700 prevents dust from entering from the outside. A seal rubber H1800 is mounted on the portion at which the ink flow path H1501 is engaged with the ink cartridges H1900 to prevent ink from evaporating from this portion.

Furthermore, as described above, the head cartridge H1000 is made up by connecting the cartridge holder portion with the recording head portion H1001 by the use of an adhesive. The cartridge holder portion includes the cartridge holder H1500, the flow path forming member H1600, the filter H1700 and the seal rubber H1800, and the recording head portion H1001 includes the first recording element substrate H1100, the second recording element substrate H1101, the first plate H1200, the electrical wiring substrate H1300 and the second plate H1400.

Description has been made here by taking, as an embodiment of a recording head, a recording head according to a thermal ink jet method that performs recording by means of an electrothermal converter (recording element) for generating thermal energy for causing ink to generate film boiling according to an electrical signal. As for the representative structure and principle, it is preferable to use basic principles discussed in, for example, U.S. Pat. No. 4,723,129 and U.S. Pat. No. 4,740,796. The method is applicable to any one of a so-called on-demand type and a so-called continuous type.

In particular, the method is effective for the on-demand type because of the following reason. At least one driving signal which corresponds to recording information and causes a sudden increase in temperature exceeding nuclear boiling is applied to electrothermal converters arranged corresponding to a liquid flow path holding ink, thereby causing the electrothermal converter to generate thermal energy and causing the ink to generate film boiling. As a result, an air bubble in the ink can be formed so as to be in one-to-one correspondence with the driving signal. The growth and contraction of the air bubble eject the ink through a ejection orifice, thereby forming at least one droplet. The driving signal is more preferably of a pulse shape because the growth and contraction of an air bubble can be performed immediately and appropriately, and hence the ink can be ejected with excellent responsiveness.

The ink of the present invention can also be suitably used in an ink jet recording apparatus utilizing mechanical energy as described below. The ink jet recording apparatus in such a form comprises a nozzle forming substrate having a plurality of nozzles, a pressure generating element arranged so as to be opposite to the nozzles and comprising a piezoelectric material and a conductive material, and an ink filling the surroundings of the pressure generating element, in which the pressure generating element is displaced by an applied voltage to eject the ink from the nozzles.

The ink jet recording apparatus is not limited to such apparatuses as described above in which a recording head and an ink cartridge are separated, and may be one in which a recording head and an ink cartridge are unified so that they are unseparable. The ink cartridge may also be separably or unseparably unified with the recording head to be mounted on a carriage, or may be mounted on a fixing portion of the ink jet recording apparatus to supply ink to a recording head through an ink supply member such as a tube. Further, when the ink cartridge is provided with a constitution for applying a suitable negative pressure to the recording head, the following constitution may be adopted. That is, an absorber may be arranged in an ink storage portion of the ink cartridge, or the ink cartridge may have a flexible ink storage bag and a spring portion for applying bias in the direction of expanding the internal volume of the bag. Further, the recording apparatus may adopt a serial recording method as described above, or may be in the form of a line printer obtained by aligning recording elements over the range corresponding to the entire width of a recording medium.

EXAMPLES

Hereinafter, the present invention will be described in more detail by way of Examples and Comparative Examples. However, the present invention is not limited to the following Examples unless Examples depart from the gist of the present invention. Unless otherwise specified, the term "part(s)" of each ink component in Examples and Comparative examples represents "part(s) by mass".

<Preparation of Coloring Materials>

Compounds of the general formula (I) obtained in the following synthesis of coloring materials described are all mixtures, and unless otherwise noted, the following mixture of isomers is described as "a compound". That is, the compound includes position isomers, position isomers of a nitrogen atom in a nitrogen-containing heteroaromatic ring, isomers which are different from each other in the ratio of benzo rings/nitrogen-containing heteroaromatic rings of A, B, C and D in the general formula (I), α/β position isomers of a substituted or unsubstituted sulfamoyl group in a benzo ring, etc. As described above, since it is extremely hard to isolate a specific compound from a mixture of these isomers to determine its structure, as a matter of convenience, one example of conceivable isomers is cited as a typical example, and the structural formula thereof is described. Analyses were made for compounds obtained in synthesizing compounds of the general formula (I) by mass analysis, ICP emission spectrometry and determination of absorbance, and synthesis of each compound was confirmed.

(Mass Analysis)

DI-MS (direct mass) measurement was made for each compound. The analysis conditions for DI-MS are shown below.

EI method
Mass analysis apparatus: SSQ-7000
Ion source temperature: 230° C.
Degree of vacuum: about 8 mT (ICP Emission Spectrometry)

The content of copper was analyzed for each compound containing copper by ICP emission spectrometry. Specifically, the analysis was made as follows. About 0.1 g of an analysis sample was precisely weighted and dissolved in pure water, and then brought into a constant volume in a 100 ml measuring flask. From this liquid, 1 ml was weighed and placed in a 50 ml measuring flask by using a measuring pipette, and thereto, a predetermined amount of Y (yttrium) was added as an inner standard substance and brought into a constant volume of 50 ml by using pure water, and then the content of copper was determined by ICP emission spectrometry. An apparatus used in this case is ICP emission spectrometry apparatus, SPS3100 (manufactured by SII Nano Technology Inc.).

(Determination of Absorbance)

Determination of absorbance was made for each compound. Measurement conditions for absorbance are as shown below.

Spectrophotometer: self-recording spectrophotometer (trade name: U-3300; manufactured by Hitachi, Ltd.)
Measuring cell: 1 cm, quartz cell
Sampling interval: 0.1 nm
Scanning speed: 30 nm/min
Measurement time: measured 5 times on average (Synthesis of Compound A)

(1) Synthesis of compound (1)

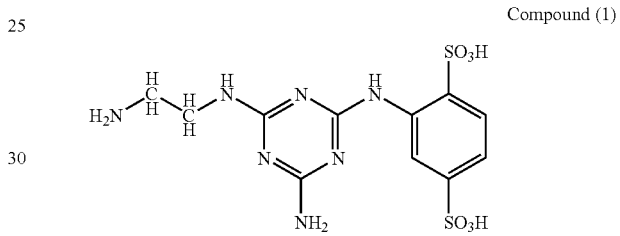

Compound (1)

To 2,000 parts of ice water, 7.2 parts of LOTAT OH-104K (made by Lion Corporation) and 239.9 parts of cyanuric chloride were added, and the mixture was stirred for 30 minutes. Thereto, 411.6 parts of aniline-2,5-monosodium disulfonate salt (purity: 91.2%) was added, and while adding a 25% sodium hydroxide aqueous solution, the reaction solution was kept at pH of 2.7 to 3.0, and was allowed to react at 10 to 15° C. for 1 hour and then at 27 to 30° C. for 2 hours. Then, after the reaction solution was cooled to 10° C. or lower, a 25% sodium hydroxide aqueous solution was added to adjust the pH of the reaction solution to 7.0 to 7.5. Thereto, 118.4 parts of 28% ammonium water was added, and the reaction solution was kept at 10 to 15° C. and pH 9.5 to 10.0 for 3 hours. Thereafter, concentrated hydrochloric acid was added, and the pH of the reaction solution was adjusted to 6.0 to 7.0. Then, 2,000 parts of ice was added, and the reaction solution was cooled to 0° C., and while keeping at 5° C. or lower, 780 parts of ethylenediamine was dropwise added. Then, the temperature of the reaction solution was kept at 10 to 15° C. for 1 hour. Subsequently, thereto, concentrated hydrochloric acid was dropwise added, and the pH of the reaction solution was adjusted to 0.9 to 1.0. During this time, ice was added so as not to raising temperature, to thereby keep the temperature of the reaction solution at 10 to 15° C. Further, thereto, ice was added to set the temperature of the reaction solution at 10° C. or lower. A liquid amount at this time was 13,000 parts. To this reaction solution, 2,600 parts of sodium chloride (20% with respect to the liquid amount) was added, and the resulting reaction solution was stirred for 1 hour to deposit crystals. The deposited crystals were separated by filtration, washed with 3,000 parts of a 20% sodium hydroxide aqueous solution, to thereby obtain 743.0 parts of a wet cake (purity: 59.3%, HPLC purity: 93.3%).

(2) Synthesis of copper tribenzo(2,3-pyrido) porphyrazine [compound (2) below: mixture in which one of A, B, C and D in the general formula (III) is a pyridine ring and the remaining three are benzene rings]

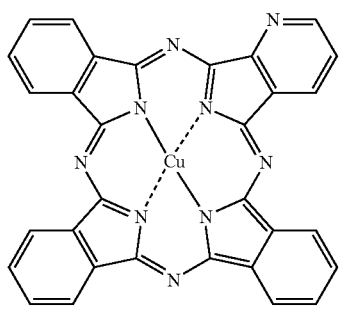

Compound (2)

To a four necked flask, 250 parts of sulfolane, 22.1 parts of phthalimido, 8.4 parts of quinolic acid, 72.0 parts of urea, 8.8 parts of copper (II) chloride dihydrate (purity: 97.0%), and 1.0 part of ammonium molybdate were added, and the temperature of the reaction solution was increased to 200° C. and kept for 5 hours. After completion of the reaction, the reaction solution was cooled to 75° C., and 200 parts of methanol was added thereto, and crystals were filtered off. The obtained crystals were washed with 250 parts of methanol, and subsequently with 500 parts of warm water, to thereby obtain 61.9 parts of a wet cake. The obtained wet cake was added to 500 parts of 5% hydrochloric acid, and the temperature of this liquid was increased to 60° C. and kept for 1 hour. The obtained crystals were filtered off and washed with 300 parts of water. Subsequently, the obtained wet cake was added to 500 parts of 10% ammonium water, and the temperature of the liquid was set at 25 to 30° C. and kept for 1 hour. The obtained crystals were filtered off and then washed with 300 parts of water to obtain 64.9 parts of a wet cake. The obtained wet cake was dried at 80° C., to thereby obtain 20.9 parts of blue crystals. Analysis was made for the blue crystals, and as a result, the following measured values were obtained. From this result, it was confirmed that the obtained blue crystals were a compound having the above structure.

Maximum absorption wavelength ($\lambda_{max}$): 670.5 nm (in pyridine)

Element analysis result: $C_{31}H_{15}N_9Cu$

TABLE 5

|  | C | H | N | Cu |
|---|---|---|---|---|
| Calculated value (%) | 64.52 | 2.62 | 21.85 | 11.01 |
| Found value (%) | 63.80 | 2.79 | 20.59 | 10.92 |

(3) Synthesis of copper tribenzo(2,3-pyrido) porphyrazine trisulfonyl chloride [compound (3) below: mixture in which one of outermost aromatic rings of the main component in the mixture is a pyridine ring and the remaining three are benzene rings]

Compound (3)

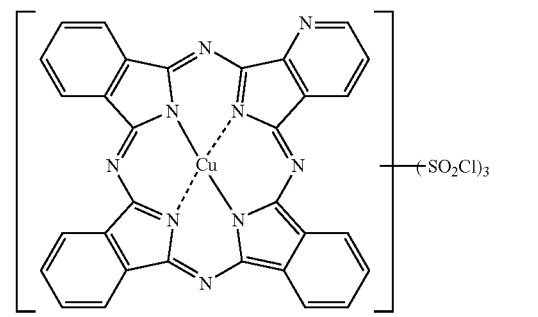

To 46.2 parts of chlorosulfonic acid, 5.8 parts of the above obtained copper tribenzo(2,3-pyrido) porphyrazine was gradually added under stirring while keeping the temperature of the liquid at 60° C. or lower, and then reaction was carried out at 140° C. for 4 hours. Then, the reaction solution was cooled to 70° C., and 17.9 parts of thionyl chloride was dropwise added thereto over 30 minutes, and the reaction was performed at 70° C. for 3 hours. The reaction solution was cooled to 30° C. or lower, and gradually poured into 500 parts of ice water, and deposited crystals was filtered off and washed with 200 parts of cold water, to thereby obtain 71.1 parts of a wet cake of copper tribenzo(2,3-pyrido)porphyrazine trisulfonyl chloride.

(4) Synthesis of compound (4) below [mixture containing exemplified compound I-1: mixture in which one of outermost aromatic rings of the main component in the mixture is a pyridine ring and the remaining three are benzene rings, b is 2.4 and c is 0.6]

Compound (4)

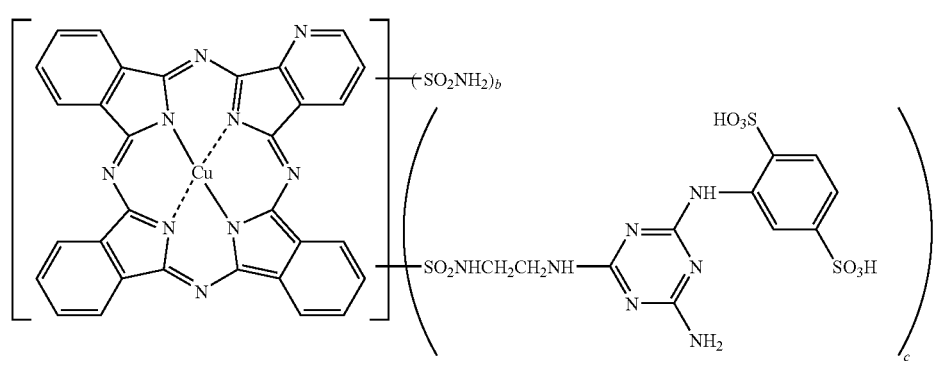

To 200 parts of ice water, 71.1 parts of the above obtained wet cake of copper tribenzo(2,3-pyrido) porphyrazine trisulfonyl chloride was added, and the mixture was suspended by stirring. Then, to the resultant reaction solution, 20.5 parts of the compound (1) obtained above (purity: 59.3%) dissolved in 3.0 parts of ammonium water and 100 parts of hot water was added, and the pH of the reaction solution was kept at 9.0 to 9.3 by adding 28% ammonium water, and reaction was carried out at 17 to 20° C. for 6 hours. Then, the temperature of the reaction solution was increased to 60° C. The liquid amount at this time was 500 parts. To the resultant reaction solution, 100 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride aqueous solution to obtain 47.7 parts of a wet cake. The obtained wet cake was dissolved again in water, thereby adjusting the pH of the liquid to 9.0. Thereafter, the total amount was adjusted to 300 parts, and the temperature was increased to 60° C. The liquid amount at this time was 320 parts. To the resultant reaction solution, 48 parts of sodium chloride (15% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 15% sodium chloride aqueous solution, to thereby obtain 47.8 parts of a wet cake. To 250 parts of methanol, 47.8 parts of the obtained wet cake was added, and the resultant liquid was suspended by stirring at 60° C. for 1 hour, and then filtered off, washed with 100 parts of methanol, and dried, to thereby obtain 10.7 parts of blue crystals (compound A). Analysis was made for the blue crystals, and as a result, the following measured values were obtained. Maximum absorption wavelength ($\lambda_{max}$): 611 nm (in an aqueous solution)

(Synthesis of Compound B)

(1) Synthesis of copper dibenzobis(2,3-pyrido)porphyrazine [compound (5) below: mixture in which two of A, B, C and D in the general formula (III) are pyridine rings and the remaining two are benzene rings]

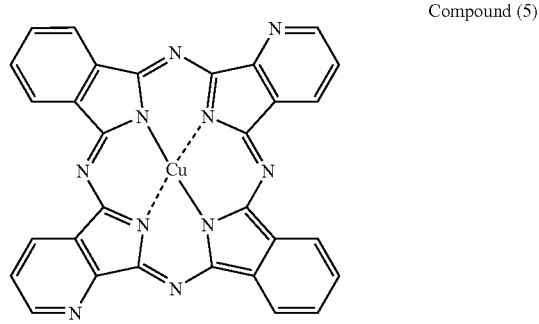

Compound (5)

To a four necked flask, 250 parts of sulfolane, 14.7 parts of phthalimido, 16.7 parts of quinolic acid, 72.0 parts of urea, 8.8 parts of copper (II) chloride dihydrate (purity: 97.0%), and 1.0 part of ammonium molybdate were added, and the temperature of the reaction solution was increased to 200° C. and kept for 5 hours. After completion of the reaction, the reaction solution was cooled to 85° C., and 200 parts of methanol was added thereto, and crystals were filtered off. The obtained crystal was washed with 200 parts of methanol and subsequently with 500 parts of hot water, and dried, to thereby obtain 24.1 parts of crude copper dibenzobis(2,3-pyrido)porphyrazine (mixture) as blue crystals. To 500 parts of 5% hydrochloric acid, 24.1 parts of the obtained crude copper dibenzobis(2,3-pyrido)porphyrazine (mixture) was added, and the temperature of the resultant liquid was increased to 60° C. and kept for 1 hour. Then, the crystals were filtered off and washed with 100 parts of water to obtain a wet cake. Subsequently, the obtained wet cake was added to 500 parts of 10% ammonium water, and the temperature of the liquid was kept at 25 to 30° C. for 1 hour. The obtained crystals were filtered off and then washed with 200 parts of water, to thereby obtain 44.4 parts of a wet cake. The obtained wet cake was dried at 80° C., to thereby obtain 17.7 parts of copper dibenzobis(2,3-pyrido)porphyrazine (mixture) as blue crystals. Analysis was made for the blue crystals, and as a result, the following measured values were obtained. From this result, it was confirmed that the obtained blue crystals were a compound having the above structure.

Maximum absorption wavelength ($\lambda_{max}$): 662.5 nm (in pyridine)

Element analysis result: $C_{30}H_{14}N_{10}Cu$

TABLE 6

|  | C | H | N | Cu |
|---|---|---|---|---|
| Calculated value (%) | 62.33 | 2.44 | 24.23 | 10.99 |
| Found value (%) | 61.46 | 2.62 | 23.35 | 10.37 |

(2) Synthesis of copper dibenzobis(2,3-pyrido)porphyrazine disulfonyl chloride [compound (6) below: mixture in which two of outermost aromatic rings of the main component in the mixture are pyridine rings and the remaining two are benzene rings]

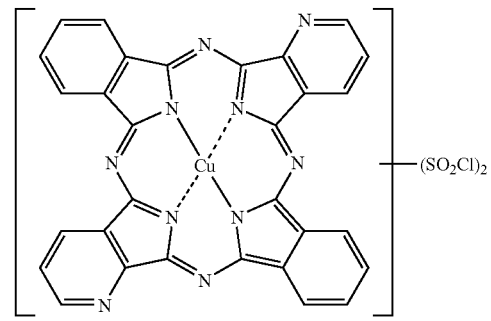

Compound (6)

Into 46.2 parts of chlorosulfonic acid, 5.8 parts of the above obtained copper dibenzobis(2,3-pyrido)porphyrazine was gradually poured under stirring while keeping the temperature of the liquid at 60° C. or lower, and then reaction was carried out at 140° C. for 4 hours. After that, the reaction solution was cooled to 70° C., and 17.9 parts of thionyl chloride was dropwise added thereto over 30 minutes, and reaction was carried out at 70° C. for 3 hours. The reaction solution was cooled to 30° C. or lower, and gradually poured into 500 parts of ice water, and the deposited crystals were filtered off and washed with 200 parts of cold water to thereby obtain 46.0 parts of a wet cake of copper dibenzobis(2,3-pyrido) porphyrazine disulfonyl chloride.

(3) Synthesis of compound (7) below [mixture containing exemplified compounds I-2 and I-3: mixture in which two of outermost aromatic rings of the main component in the mixture are pyridine rings and the remaining two are benzene rings, b is 1.6 and c is 0.4]

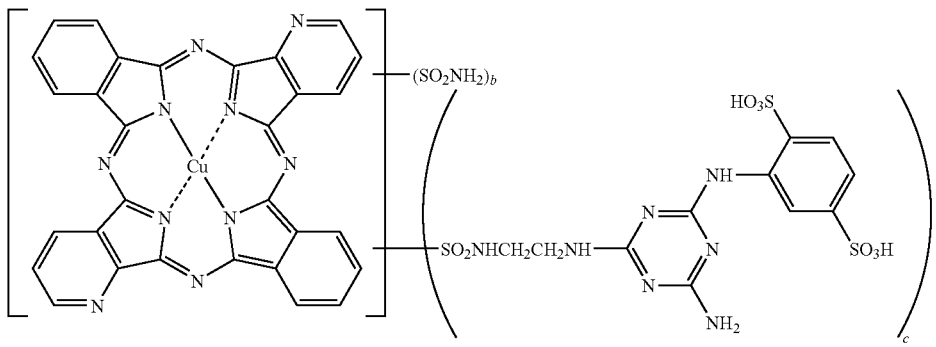

Compound (7)

To 250 parts of ice water, 46.0 parts of the above obtained wet cake of copper dibenzobis(2,3-pyrido)porphyrazine disulfonyl chloride, and the mixture was suspended by stirring. Then, to the resultant reaction solution, 20.5 parts of the compound (1) obtained in the synthesis of the compound A (purity: 59.3%), dissolved in 4.0 parts of ammonium water and 100 parts of warm water, was added. To this reaction solution, 28% ammonium water was added, thereby keeping the pH of the reaction solution at 9.0 to 9.3, and reaction was made at 17 to 20° C. for 4 hours. Then, the temperature of the reaction solution was increased to 60° C. The liquid amount at this time was 480 parts. To the resultant reaction solution, 48 parts of sodium chloride (10% with respect to the liquid amount) was added, and the pH of the liquid was adjusted to 1.0 by adding a 35% hydrochloric acid aqueous solution to deposit crystals. The deposited crystal was separated by filtration, and washed with 100 parts of a 15% sodium chloride aqueous solution, to thereby obtain 86.1 parts of a wet cake. The obtained wet cake was dissolved again in water, thereby adjusting the pH of the liquid to 9.0, then the total amount was adjusted to 400 parts, and the temperature was increased to 60° C. The liquid amount at this time was 410 parts. To the resultant reaction solution, 41 parts of sodium chloride (10% for the liquid amount) was added, and the pH of the liquid was adjusted to 1.0 by adding a 35% hydrochloric acid aqueous solution, to thereby deposit crystals. The deposited crystals were separated by filtration, and washed with 100 parts of a 10% sodium chloride aqueous solution, to thereby obtain 65.7 parts of a wet cake. To 330 parts of methanol, 65.7 parts of the obtained wet cake was added, and the resultant liquid was suspended by stirring at 60° C. for 1 hour, and then filtered, washed with 100 parts of methanol, and dried, to thereby obtain 9.3 parts of blue crystals (compound B). Analysis was made for the blue crystals, and as a result, the following measured values were obtained.

Maximum absorption wavelength ($\lambda$max): 602 nm (in an aqueous solution)

(Synthesis of Compound C)

(1) Synthesis of copper benzotris(2,3-pyrido)porphyrazine [compound (8) below: mixture in which three of A, B, C and D in the general formula (III) are pyridine rings and the remaining one is a benzene ring]

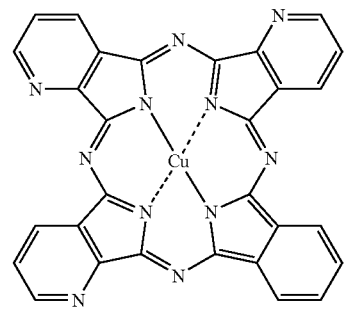

Compound (8)

To a four necked flask, 250 parts of sulfolane, 7.4 parts of phthalimido, 25.1 parts of quinolic acid, 72.0 parts of urea, 8.8 parts of copper (II) chloride dihydrate (purity: 97.0%), and 1.0 part of ammonium molybdate were added, and the temperature of the reaction solution was increased to 200° C. and kept for 5 hours. After completion of the reaction, the reaction solution was cooled to 70° C., and 200 parts of methanol was added thereto, and crystals were filtered off. The obtained crystals were washed with 200 parts of methanol, and subsequently with 500 parts of warm water and then dried, to thereby obtain 20.5 parts of crude copper benzotris (2,3-pyrido)porphyrazine (mixture) as blue crystals. To 500 parts of 5% hydrochloric acid, 14.5 parts of the obtained crude copper benzotris(2,3-pyrido)porphyrazine (mixture), and the temperature of this liquid was increased to 60° C. and kept for 1 hour. Thereafter, crystals were filtered off and washed with 100 parts of water. Subsequently, the obtained wet cake was added to 500 parts of 10% ammonium water, and the temperature of the liquid was set at 25 to 30° C. and kept for 1 hour. The obtained crystals were filtered off and then washed with 100 parts of water, to thereby obtain 23.5 parts of a wet cake. The obtained wet cake was dried at 80° C., to thereby obtain 9.7 parts of copper benzotris(2,3-pyrido) porphyrazine (mixture) as blue crystals. Analysis was made for the blue crystals, and as a result, the following measured values were obtained. From this result, it was confirmed that the obtained blue crystals were a compound having the above described structure.

Maximum absorption wavelength ($\lambda_{max}$): 655 nm (in pyridine)

Element analysis result: $C_{29}H_{13}N_{11}Cu$

TABLE 7

|  | C | H | N | Cu |
| --- | --- | --- | --- | --- |
| Calculated value (%) | 60.15 | 2.26 | 26.60 | 10.97 |
| Found value (%) | 58.73 | 2.48 | 25.87 | 10.08 |

(2) Synthesis of copper benzotris(2,3-pyrido)porphyrazine sulfonyl chloride [compound (9) below: mixture in which three of outermost aromatic rings of the main component in the mixture are pyridine rings and the remaining one is a benzene ring]

Compound (9)

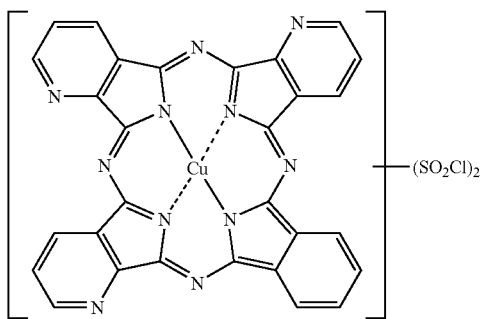

To 46.2 parts of chlorosulfonic acid, 5.8 parts of the above obtained crude copper benzotris(2,3-pyrido)porphyrazine was gradually added under stirring while keeping the temperature of the liquid at 60° C. or lower, and then reaction was performed at 140° C. for 4 hours. Then, the reaction solution was cooled to 70° C., and 17.9 parts of thionyl chloride was dropwise added thereto over 30 minutes, and reaction was carried out at 70° C. for 3 hours. The reaction solution was cooled to 30° C. or lower, and gradually poured into 500 parts of ice water, and deposited crystals were filtered off and washed with 200 parts of cold water, to thereby obtain 33.0 parts of a wet cake of copper benzotris(2,3-pyrido)porphyrazine sulfonyl chloride.

(3) Synthesis of compound (10) below [mixture in which three of outermost aromatic rings of the main component in the mixture are pyridine rings and the remaining one is a benzene ring, b is 0.9 and c is 0.1]

To 250 parts of ice water, 33.0 parts of the above obtained wet cake of copper benzotris(2,3-pyrido)porphyrazine sulfonyl chloride was added, and the mixture was suspended by stirring. Then, to the resultant reaction solution, 20.5 parts of the compound obtained (1) in the synthesis of the compound A (purity: 59.3%), dissolved in 4.0 parts of ammonium water and 90 parts of hot water, was added. To this reaction solution, 28% ammonium water was added, thereby keeping the pH of the reaction solution at 9.0 to 9.3, and reaction was performed at 17 to 20° C. for 3 hours. Then, the temperature of the reaction solution was increased to 60° C. The liquid amount at this time was 450 parts. To the resultant reaction solution, 67.5 parts of sodium chloride (15% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 15% sodium chloride aqueous solution, to thereby obtain 42.6 parts of a wet cake. The obtained wet cake was dissolved again in water, thereby adjusting the pH of the liquid to 9.0, then the total amount was adjusted to 300 pans, and the temperature was increased to 60° C. The liquid amount at this time was 310 parts. To the resultant reaction solution, 31 parts of sodium chloride (10% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 10% sodium chloride aqueous solution, to thereby obtain 42.8 parts of a wet cake. To 220 parts of methanol, 42.8 parts of the obtained wet cake was added, and the resultant liquid was suspended by stirring at 60° C. or 1 hour, and then filtered, washed with 100 parts of methanol, and dried, to thereby obtain 5.0 parts of blue crystals (compound C). Analysis was made for the blue crystals, and as a result, the following measured values were obtained.

Maximum absorption wavelength (λmax): 584 nm (in an aqueous solution)

(Synthesis of Compound D)

(1) Synthesis of copper tribenzo(2,3-pyrido)porphyrazine sodium trisulfonate [compound (11) below: sodium salt of mixture in which one of outermost aromatic rings of the main component in the mixture is a pyridine ring and the remaining three are benzene rings]

Compound (10)

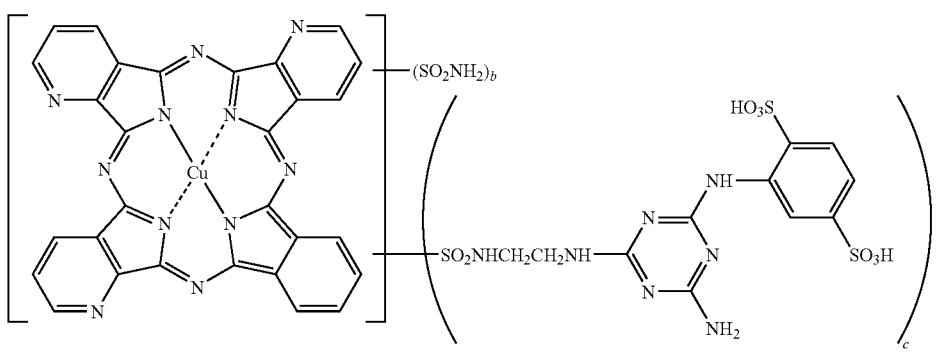

Compound (11)

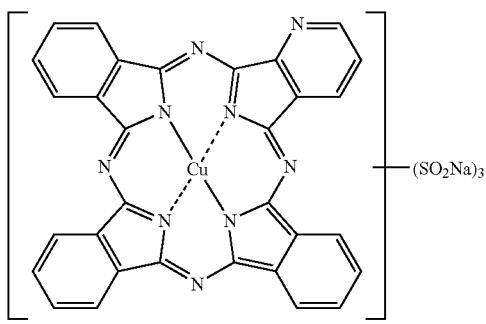

To a four necked flask, 250 parts of sulfolane, 73.8 parts of 4-sulfophthalic acid (50% aqueous solution, containing 20% of 3-sulfophthalic acid, produced by Pilot Chemical Company), and 27.3 parts of 28% ammonium water were added, and the temperature of the reaction solution was increased to 160° C. while distilling water away. After completion of the reaction, the reaction solution was cooled to 100° C., and thereto, 8.4 parts of quinolic acid, 72.0 parts of urea, 8.8 parts of copper (II) chloride dihydrate (purity: 97.0%) and 1.0 part of ammonium molybdate were added, and the temperature of the reaction solution was increased to 200° C. and kept for 5 hours. After completion of the reaction, the reaction solution was cooled to 90° C., and 200 parts of methanol was added thereto, and crystals were filtered off. The obtained crystals were washed with 750 parts of methanol to obtain a wet cake. The obtained wet cake was added to a liquid obtained by mixing 900 parts of 28.6% salt water and 100 parts of concentrated hydrochloric acid, and the temperature of the resultant liquid was increased to 60° C. and kept for 1 hour. The obtained crystals were filtered off and then washed with a liquid obtained by mixing 225 parts of 28.6% salt water and 25 parts of concentrated hydrochloric acid. Then, the obtained wet cake was added to 500 parts of methanol, and subsequently thereto, 50 parts of 28% ammonium water was added, and the temperature of the resultant liquid was increased to 60° C. and kept for 1 hour. The crystals were filtered off and washed with 200 parts of methanol, to thereby obtain 78.1 parts of a wet cake. The obtained wet cake was added to 500 parts of methanol, and subsequently thereto, 30 parts of a 25% aqueous sodium hydroxide solution was added, and the temperature of this liquid was increased to 60° C. and kept for 1 hour. The crystals were filtered off and washed with 200 parts of methanol, to thereby obtain 72.6 parts of a wet cake. The obtained wet cake was dried at 80° C., to thereby obtain 32.4 parts of copper tribenzo(2,3-pyrido) porphyrazine sodium trisulfonate as a blue crystal. Analysis was made for the blue crystals, and as a result, the following measured values were obtained.

Maximum absorption wavelength ($\lambda_{max}$): 625 nm (in an aqueous solution)

(2) Synthesis of copper tribenzo(2,3-pyrido)porphyrazine trisulfonyl chloride [compound (12) below: mixture in which one of outermost aromatic rings of the main component in the mixture is a pyridine ring and the remaining three are benzene rings]

Compound (12)

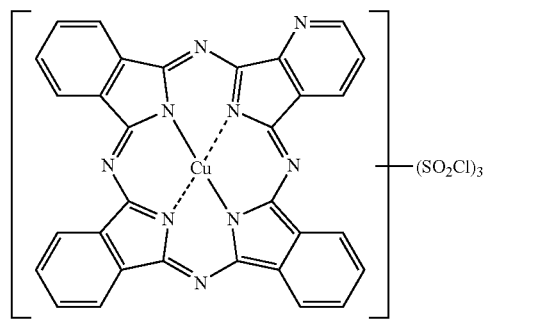

To 70.6 parts of chlorosulfonic acid, 8.8 parts of the above obtained copper tribenzo(2,3-pyrido) porphyrazine sodium trisulfonate was gradually poured under stirring while keeping the temperature of the liquid at 60° C. or lower, and then reaction was performed at 120° C. for 4 hours. Thereafter, the reaction solution was cooled to 70° C., and 17.9 parts of thionyl chloride was dropwise added thereto over 30 minutes, and reaction was carried out at 70° C. for 3 hours. The reaction solution was cooled to 30° C. or lower and gradually poured into 500 parts of ice water, and deposited crystals were filtered off and washed with 100 parts of cold water, to thereby obtain 61.2 parts of a wet cake of copper tribenzo(2,3-pyrido) porphyrazine trisulfonyl chloride (mixture).

(3) Synthesis of compound (13) below [mixture containing exemplified compounds I-1: mixture in which one of outermost aromatic rings of the main component in the mixture is a pyridine ring and the remaining three are benzene rings, b is 2 and c is 1]

Compound (13)

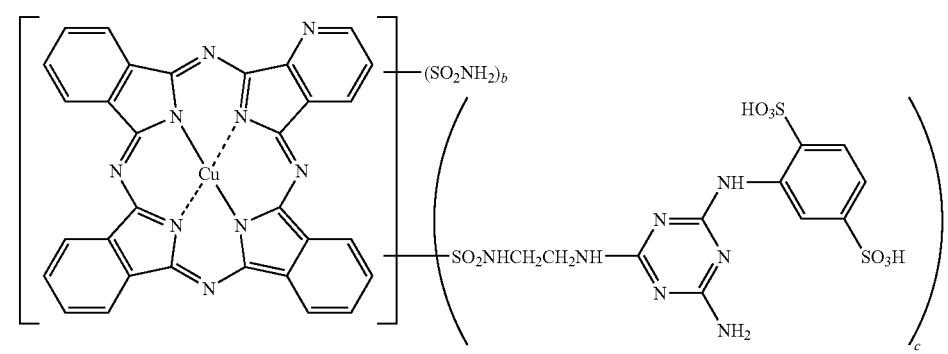

To 250 parts of ice water, 61.2 parts of the above obtained wet cake of copper tribenzo(2,3-pyrido)porphyrazine trisulfonyl chloride was added, and the mixture was suspended by stirring. Thereafter, to the resultant reaction solution, 20.5 parts of the compound (1) obtained in the synthesis of the compound A (purity: 59.3%), dissolved in 3.0 parts of ammonium water and 90 parts of warm water was added. To this reaction solution, 28% ammonium water was added, thereby keeping the pH of the reaction solution at 9.0 to 9.3, and reaction was performed at 17 to 20° C. for 4 hours. Then, the temperature of the reaction solution was increased to 60° C. The liquid amount at this time was 500 parts. To the resultant reaction solution, 100 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride aqueous solution, to thereby obtain 37.0 parts of a wet cake. The obtained wet cake was dissolved again in water, thereby adjusting the pH of the liquid to 9.0, then the total amount was adjusted to 400 parts, and the temperature was increased to 60° C. The liquid amount at this time was 400 parts. To the resultant reaction solution, 80 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride solution, to thereby obtain 39.2 parts of a wet cake. To 200 parts of methanol, 39.2 parts of the obtained wet cake was added, and the resultant liquid was suspended by stirring at 60° C. for 1 hour, and then filtered, washed with 200 pans of methanol, and dried, to thereby obtain 9.8 pans of blue crystals (compound D). Analysis was made on this blue crystal, and as a result, the following measured values were obtained.

Maximum absorption wavelength (λmax): 614 nm (in an aqueous solution)

(Synthesis of Compound E)

(1) Synthesis of copper dibenzobis(2,3-pyrido)porphyrazine sodium disulfonate [compound (14) below: sodium salt of mixture in which two of outermost aromatic rings of the main component in the mixture are pyridine rings and the remaining two are benzene rings]

Compound (14)

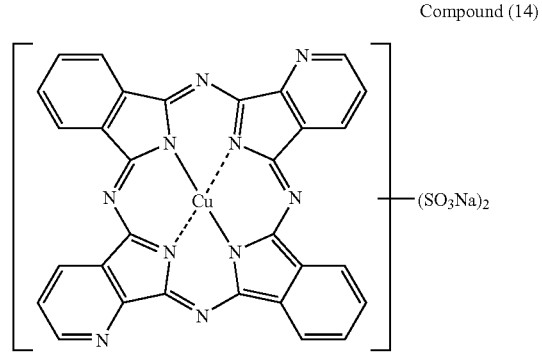

To a four necked flask, 250 parts of sulfolane, 49.2 parts of 4-sulfophthalic acid (50% aqueous solution, containing 20% of 3-sulfophthalic acid, produced by Pilot Chemical Company), and 18.2 parts of 28% ammonium water were added, and the temperature of the reaction solution was increased to 160° C. while distilling water away. Then, the reaction solution was cooled to 110° C., and thereto, 16.7 parts of quinolic acid, 72.0 parts of urea, 8.8 parts of copper (II) chloride dihydrate (purity: 97.0%), and 1.0 part of ammonium molybdate were added, and the temperature of the reaction solution was increased to 200° C. and kept for 5 hours. After completion of the reaction, the reaction solution was cooled to 70° C., and 100 parts of methanol was added thereto, and crystals were filtered off. The obtained crystals were washed with 150 parts of methanol, and then dried, to thereby obtain 36.9 parts of blue crystals. The obtained blue crystals were added to a liquid obtained by mixing 1,000 parts of 20% salt water and 10 parts of concentrated hydrochloric acid, and the temperature of this liquid was increased to 60° C. and kept for 1 hour. After that, a 25% sodium hydroxide aqueous solution was added to adjust the pH of the liquid to 7 to 8, and deposited crystals were separated by filtration, to thereby obtain a wet cake. The obtained wet cake was added to 100 parts of water, and the temperature of the liquid was increased to 60° C. and kept for 1 hour, and thereto, 600 parts of methanol was added to deposit crystals. The obtained crystals were filtered and then washed with 100 parts of methanol, to thereby obtain 110.7 parts of a wet cake. The obtained wet cake was dried at 80° C., to thereby obtain 28.9 parts of copper dibenzobis(2,3-pyrido)porphyrazine sodium disulfonate as blue crystals. Analysis was made for the blue crystals, and as a result, the following measured values were obtained.

Maximum absorption wavelength ($\lambda_{max}$): 607.5 nm (in an aqueous solution)

(2) Synthesis of copper dibenzobis(2,3-pyrido)porphyrazine disulfonyl chloride [compound (15) below: mixture in which two of outermost aromatic rings of the main component in the mixture are pyridine rings and the remaining two are benzene rings]

Compound (15)

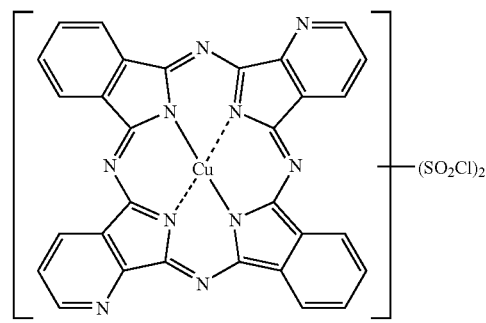

To 62.6 parts of chlorosulfonic acid, 7.8 parts of the above obtained copper dibenzobis(2,3-pyrido)porphyrazine sodium disulfonate was gradually poured under stirring while keeping the temperature of the liquid at 60° C. or lower, and then reaction was performed at 120° C. for 4 hours. Thereafter, the reaction solution was cooled to 70° C., and 17.9 parts of thionyl chloride was dropped thereto over 30 minutes, and reaction was carried out at 70° C. for 3 hours. The reaction solution was cooled to 30° C. or lower, and gradually poured into 500 parts of ice water, and deposited crystals were filtered and washed with 200 parts of cold water, to thereby obtain 44.3 parts of a wet cake of copper dibenzobis(2,3-pyrido)porphyrazine disulfonyl chloride (mixture).

(3) Synthesis of compound (16) below [mixture containing exemplified compounds I-2 and I-3: mixture in which two of outermost aromatic rings of the main component in the mixture are pyridine rings and the remaining two are benzene rings, b is 1.7 and c is 0.3]

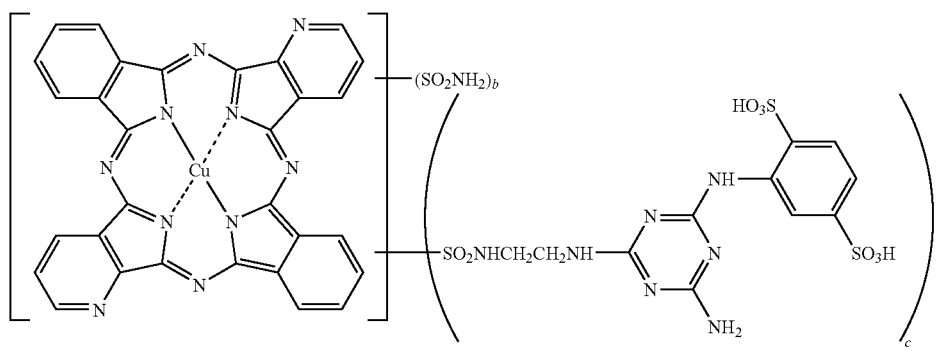

Compound (16)

To 250 parts of ice water, 44.3 parts of the above obtained wet cake of copper dibenzobis(2,3-pyrido) porphyrazine disulfonyl chloride was added, and the mixture was suspended by stirring. Then, to the resultant reaction solution, 25.3 parts of the compound (1) obtained in the synthesis of the compound A (purity: 59.3%), dissolved in 5.0 parts of ammonium water and 100 parts of warm water, was added. To this reaction solution, 28% ammonium water was added, thereby keeping the pH of the reaction solution at 9.0 to 9.3, and reaction was performed at 17 to 20° C. for 3 hours. Thereafter, the temperature of the reaction solution was increased to 60° C. The liquid amount at this time was 520 parts. To the resultant reaction solution, 104 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride aqueous solution, to thereby obtain 27.6 parts of a wet cake. The obtained wet cake was dissolved again in water, thereby adjusting the pH of the liquid to 9.0, then the total amount was adjusted to 300 parts, and the temperature was increased to 60° C. The liquid amount at this time was 310 parts. To the resultant reaction solution, 62 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride aqueous solution, to thereby obtain 32.0 parts of a wet cake. To 160 parts of methanol, 32.0 parts of the obtained wet cake was added, and the resultant liquid was suspended by stirring at 60° C. for 1 hour, and then filtered, washed with 100 parts of methanol and dried, to thereby obtain 7.6 parts of blue crystals (compound E). Analysis was made for the blue crystals, and as a result, the following measured values were obtained.

Maximum absorption wavelength (λmax): 609 nm (in an aqueous solution)

(Synthesis of Compound F)

(1) Synthesis of copper dibenzobis(2,3-pyrazino)porphyrazine sodium disulfonate [compound (17) below: sodium salt of mixture in which two of outermost aromatic rings of the main component in the mixture are pyradine rings and the remaining two are benzene rings]

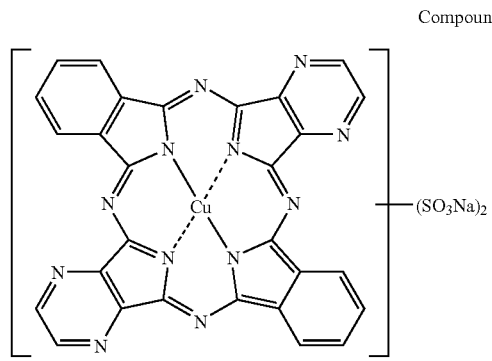

Compound (17)

To a four necked flask, 250 parts of sulfolane, 49.2 parts of 4-sulfophthalic acid (50% aqueous solution, containing 20% of 3-sulfophthalic acid, produced by Pilot Chemical Company), and 18.2 parts of 28% ammonium water were added, and the temperature of the reaction solution was increased to 160° C. while distilling water away. Then, the reaction solution was cooled to 100° C., and thereto, 16.8 parts of pyrazinedicarboxylic acid, 72.0 parts of urea, 8.8 parts of copper (II) chloride dihydrate (purity: 97.0%), and 1.0 part of ammonium molybdate were added, and the temperature of the reaction solution was increased to 200° C. and kept for 5 hours. After completion of the reaction, the reaction solution was cooled to 70° C., and 200 parts of methanol was added thereto, and crystals were filtered off. The obtained crystals were washed with 400 parts of methanol, to thereby obtain 55.0 parts of a wet cake. The obtained wet cake was added to a liquid obtained by mixing 900 parts of 28.6% salt water and 100 parts of concentrated hydrochloric acid, and the temperature of this liquid was increased to 60° C. and kept for 1 hour. The crystals were filtered off and then washed with a liquid obtained by mixing 225 parts of 28.6% salt water and 25 parts of concentrated hydrochloric acid. Then, the obtained wet cake was added to 500 parts of methanol, and subsequently thereto, 50 parts of 28% ammonium water was added, the temperature of the resultant liquid was increased to 60° C. and kept for 1 hour. The crystals were filtered off and washed with 200 parts of methanol, to thereby obtain 34.8 parts of a wet cake. The obtained wet cake was added to 500 parts of methanol, and subsequently thereto, was added 30 parts of a 25% sodium hydroxide aqueous solution, the temperature of the resultant liquid was increased to 60° C. and kept for 1 hour. The crystals was filtered off and washed with 200 parts of methanol, to thereby obtain 31.5 parts of a wet cake. The obtained wet cake was dried at 80° C. to thereby obtain 22.2 parts of copper dibenzobis(2,3-pyrazino)porphyrazine sodium disulfonate (mixture) as blue crystals. Analysis was made for the blue crystals, and as a result, the following measured values were obtained.

Maximum absorption wavelength ($\lambda_{max}$): 610.5 nm (in an aqueous solution)

(2) Synthesis of copper dibenzobis(2,3-pyrazino)porphyrazine disulfonyl chloride [compound (18) below: mixture in which two of outermost aromatic rings of the main component in the mixture are pyradine rings and the remaining two are benzene rings]

Compound (18)

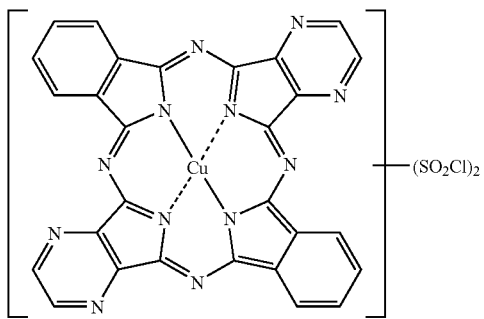

Into 62.7 pans of chlorosulfonic acid, 7.8 parts of the above obtained copper dibenzobis(2,3-pyrazino)porphyrazine sodium disulfonate was gradually poured under stirring while keeping the temperature of the liquid at 60° C. or lower, and then reaction was performed at 120° C. for 4 hours. Then, the reaction solution was cooled to 70° C., and 17.9 parts of thionyl chloride was dropwise added thereto over 30 minutes, and the reaction was made at 70° C. for 3 hours. The reaction solution was cooled to 30° C. or lower, and gradually poured into 500 parts of ice water, and deposited crystals were filtered off and washed with 200 parts of cold water, to thereby obtain 44.1 parts of a wet cake of copper dibenzobis (2,3-pyradino)porphyrazine disulfonyl chloride (mixture).

(3) Synthesis of compound (19) below [mixture containing exemplified compounds I-11 and I-12: mixture in which two of outermost aromatic rings of the main component in the mixture are pyradine rings and the remaining two are benzene rings, b is 1.2 and c is 0.8]

To 200 parts of ice water, 44.1 parts of the above obtained wet cake of copper dibenzobis(2,3-pyrazino)porphyrazine disulfonyl chloride was added, and the mixture was suspended by stirring. Then, to the resultant reaction solution, 20.5 parts of the compound (1) obtained in the synthesis of the compound A (purity: 59.3%), dissolved in 3.0 parts of ammonium water and 100 parts of hot water, was added. To this reaction solution, 28% ammonium water was added, thereby keeping the pH of the reaction solution at 9.0 to 9.3, and reaction was carried out at 17 to 20° C. for 2 hours. Then, the temperature of the reaction solution was increased to 60° C. The liquid amount at this time was 450 parts. To the resultant reaction solution, 90 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride aqueous solution, to thereby obtain 31.7 parts of a wet cake. The obtained wet cake was dissolved again in water, thereby adjusting pH of the liquid to 9.0, then the total amount was adjusted to 300 parts, and the temperature was increased to 60° C. The liquid amount at this time was 320 parts. To the resultant reaction solution, 64 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride aqueous solution, to thereby obtain 38.1 parts of a wet cake. To 210 parts of methanol, 38.1 parts of the obtained wet cake was added, and the resultant liquid was suspended by stirring at 60° C. for 1 hour, and then filtered, washed with 200 parts of methanol, and dried, to thereby obtain 8.8 parts of blue crystals (compound F). Analysis was made for the blue crystals, and as a result, the following measured values were obtained.

Maximum absorption wavelength ($\lambda_{max}$): 614.5 nm (in an aqueous solution)

(Synthesis of Compound G)

(1) Synthesis of mixture of copper tribenzo(2,3-pyrido) porphyrazine and copper dibenzobis(2,3-pyrido)porphyrazine [mixture in which the ratio of pyridine rings to benzene rings of A, B, C and D in the general formula (III) is 1.5 to 2.5 on average]

To a four necked flask, 250 parts of sulfolane, 18.4 parts of phthalimido, 12.5 parts of quinolic acid, 72.0 parts of urea, 8.8 parts of copper (II) chloride dihydrate (purity: 97.0%), and 1.0 part of ammonium molybdate were added, and the temperature of the reaction solution was increased to 200° C. and kept for 5 hours. After completion of the reaction, the reaction solution was cooled to 65° C., and 200 parts of Compound (19)

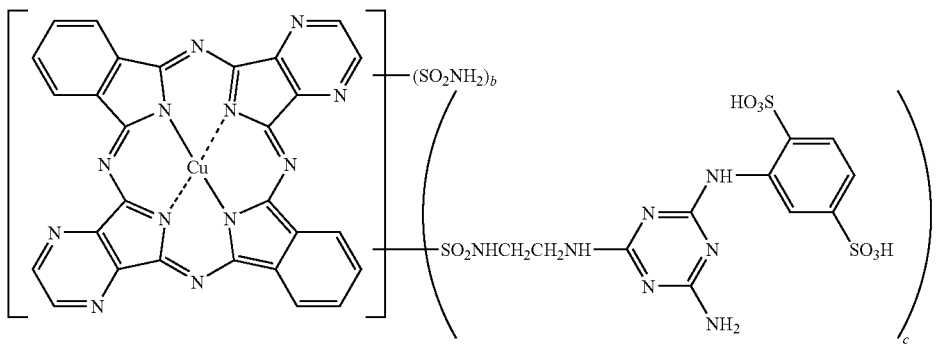

methanol was added thereto, and crystals were filtered off. The obtained crystals were washed with 150 parts of methanol and subsequently with 200 parts of warm water and dried, to thereby obtain 72.2 parts of a wet cake. The obtained wet cake was added to 500 parts of 5% hydrochloric acid, and the temperature of the resultant liquid was increased to 60° C. and kept for 1 hour. The obtained crystals were filtered off and washed with 200 parts of water. Subsequently, the obtained wet cake was added to 500 parts of 10% ammonium water, and the temperature of the liquid was set at 60° C. and kept for 1 hour. The obtained crystals were filtered off and then washed with 300 parts of water and 100 parts of methanol, to thereby obtain 33.6 parts of a wet cake. The obtained wet cake was dried at 80° C., to thereby obtain 19.8 parts of a mixture of copper tribenzo(2,3-pyrido)porphyrazine and copper dibenzobis(2,3-pyrido)porphyrazine as blue crystals. Analysis was made for the blue crystals, and as a result, the following measured values were obtained.

Maximum absorption wavelength ($\lambda_{max}$): 663.5 nm (in pyridine)

(2) Synthesis of mixture of copper tribenzo(2,3-pyrido)porphyrazine trisulfonyl chloride and copper dibenzobis(2,3-pyrido)porphyrazine disulfonyl chloride [mixture containing the compounds (3) and (5): mixture in which the ratio of pyridine rings to benzene rings of A, B, C and D in the general formula (IV) is 1.5 to 2.5 on average, and x is 2.5]

Into 46.2 parts of chlorosulfonic acid, 5.8 parts of the above obtained mixture of copper tribenzo(2,3-pyrido)porphyrazine and copper dibenzobis(2,3-pyrido)porphyrazine was gradually poured under stirring while keeping the temperature of the liquid at 60° C. or lower, and then reaction was performed at 140° C. for 4 hours. Then, the reaction solution was cooled to 70° C., and 17.9 parts of thionyl chloride was dropwise added thereto over 30 minutes, and reaction was carried out at 70° C. for 3 hours. The reaction solution was cooled to 30° C. or lower, and gradually poured into 500 parts of ice water, and deposited crystals were filtered off and washed with 200 parts of cold water. Thus, 59.3 parts of a wet cake of a mixture of copper tribenzo(2,3-pyrido)porphyrazine trisulfonyl chloride and copper dibenzobis(2,3-pyrido) porphyrazine disulfonyl chloride was obtained.

(3) Synthesis of mixture of the compounds (4) and (14) [mixture of exemplified compounds I-2, I-3 and I-4: mixture in which the ratio of pyridine rings to benzene rings of A, B, C and D in the general formula (I) is 1.5 to 2.5 on average, E represents ethylene, X represents a 2,5-disulfoanilino group, Y represents an amino group, l is 0, m is 1.7, and n is 0.8]

To 350 parts of ice water, 59.3 parts of the above obtained wet cake of copper benzo(2,3-pyrido)porphyrazine sulfonyl chloride was added, and the mixture was suspended by stirring. Thereafter, to the resultant reaction solution, 20.5 parts of the compound (1) obtained in the synthesis of the compound A (purity: 59.3%), dissolved in 3.0 parts of ammonium water and 100 parts of warm water, was added. To this reaction solution, 28% ammonium water was added, thereby keeping the pH of the reaction solution at 9.0 to 9.3, and reaction was performed at 17 to 20° C. for 4 hours. After that, the temperature of the reaction solution was increased to 60° C. The liquid amount at this time was 560 parts. To the resultant reaction solution, 112 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride aqueous solution, to thereby obtain 73.6 parts of a wet cake. The obtained wet cake was dissolved again in water, thereby adjusting the pH of the liquid to 9.0, then the total amount was adjusted to 360 parts, and the temperature was increased to 60° C. The liquid amount at this time was 380 parts. To the resultant reaction solution, 76 parts of sodium chloride (20% with respect to the liquid amount) was added, and the pH of the liquid was adjusted to 1.0 by adding a 35% hydrochloric acid aqueous solution to deposit crystals. The deposited crystals were separated by filtration, and washed with 100 parts of a 20% sodium chloride solution, to thereby obtain 48.4 parts of a wet cake. To 250 parts of methanol, 48.4 parts of the obtained wet cake was added, and the resultant liquid was suspended by stirring at 60° C. for 1 hour, and then filtered, washed with 200 parts of methanol and dried, to thereby obtain 10.7 parts of blue crystals (compound G). Analysis was made for the blue crystals, and as a result, the following measured values were obtained.

Maximum absorption wavelength ($\lambda$max): 606 nm (in an aqueous solution)

(Compound H)

As a compound H, the exemplified compound I-25 described in Table 1-2 was used.

(Synthesis of Comparative Compound I)

As the comparative compound I that is a comparative compound of the compound of the general formula (I), the following comparative compound I synthesized according to the synthesis method of a compound in Example 1 described in Japanese Patent Application Laid-Open No. 2006-328129 was used.

Comparative compound I

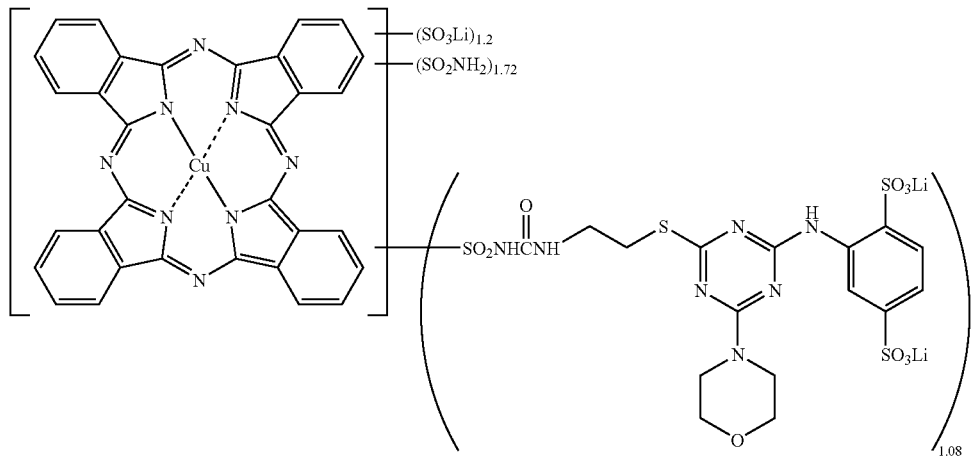

(Synthesis of Compound J)

As the compound J, the afore-mentioned exemplified compound II-66, described in Table 2-4, synthesized with reference to Japanese Patent No. 3851569 was used.

(Comparative Compound K)

As the comparative compound K that is a comparative compound of the compound of the general formula (II), C.I. direct blue 199 was used.

<Preparation of Ink>

In such compositions as shown in Tables 8 to 11, respective components were mixed and sufficiently stirred. Then, the resultant mixture was filtered through a filter having a pore size of 0.20 μm under pressure to prepare inks of Examples 1 to 20 and Comparative Examples 1 to 16.

TABLE 8

Ink composition in Examples (Unit: part by mass)

| | Examples | | | | | | | | | |
|---|---|---|---|---|---|---|---|---|---|---|
| | 1 | 2 | 3 | 4 | 5 | 6 | 7 | 8 | 9 | 10 |
| Compound A | 2.45 | | | | | | | | 2.95 | 2.90 |
| Compound B | | 2.45 | | | | | | | | |
| Compound C | | | 2.45 | | | | | | | |
| Compound D | | | | 2.45 | | | | | | |
| Compound E | | | | | 2.45 | | | | | |
| Compound F | | | | | | 2.45 | | | | |
| Compound G | | | | | | | 2.45 | | | |
| Compound H | | | | | | | | 2.45 | | |
| Comparative compound I | | | | | | | | | | |
| Compound J | 1.05 | 1.05 | 1.05 | 1.05 | 1.05 | 1.05 | 1.05 | 1.05 | 0.55 | 0.60 |
| Comparative compound K | | | | | | | | | | |
| Ethylene glycol | 9.00 | 9.00 | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 | 1.00 | 1.00 | 1.00 |
| Pure Water | 77.50 | 77.50 | 77.50 | 77.50 | 77.50 | 77.50 | 77.50 | 77.50 | 77.50 | 77.50 |

(*1) Manufactured by Kawaken Fine Chemicals Co., Ltd.

TABLE 9

Ink Composition in examples (Unit: part by mass)

| | Examples | | | | | | | | | |
|---|---|---|---|---|---|---|---|---|---|---|
| | 11 | 12 | 13 | 14 | 15 | 16 | 17 | 18 | 19 | 20 |
| Compound A | 2.80 | 2.65 | 2.60 | 2.10 | 2.05 | 1.95 | 1.90 | 1.75 | 1.40 | 0.70 |
| Compound B | | | | | | | | | | |
| Compound C | | | | | | | | | | |
| Compound D | | | | | | | | | | |
| Compound E | | | | | | | | | | |
| Compound F | | | | | | | | | | |
| Compound G | | | | | | | | | | |
| Compound H | | | | | | | | | | |
| Comparative compound I | | | | | | | | | | |
| Compound J | 0.70 | 0.85 | 0.90 | 1.40 | 1.45 | 1.55 | 1.60 | 1.75 | 2.10 | 2.80 |
| Comparative compound K | | | | | | | | | | |
| Ethylene glycol | 9.00 | 9.00 | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 | 1.00 | 1.00 | 1.00 |
| Pure Water | 77.50 | 77.50 | 77.50 | 77.50 | 77.50 | 77.50 | 77.50 | 77.50 | 77.50 | 77.50 |

(*1) Manufactured by Kawaken Fine Chemicals Co., Ltd.

TABLE 10

Ink composition in Comparative Examples (Unit: part by mass)

| | Comparative Examples | | | | | | | |
|---|---|---|---|---|---|---|---|---|
| | 1 | 2 | 3 | 4 | 5 | 6 | 7 | 8 |
| Compound A | 3.50 | | | | | | | |
| Compound B | | 3.50 | | | | | | |
| Compound C | | | 3.50 | | | | | |
| Compound D | | | | 3.50 | | | | |
| Compound E | | | | | 3.50 | | | |
| Compound F | | | | | | 3.50 | | |

TABLE 10-continued

Ink composition in Comparative Examples (Unit: part by mass)

| | Comparative Examples | | | | | | | |
|---|---|---|---|---|---|---|---|---|
| | 1 | 2 | 3 | 4 | 5 | 6 | 7 | 8 |
| Compound G | | | | | | | 3.50 | |
| Compound H | | | | | | | | 3.50 |
| Comparative compound I | | | | | | | | |
| Compound J | | | | | | | | |
| Comparative compound K | | | | | | | | |
| Ethylene glycol | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 | 1.00 |
| Pure Water | 77.50 | 77.50 | 77.50 | 77.50 | 77.50 | 77.50 | 77.50 | 77.50 |

(*1) Manufactured by Kawaken Fine Chemicals Co., Ltd.

TABLE 11

Ink composition in Comparative Examples (Unit: part by mass)

| | Comparative Examples | | | | | | | |
|---|---|---|---|---|---|---|---|---|
| | 9 | 10 | 11 | 12 | 13 | 14 | 15 | 16 |
| Compound A | | | | 2.10 | | | | |
| Compound B | | | | | | | | |
| Compound C | | | | | | | | |
| Compound D | | | | | | | | |
| Compound E | | | | | | | | |
| Compound F | | | | | | | | |
| Compound G | | | | | | | | |
| Compound H | | | | 2.10 | | | | |
| Comparative compound I | 3.50 | | | | 2.10 | | | 2.45 |
| Compound J | | 3.50 | | | | 1.40 | 1.05 | |
| Comparative compound K | | | 3.50 | 1.40 | 1.40 | | 2.45 | 1.05 |
| Ethylene glycol | 9.00 | 9.00 | 9.00 | 9.00 | 9.00 | 9.00 | 9.00 | 9.00 |
| Diethylene glycol | 9.00 | 9.00 | 9.00 | 9.00 | 9.00 | 9.00 | 9.00 | 9.00 |
| Acetylenol E100 (*1) | 1.00 | 1.00 | 1.00 | 1.00 | 1.00 | 1.00 | 1.00 | 1.00 |
| Pure Water | 77.50 | 77.50 | 77.50 | 77.50 | 77.50 | 77.50 | 77.50 | 77.50 |

(*1) Manufactured by Kawaken Fine Chemicals Co., Ltd.

<Preparation of a Recording Medium>

A resin composition containing 70 parts of low density polyethylene, 20 parts of high density polyethylene and 10 parts of titanium oxide was applied to both sides of a base paper with a basis weight of 155 g/m² so that the composition is applied in an amount of 25 g/m² to thereby produce a supporting member covered with the resin. Then, an ink receiving layer including hydrated alumina and polyvinyl alcohol as principal components was formed on the resulting supporting member. Thus, a recording medium was produced which includes a void type ink receiving layer and has a surface pH after 3 minutes of 5.0 as measured according to the JAPAN TAPPI paper pulp test method No. 49-1.

<Evaluation>

Each of the ink obtained above was set in an ink jet recording apparatus (trade name: PIXUS iP8600, manufactured by Canon Inc.) using thermal energy. Recording conditions were set to a temperature of 23° C., a relative humidity of 55%, a recording density of 2,400 dpi×1,200 dpi and a discharge of 2.5 pL. Then, an image in which the recording duty was changed from 0% to 100% in increments of 10% was formed on the recording medium obtained above.

(Ozone Resistance)

The image portion in which the recording duty was 50% in the recorded matter obtained above was measured for the image density (referred to as the "image density $D_1$ before ozone resistance test"). Further, this recorded matter was then exposed for 4 hours using an ozone test equipment (trade name: OMS-H, manufactured by Suga Test Instruments Co., Ltd.) under the conditions of an ozone gas concentration of 10 ppm, a relative humidity of 60% and a vessel temperature of 23° C. Then, the image portion in which the recording duty was 50% in the recorded matter obtained above was measured for the image density (referred to as the "image density $D_2$ after ozone resistance test"). In addition, the image densities were measured using a spectrophotometer (trade name: Spectrolino; manufactured by Gretag Macbeth) under the conditions of a light source of D50 and a field of view of 2°. From the resulting image densities before and after the ozone resistance test, a remaining density ratio was calculated according to the following formula (B) to evaluate ozone resistance. The criteria of ozone resistance are as described below. The evaluation results are shown in Tables 12-1 and 12-2. In the following criteria for evaluation, AA to B represent levels in which there is no problem in ozone resistance, and AA and A represent particularly excellent levels, and on the other hand, C and D represent insufficient levels for ozone resistance.

$$\text{Remaining density ratio}(\%) = \frac{D_2}{D_1} \times 100 \quad \text{Formula (B)}$$

$D_1$: Image density before ozone resistance test $D_2$: Image density after ozone resistance test AA: a remaining density ratio is 95 or more.

A: a remaining density ratio is from 92 or more to less than 95.

B: a remaining density ratio is from 90 or more to less than 92.

C: a remaining density ratio is from 85 or more to less than 90.

D: a remaining density ratio is less than 85.

(d Value)

A scattering angle profile was measured for each of the inks obtained above by the small-angle X-ray scattering method. The measurement conditions of the scattering angle profile are shown as follows.

Apparatus: Nano Viewer (manufactured by Rigaku Corporation)

X-ray source: Cu—Kα

Output: 45 kV-60 mA

Effective focal point: 0.3 mmϕ+Confocal Max-Flux Mirror

1st slit: 0.5 mm, 2nd slit: 0.4 mm, 3rd slit: 0.8 mm

Irradiation time: 240 min

Beam stopper: 3.0 mmϕ

Measuring method: permeation method

Blue Imaging Plate

From the obtained scattering angle profile, the d value (nm) was calculated from the 2θ value of the scattering angle peak top according to the following formula (A), using an X-ray diffraction data processing software, JADE (manufactured by Material Data Inc.). The results are shown in Tables 12-1 and 12-2. In addition, the d value represents the aggregation property of a coloring material and a mixture of coloring materials.

$$d = \frac{\lambda}{2\sin\theta} \quad \text{Formula (A)}$$

TABLE 12-1

Evaluation results of ink in Examples

| | Ozone resistance | D value (nm) |
|---|---|---|
| Example 1 | AA | 7.12 |
| Example 2 | AA | 7.10 |
| Example 3 | AA | 7.11 |
| Example 4 | AA | 7.13 |
| Example 5 | AA | 7.14 |
| Example 6 | AA | 7.19 |
| Example 7 | AA | 7.20 |
| Example 8 | B | 6.79 |
| Example 9 | B | 6.91 |
| Example 10 | A | 6.97 |
| Example 11 | A | 6.88 |
| Example 12 | A | 6.91 |
| Example 13 | AA | 7.13 |
| Example 14 | AA | 7.26 |
| Example 15 | A | 6.95 |
| Example 16 | A | 6.94 |
| Example 17 | B | 6.89 |
| Example 18 | B | 7.24 |
| Example 19 | B | 7.12 |
| Example 20 | B | 6.94 |

TABLE 12-2

Evaluation results of ink in Comparative Examples

| | Ozone resistance | D value (nm) |
|---|---|---|
| Comparative Example 1 | C | 6.76 |
| Comparative Example 2 | C | 6.76 |
| Comparative Example 3 | C | 6.69 |
| Comparative Example 4 | C | 6.72 |
| Comparative Example 5 | C | 6.75 |
| Comparative Example 6 | C | 6.71 |
| Comparative Example 7 | C | 6.70 |
| Comparative Example 8 | C | 6.31 |
| Comparative Example 9 | C | 6.21 |
| Comparative Example 10 | C | 6.69 |
| Comparative Example 11 | D | 5.32 |
| Comparative Example 12 | D | 6.26 |
| Comparative Example 13 | D | 5.85 |
| Comparative Example 14 | C | 6.41 |
| Comparative Example 15 | D | 6.01 |
| Comparative Example 16 | D | 5.80 |

When compound A and compound J were combined in a ratio of (the first coloring material/the second coloring material)=1.26 (Example 16), the $d_{A+B}$ value was 6.94 nm. This value is larger than respective d values of the $d_A$ value of 6.76 nm in the case of only compound A and the $d_B$ value of 6.69 nm in the case of only compound J. That is, it is indicated that the aggregation property in the case of using coloring materials in combination is superior to the aggregation property inherent to each of the coloring materials. Further, when compound J and compound H were combined in a ratio of (the first coloring material/the second coloring material)=2.33 (Example 8), the $d_{A+B}$ value was 6.79 nm. Also in this case, it was confirmed that the d value in the case of using coloring materials in combination was larger than respective d values ($d_A$ value and $d_B$ value) of the coloring materials. However, when compound A and comparative compound K were combined in a ratio of (the first coloring material/the second coloring material)=1.50 (Comparative Example 12), the $d_{A+B}$ value was 6.26 nm. This value is intermediate between the respective d values of the $d_A$ value of 6.76 nm in the case of only compound A and the $d_B$ value of 5.32 nm in the case of only comparative compound K. This is because compound A and comparative compound K do not make such a combination as to specifically improve the aggregation property.

It has been considered that if a coloring material having a high aggregation property, i.e., a large d value, is selected as a single coloring material, an equivalent effect can be obtained. However, as a result of studies made by the present inventors, even when merely selecting a coloring material having a large d value, the color tone of an ink is largely shifted from a preferable color tone as a cyan ink in many cases, and there is a problem in that it is used as an ink having a cyan color tone.

From the above, when compound A and compound J are combined together, a substituted sulfamoyl group in compound A and a substituent in compound J interact with each other so that aggregates become larger than those in the case where compound A or the compound J is used singly. As a result, the deterioration rate of coloring materials is reduced, and thus, it can be seen that ozone resistance is improved. In the same manner, also in the case where compound J and compound H are combined together, larger aggregates can be formed as compared with the case where compound J or compound H is used singly, and thus, ozone resistance is improved. However, in a combination with a compound having a sulfoneurea group such as comparative compound I, ozone resistance is not improved, and it has been found that the effect of the present invention cannot be obtained.

Thus, a combination of compounds capable of enhancing an aggregation property is selected to form larger aggregates on a recording medium, whereby a ratio of coloring materials deteriorating due to attack by acidic gas, particularly ozone, in the air can be reduced. As a result, particularly excellent ozone resistance can be obtained in the present invention. Further, at the same time, a preferable color tone can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-121298, filed May 1, 2007, No. 2007-206270, filed Aug. 8, 2007 and No. 2008-108116, filed Apr. 17, 2008 which are hereby incorporated by reference herein in their entirety.

What is claimed is:

1. An ink comprising at least two coloring materials of a first coloring material and a second coloring material, wherein the first coloring material is a compound represented by the following general formula (I):

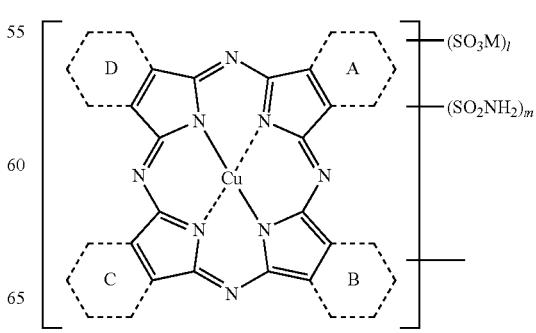

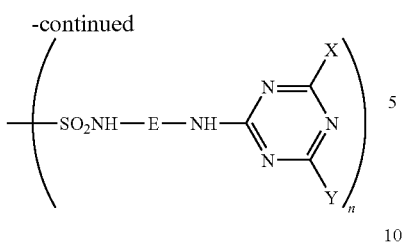

wherein A, B, C, and D each independently represent a six-membered ring having aromaticity and at least one of A, B, C, and D in the general formula (I) is a pyridine ring or a pyrazine ring, M's each independently represent a hydrogen atom, alkali metal, ammonium, or organic ammonium, E's each independently represent an alkylene group, X's each independently represent a sulfo-substituted anilino group, a carboxyl-substituted anilino group, or a phosphono-substituted anilino group, and the substituted anilino groups may have 1 to 4 of at least one substituent selected from the group consisting of a sulfonic acid group, a carboxyl group, a phosphono group, a sulfamoyl group, a carbamoyl group, a hydroxyl group, an alkoxy group, an amino group, an alkylamino group, a dialkylamino group, an arylamino group, a diarylamino group, an acetylamino group, an ureido group, an alkyl group, a nitro group, a cyano group, halogen, an alkylsulfonyl group, and an alkylthio group, Y's each independently represent a hydroxyl group or an amino group, and 1, m and n satisfy $0 \leq 1 \leq 2$, $0 \leq m \leq 3$ and $0.1 \leq n \leq 3$, and $1+m+n=1$ to 4, and wherein the second coloring material is a compound represented by the general formula (II):

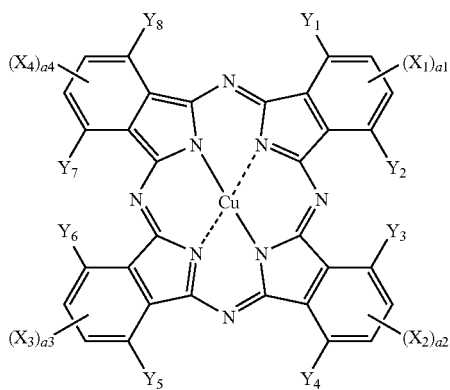

wherein $X_1$, $X_2$, $X_3$ and $X_4$ each independently represent —SO-Z, —SO$_2$-Z, —SO$_2$NR$_1$R$_2$, a sulfonic acid group, —CONR$_1$R$_2$, or CO$_2$R$_1$, wherein Z's each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, R$_1$ and R$_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, $Y_1$, $Y_2$, $Y_3$, $Y_4$, $Y_5$, $Y_6$, $Y_7$ and $Y_8$ each independently represent a hydrogen atom, a halogen atom, a substituted or unsubstituted alkyl group, a substituted or unsubstituted aryl group, a cyano group, a substituted or unsubstituted alkoxy group, an amide group, an ureido group, a sulfonamide group, a substituted or unsubstituted carbamoyl group, a substituted or unsubstituted sulfamoyl group, a substituted or unsubstituted alkoxycarbonyl group, a carboxyl group or a sulfonic acid group, and $a_1$, $a_2$, $a_3$ and $a_4$ represent the numbers of substituents of $X_1$, $X_2$, $X_3$ and $X_4$, respectively, and each independently represent an integer of 1 or 2.

2. The ink according to claim 1, wherein a content (% by mass) of the first coloring material in the ink is from 1.25 times or more to 5.0 times or less as much as a content (% by mass) of the second coloring material in the ink.

3. An ink jet recording method in which ink is ejected by an ink jet system to perform recording on a recording medium, wherein the ink is an ink according to claim 1.

4. An ink cartridge provided with an ink storage portion for storing ink, wherein the ink is an ink according to claim 1.

5. A recording unit provided with an ink storage portion for storing ink and a recording head for ejecting ink, wherein the ink is an ink according to claim 1.

6. An ink jet recording apparatus provided with an ink storage portion for storing ink and a recording head for ejecting ink, wherein the ink is an ink according to claim 1.

7. The ink according to claim 1, wherein a dispersion distance, d value, between molecular aggregates in an ink, obtained by a small-angle X-ray scattering method, satisfies the following conditions:

$$d_{A+B} > d_A \text{ and } d_{A+B} > d_B$$

wherein $d_A$ (nm) is a d value of the first coloring material, $d_B$ (nm) is a d value of the second coloring material, and $d_{A+B}$ (nm) is a d value when the first coloring material and the second coloring material are mixed.

* * * * *